United States Patent
Ma et al.

(10) Patent No.: US 11,773,327 B2
(45) Date of Patent: Oct. 3, 2023

(54) PSA-TYPE LIQUID CRYSTAL COMPOSITION AND DISPLAY DEVICE HAVING SAME

(71) Applicant: Jiangsu Hecheng Display Technology Co., Ltd., Yangzhong (CN)

(72) Inventors: Wenyang Ma, Yangzhong (CN); Liwei Wang, Yangzhong (CN); Weigang Yan, Yangzhong (CN); Wenming Han, Yangzhong (CN); Haibin Xu, Yangzhong (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 107 days.

(21) Appl. No.: 16/832,251

(22) Filed: Mar. 27, 2020

(65) Prior Publication Data

US 2020/0332195 A1    Oct. 22, 2020

(30) Foreign Application Priority Data

Apr. 16, 2019  (CN) .......................... 201910304707.4

(51) Int. Cl.
  *G02F 1/1334*  (2006.01)
  *C09K 19/54*  (2006.01)
  *C09K 19/30*  (2006.01)

(52) U.S. Cl.
  CPC ........ *C09K 19/544* (2013.01); *C09K 19/3003* (2013.01); *C09K 19/3066* (2013.01); *C09K 2019/301* (2013.01); *C09K 2019/3004* (2013.01); *C09K 2019/3009* (2013.01); *C09K 2019/3016* (2013.01); *C09K 2019/548* (2013.01)

(58) Field of Classification Search
  CPC ...... C09K 19/42; C09K 19/54; C09K 19/544; C09K 19/3003; C09K 19/3066; C09K 19/3016; C09K 2019/3004; C09K 2019/3009; C09K 2019/301; C09K 2019/548; C09K 2019/0448; C09K 2019/3096; C09K 19/38; G02F 1/1334
  See application file for complete search history.

(56) References Cited

U.S. PATENT DOCUMENTS

| | | | | |
|---|---|---|---|---|
| 8,425,800 | B2 * | 4/2013 | Hirata | C09K 19/42 349/1 |
| 8,647,530 | B2 | 2/2014 | Kuriyama et al. | |
| 9,243,185 | B2 * | 1/2016 | Hsieh | C09K 19/12 |
| 10,023,801 | B2 | 7/2018 | Sudo et al. | |
| 11,248,170 | B2 * | 2/2022 | Han | G02F 1/1333 |
| 2011/0253933 | A1 | 10/2011 | Hirata et al. | |
| 2014/0061534 | A1 | 3/2014 | Goebel et al. | |
| 2016/0009999 | A1 | 1/2016 | Hirata et al. | |
| 2018/0079959 | A1 | 3/2018 | Kaneoya et al. | |
| 2018/0201837 | A1 * | 7/2018 | Weegels | C09K 19/3003 |
| 2020/0339883 | A1 | 10/2020 | Han et al. | |

FOREIGN PATENT DOCUMENTS

| | | | |
|---|---|---|---|
| CN | 102786937 A | 11/2012 | |
| CN | 103666481 A | 3/2014 | |
| CN | 105121597 A | 12/2015 | |
| CN | 107001938 A | 8/2017 | |
| CN | 108727195 A | 11/2018 | |
| CN | 109207165 A | 1/2019 | |
| CN | 109207166 A | 1/2019 | |
| CN | 109407384 A | 3/2019 | |
| CN | 109575952 A | 4/2019 | |
| JP | 4-187487 | * 7/1992 | ............ B41M 5/18 |
| JP | 2004-302096 A | 10/2004 | |
| TW | 201443206 A | 11/2014 | |

(Continued)

*Primary Examiner* — Geraldina Visconti
(74) *Attorney, Agent, or Firm* — Hoffmann & Baron, LLP

(57) ABSTRACT

A PSA-type liquid crystal composition includes a host liquid crystal A and a polymerizable component B, where the host liquid crystal A includes one or more liquid crystal compounds, and the polymerizable component B includes at least one compound selected from compounds of general formula I-1, general formula I-2 and general formula I-3. A liquid crystal display device includes the PSA-type liquid crystal composition above. The PSA-type liquid crystal composition has better intersolubility, cannot be crystallized at a low-temperature environment, can form a relatively stable pretilt angle after the polymerization of the polymerizable component, avoids the image sticking, and inhibits the occurrence of a display defect, such as Zara Particle, during the polymerization.

15 Claims, No Drawings

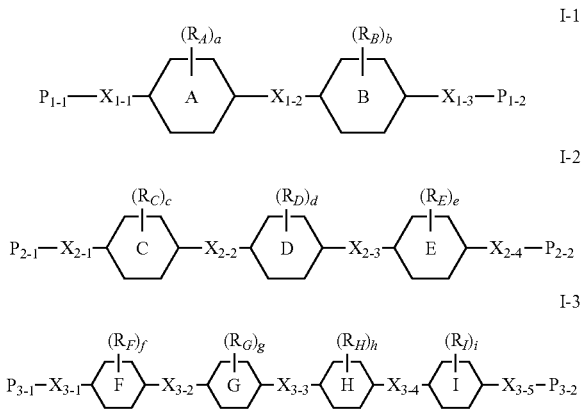

(56) References Cited

FOREIGN PATENT DOCUMENTS

| | | | |
|---|---|---|---|
| TW | 201538693 A | 10/2015 | |
| TW | 201544580 A | 12/2015 | |
| TW | 201821599 A | 6/2018 | |
| WO | 2010/084823 A1 | 7/2010 | |
| WO | WO 2019/039092 A1 * | 2/2019 | ............. C09K 19/38 |

* cited by examiner

PSA-TYPE LIQUID CRYSTAL COMPOSITION AND DISPLAY DEVICE HAVING SAME

TECHNICAL FIELD

The present invention relates to the field of liquid crystal material, particularly to a PSA-type liquid crystal composition and a display device having the same.

BACKGROUND ARTS

Liquid crystal displays (LCDs) have gained rapid development due to their small size, light weight, low power consumption and excellent display quality, and in particular, have been widely used in portable electronic information products. Based on the displaying mode, liquid crystal displays can be classified into the types of PC (phase change), TN (twisted nematic), STN (super twisted nematic), ECB (electrically controlled birefringence), OCB (optically compensated bend), IPS (in-plane switching), FFS (fringe field switching), VA (vertical alignment), PSA (polymer stable alignment), and the like.

A PSA-type liquid crystal display device is manufactured by adding a small amount (such as 0.3 wt %, typically, <1 wt %) of one or more polymerizable compounds into a liquid crystal composition, filling the same into a liquid crystal cell, and polymerizing, usually via a UV photopolymerization, or crosslinking the polymerizable compounds in suit under a condition where liquid crystal molecules are initially aligned with or without a voltage applied between electrodes, thereby fixing the alignment of the liquid crystal molecules. The polymerization is carried out at a temperature where the liquid crystal composition exhibits a liquid crystal phase, usually at room temperature. It has been proven that the addition of polymerizable liquid crystal compounds to a liquid crystal composition is particularly suitable since the polymer structure formed by the polymerizable liquid crystal compounds in the unit can well control the tilt angle of liquid crystal molecules, and that the PSA-type liquid crystal display device has a high response speed and a high contrast.

Therefore, PSA-type liquid crystal display device is continuously developed, and the PSA principle is also used in various conventional liquid crystal displays, such as the known PSA-VA, PSA-OCB, PSA-IPS, PSA-FFS, and PSA-TN displays. Like the conventional LC displays, PSA displays can be operated as active-matrix or passive-matrix displays. In the case of active-matrix displays, individual pixels are usually addressed by integrated, non-linear active elements, such as transistors, while in the case of passive-matrix displays, individual pixels are usually addressed by the multiplex method, as known from the prior art.

However, there are some display defects such as image sticking in PSA-type liquid crystal display device. Studies have shown that such problems are mostly caused by the presence of impurities and changes in the alignment of liquid crystal molecules (changes in the pretilt angle), and the alignment of liquid crystal molecules is controlled by a polymer network formed by the polymerization of polymerizable compounds. If the structural rigidity of the polymerizable compounds constituting the polymer network is insufficient, the structure of the polymer network may change when the PSA-type liquid crystal display device continuously displays the same pattern for a long time, thereby causing the changes in the pretilt angle of liquid crystal molecules. Therefore, it is generally necessary to select a polymerizable compound having a rigid structure.

In order to prevent image sticking by improving the rigidity of a polymer, it has been investigated to constitute a display device using a polymerizable compound having a structure of 1,4-phenylene group or the like, which contains only a ring structure and a polymerizable functional group (refer to Patent Literature JP2003307720A), or constitute a display device using a polymerizable compound having a biaryl structure (refer to Patent Literature JP2008116931A). However, such polymerizable compounds have low compatibility with liquid crystal compounds and thus, when a liquid crystal composition containing a polymerizable compound is prepared, the problems such as precipitation of the polymerizable compound are produced, leading to the need for improvement in compatibility with the liquid crystal composition.

Moreover, it has been proposed to constitute a display device using a mixed liquid crystal composition containing a bifunctional polymerizable compound and a tri- or higher-functional polymerizable compound, such as dipentaerythritol pentaacrylate, dipentaerythritol hexaacrylate, or the like (refer to Patent Literature JP2004302096A). However, dipentaerythritol pentaacrylate and dipentaerythritol hexaacrylate have no ring structure in the molecules thereof and thus have weak affinity for liquid crystal compounds and weak force to regulate alignment, thereby causing the problem of failing to achieve satisfactory alignment stability. In addition, polymerization of these polymerizable compounds requires a polymerization initiator to be added, and if a polymerization initiator is not added, the polymerizable compounds remain after polymerization.

In order to further improve the response speed, various combinations of liquid crystal compositions and polymerizable compounds are also disclosed in the prior art (see Patent Literature WO2010084823A1). However, a relation between the pretilt angle and response speed is generally known, and a significant improvement effect has not been confirmed. Since liquid crystal compounds containing an alkenyl group and chlorine atom are used, a defective display is highly likely to be caused, and there will also result in environmental issues.

Therefore, there is a need for developing a PSA-type liquid crystal composition, which has no precipitation of polymerizable compounds in a wide temperature range, has a rapid response speed and has no display defects such as image sticking, and a liquid crystal display device having the same.

SUMMARY OF THE INVENTION

Objects: In view of the defects in the prior art, it is an object of the present invention to provide a PSA-type liquid crystal composition, which has good intersolubility, high response speed and has no display defects such as image sticking. It is another object of the present invention to provide a display device comprising the PSA-type liquid crystal composition above.

Technical Solutions of the Present Invention

In order to achieve the above objects, the present invention provides a PSA-type liquid crystal composition comprising a host liquid crystal A and a polymerizable component B, wherein the host liquid crystal A comprises one or more liquid crystal compounds, and the polymerizable component B comprises at least one compound selected from a group consisting of the compounds of general formula I-1, general formula I-2 and general formula I-3:

I-1
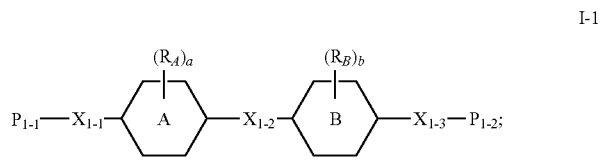

I-2
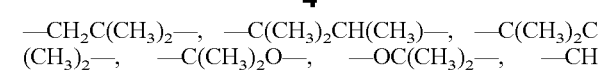

I-3
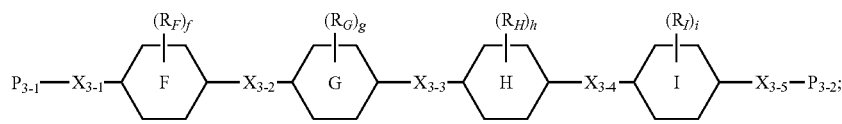

in which, ring A, ring B, ring C, ring D, ring E, ring F, ring G, ring H and ring I each independently represents phenylene or naphthylene;

$X_{1-1}$, $X_{1-2}$, $X_{1-3}$, $X_{2-1}$, $X_{2-2}$, $X_{2-3}$, $X_{2-4}$, $X_{3-1}$, $X_{3-2}$, $X_{3-3}$, $X_{3-4}$ and $X_{3-5}$ each independently represents a single bond, or a $C_{1-12}$ linear or branched alkylene, wherein one or more —$CH_2$— in the $C_{1-12}$ linear or branched alkylene can be replaced by —O—, —S—, —NH—, —CO—, —CH=CH— or —C≡C— in a manner that heteroatoms are not directly connected to each other, —H in one or more —$CH_2$— in the $C_{1-12}$ linear or branched alkylene can be substituted by halogen, and wherein at least one of $X_{1-1}$, $X_{1-2}$ and $X_{1-3}$ represents a single bond, at least one of $X_{2-1}$, $X_{2-2}$, $X_{2-3}$ and $X_{2-4}$ represents a single bond, and at least one of $X_{3-1}$, $X_{3-2}$, $X_{3-3}$, $X_{3-4}$ and $X_{3-5}$ represents a single bond;

$R_A$, $R_B$, $R_C$, $R_D$, $R_E$, $R_F$, $R_G$, $R_H$ and $R_I$ each independently represents halogen, or a $C_{1-5}$ halogenated or unhalogenated linear or branched alkyl or alkoxy;

$P_{1-1}$, $P_{1-2}$, $P_{2-1}$, $P_{2-2}$, $P_{3-1}$ and $P_{3-2}$ each independently represents a polymerizable group;

a, b, c, d, e, f, g, h and i each independently represents 0, 1, 2 or 3, and when a is 2 or 3, $R_A$ can be same or different; when b is 2 or 3, $R_B$ can be same or different; when c is 2 or 3, $R_C$ can be same or different; when d is 2 or 3, $R_D$ can be same or different; when e is 2 or 3, $R_E$ can be same or different; when f is 2 or 3, $R_F$ can be same or different; when g is 2 or 3, $R_G$ can be same or different; when h is 2 or 3, $R_H$ can be same or different; when i is 2 or 3, $R_I$ can be same or different;

$a+b+n_1 \geq 1$, and $n_1 \geq 1$, wherein $n_1$ represents the number of groups that are not single bond in $X_{1-1}$, $X_{1-2}$ and $X_{1-3}$;

$c+d+e+n_2 \geq 2$, and $n_2 \geq 1$, wherein $n_2$ represents the number of groups that are not single bond in $X_{2-1}$, $X_{2-2}$, $X_{2-3}$ and $X_{2-4}$; and $f+g+h+i+n_3 \geq 3$, and $n_3 \geq 1$, wherein $n_3$ represents the number of groups that are not single bond in $X_{3-1}$, $X_{3-2}$, $X_{3-3}$, $X_{3-4}$ and $X_{3-5}$.

In some embodiments of the present invention, ring A, ring B, ring C, ring D, ring E, ring F, ring G, ring H and ring I preferably each independently represents phenylene.

In some embodiments of the present invention, $X_{1-1}$, $X_{1-2}$, $X_{1-3}$, $X_{2-1}$, $X_{2-2}$, $X_{2-3}$, $X_{2-4}$, $X_{3-1}$, $X_{3-2}$, $X_{3-3}$, $X_{3-4}$ and $X_{3-5}$ each independently preferably represents a single bond, —$CH_2O$—, —$OCH_2$—, —CO—O—, —O—CO—, —$CH_2CH_2$—, —$(CH_2)_3$—, —$(CH_2)_4$—, —$(CH_2)_2O$—, —$(CH_2)_3O$—, —$O(CH_2)_3$—, —O—, —$CF_2$—, —$CF_2O$—, —$OCF_2$—, —$CH(CH_3)CH_2$—, —$C(CH_3)_2CH_2$—, —$CH_2C(CH_3)_2$—, —$C(CH_3)_2CH(CH_3)$—, —$C(CH_3)_2C(CH_3)_2$—, —$C(CH_3)_2O$—, —$OC(CH_3)_2$—, —$CH(CH_2CH_3)CH_2$—, —O—, —S—, —NH—, —NH—CO—O—, —O—CO—NH—, —$SCH_2$—, —$CH_2S$—, —CH=CH—, —C≡C—, —CH=CH—CO—O— or —O—CO—CH=CH—.

In some embodiments of the present invention, $R_A$, $R_B$, $R_C$, $R_D$, $R_E$, $R_F$, $R_G$, $R_H$ and $R_I$ each independently preferably represents —F, —$CH_2F$, —$CHF_2$, —$CF_3$, —$CH_3$, —$OCH_3$, —$CH_2CH_3$ or —$OCH_2CH_3$.

In some embodiments of the present invention, $P_{1-1}$, $P_{1-2}$, $P_{2-1}$, $P_{2-2}$, $P_{3-1}$ and $P_{3-2}$ each independently preferably represents

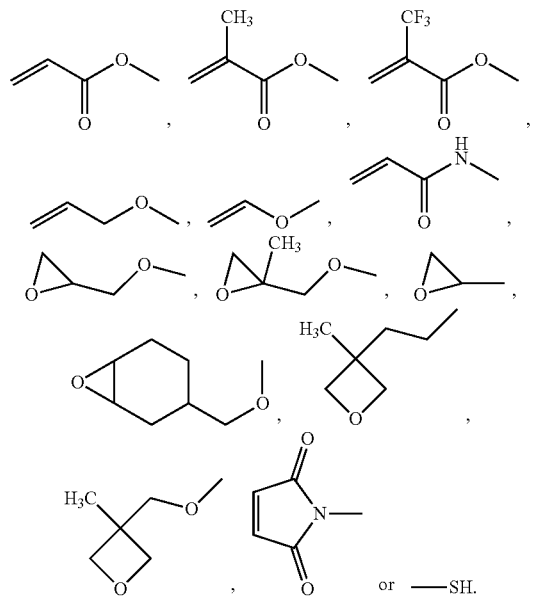

In some embodiments of the present invention, $a+b+n_1 \geq 2$; $c+d+e+n_2 \geq 3$; and $f+g+h+i+n_3 \geq 4$.

In some embodiments of the present invention, $X_{1-2}$, $X_{2-2}$, $X_{2-3}$, $X_{3-2}$, $X_{3-3}$ and $X_{3-4}$ each independently represents a single bond, —$CH_2O$—, —$OCH_2$—, —$CH_2CH_2$—, —$(CH_2)_3$—, —$(CH_2)_4$—, —$(CH_2)_3O$—, —$O(CH_2)_3$—, —O—, —$CF_2$—, —$CF_2O$—, —$OCF_2$—, —$CH(CH_3)CH_2$—, —$C(CH_3)_2CH_2$—, —$CH_2C(CH_3)_2$—, —$C(CH_3)_2CH(CH_3)$—, —$C(CH_3)_2C(CH_3)_2$—, —$C(CH_3)_2O$—, —$OC(CH_3)_2$—, —$CH(CH_2CH_3)CH_2$—, —S—, —NH—, —NH—CO—O—, —O—CO—NH—, —SCH$_2$—, —CH$_2$S—, —CH═CH—, —C≡C—, —CH═CH—CO—O— or —O—CO—CH═CH—.

In some embodiments of the present invention, if X$_{1-2}$ represents —CO— or —O—CO—, then a+b≠0; if both X$_{2-2}$ and X$_{2-3}$ represent —CO— or —O—CO—, then c+d+e≠0; if all of X$_{3-2}$, X$_{3-3}$ and X$_{3-4}$ represent —CO— or —O—CO—, then f+g+h+i 0.

In some embodiments of the present invention, both X$_{1-1}$ and X$_{1-3}$ represent single bond, and X$_{1-2}$ represents —CH$_2$O—, —OCH$_2$—, —CO—O—, —O—CO—, —CH$_2$CH$_2$—, —(CH$_2$)$_3$—, —(CH$_2$)$_4$—, —(CH$_2$)$_3$O—, —O(CH$_2$)$_3$—, —O—, —CF$_2$—, —CF$_2$O—, —OCF$_2$—, —CH(CH$_3$)CH$_2$—, —C(CH$_3$)$_2$CH$_2$—, —CH$_2$C(CH$_3$)$_2$—, —C(CH$_3$)$_2$CH(CH$_3$)—, —C(CH$_3$)$_2$C(CH$_3$)$_2$—, —C(CH$_3$)$_2$O—, —OC(CH$_3$)$_2$—, —CH(CH$_2$CH$_3$)CH$_2$—, —S—, —NH—, —NH—CO—O—, —O—CO—NH—, —SCH$_2$—, —CH$_2$S—, —CH═CH—, —C≡C—, —CH═CH—CO—O— or —O—CO—CH═CH—.

In some embodiments of the present invention, the polymerizable component B only comprises one compound of general formula I-1, wherein both X$_{1-1}$ and X$_{1-3}$ represent single bond, X$_{1-2}$ represents —CH$_2$O—, —OCH$_2$—, —CO—O—, —O—CO—, —CH$_2$CH$_2$—, —(CH$_2$)$_3$—, —(CH$_2$)$_4$—, —(CH$_2$)$_3$O—, —O(CH$_2$)$_3$—, —O—, —CF$_2$—, —CF$_2$O—, —OCF$_2$—, —CH(CH$_3$)CH$_2$—, —CH$_2$C(CH$_3$)$_2$—, —C(CH$_3$)$_2$CH$_2$—, —C(CH$_3$)$_2$CH(CH$_3$)—, —C(CH$_3$)$_2$C(CH$_3$)$_2$—, —C(CH$_3$)$_2$O—, —OC(CH$_3$)$_2$—, —CH(CH$_2$CH$_3$)CH$_2$—, —S—, —NH—, —NH—CO—O—, —O—CO—NH—, —SCH$_2$—, —CH$_2$S—, —CH═CH—, —C≡C—, —CH═CH—CO—O— or —O—CO—CH═CH—, and a+b≠0.

In some embodiments of the present invention, if the polymerizable component B comprises one compound of general formula I-1 in which a+b+n$_1$=1, it at least further comprises another compound selected from the group consisting of the compounds of general formula I-1, general formula I-2 and general formula I-3.

In some embodiments of the present invention, at least one of X$_{2-1}$ and X$_{2-4}$ represents a single bond; and when both X$_{2-1}$ and X$_{2-4}$ represent single bond, at least one of X$_{2-2}$ and X$_{2-3}$ is not a single bond, and c+d+e≥1.

In some embodiments of the present invention, if the polymerizable component B comprises two or three polymerizable compounds, and at least one of two or three polymerizable compounds is selected from the compounds of general formula I-2, at least one of X$_{2-1}$ and X$_{2-4}$ represents a single bond; and when both X$_{2-1}$ and X$_{2-4}$ represent single bond, at least one of X$_{2-2}$ and X$_{2-3}$ is not a single bond, and c+d+e≥1.

In some embodiments of the present invention, at least one of X$_{3-1}$ and X$_{3-5}$ represents a single bond; and when both X$_{3-1}$ and X$_{3-5}$ are single bond, at least one of X$_{3-2}$, X$_{3-3}$ and X$_{3-4}$ is not a single bond, and f+g+h+i≥2; when only one of X$_{3-1}$ and X$_{3-5}$ represents a single bond, at most one of X$_{3-2}$, X$_{3-3}$ and X$_{3-4}$ is not a single bond, and f+g+h+i≥2.

In some embodiments of the present invention, if the polymerizable component B comprises two or three polymerizable compounds, and at least one of two or three polymerizable compounds is selected from the compounds of general formula I-3, at least one of X$_{3-1}$ and X$_{3-5}$ represents a single bond; and when both X$_{3-1}$ and X$_{3-5}$ are single bond, at least one of X$_{3-2}$, X$_{3-3}$ and X$_{3-4}$ is not a single bond, and f+g+h+i≥2; when only one of X$_{3-1}$ and X$_{3-5}$ represents a single bond, at most one of X$_{3-2}$, X$_{3-3}$ and X$_{3-4}$ is not a single bond, and f+g+h+i≥2.

In some embodiments of the present invention, the compound of general formula I-1 is selected from a group consisting of the following compounds:

I-1-1

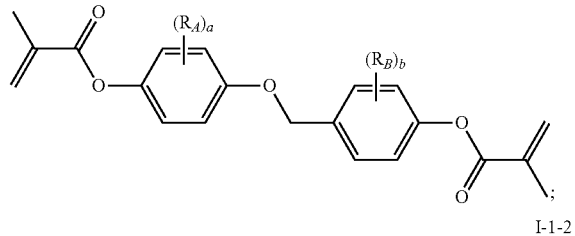

I-1-2

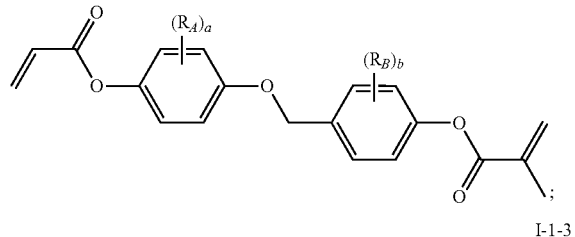

I-1-3

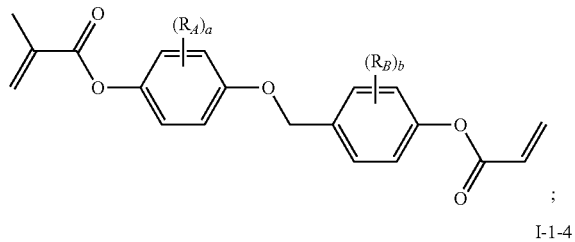

I-1-4

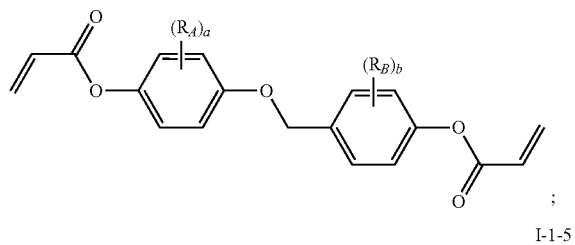

I-1-5

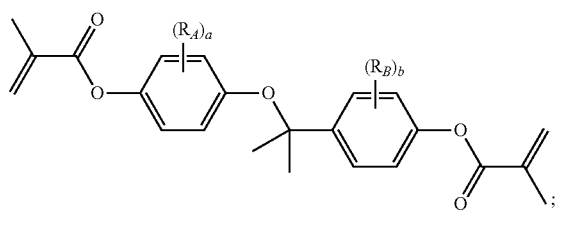

I-1-6

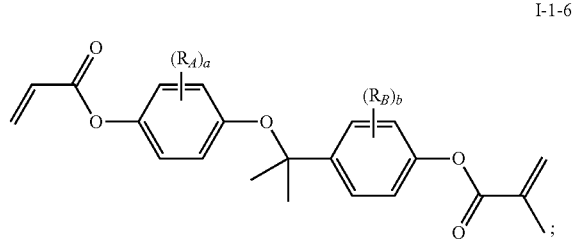

I-1-7
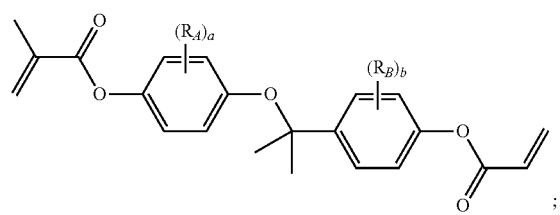
I-1-8
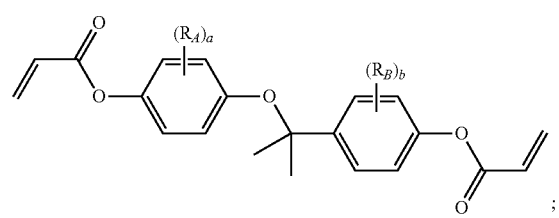
I-1-9
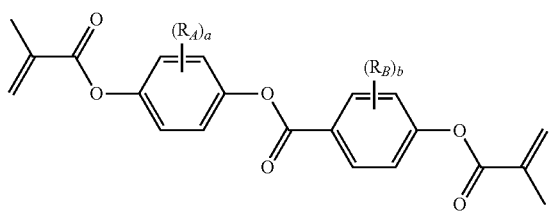
I-1-10
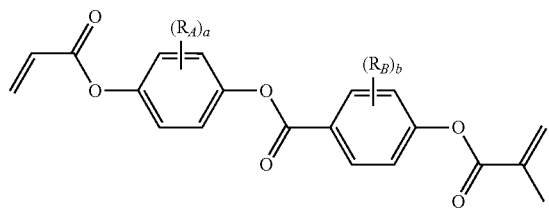
I-1-11
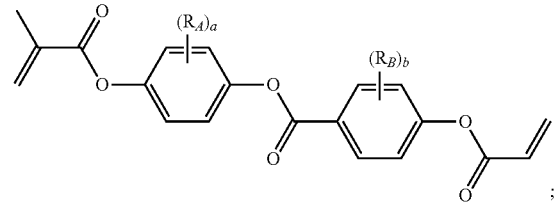
I-1-12
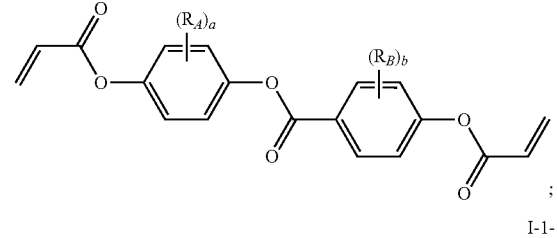
I-1-13
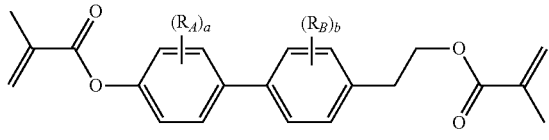
I-1-14
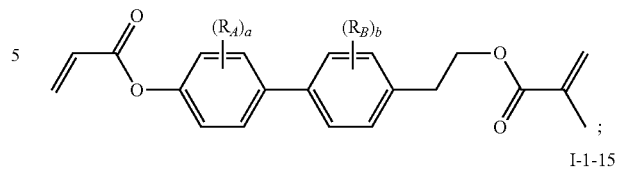
I-1-15
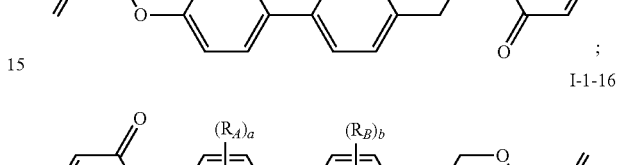
I-1-16
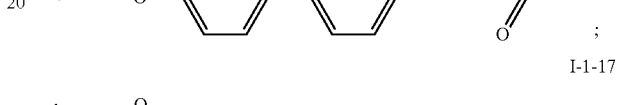
I-1-17
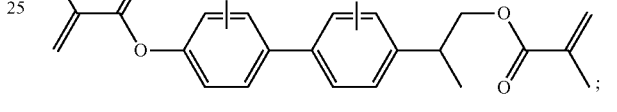
I-1-18
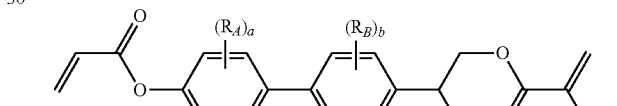
I-1-19
I-1-20
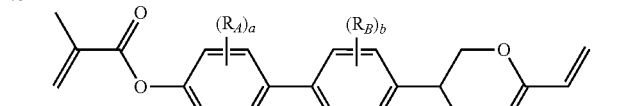
I-1-21
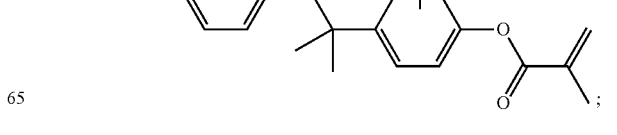

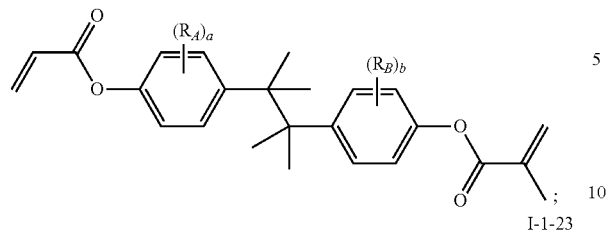
In which, $R_A$, $R_B$, a and b each can be same or different and has one of the meanings indicated above or below.
In some embodiments of the present invention, the compound of general formula I-2 is selected from a group consisting of the following compounds:
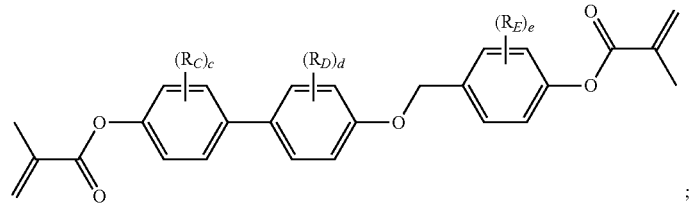
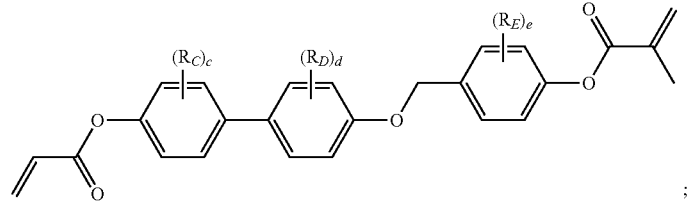
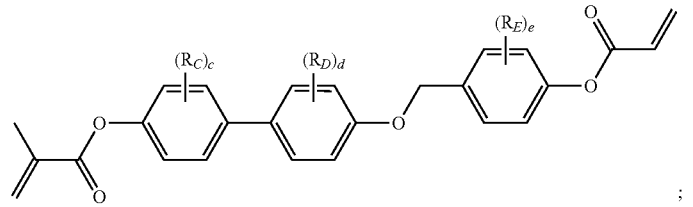
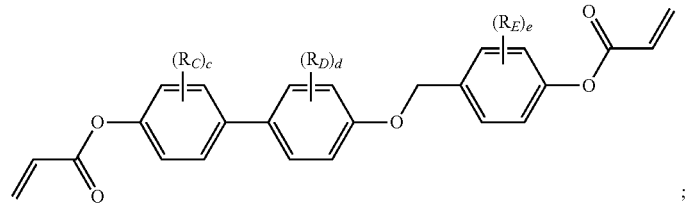
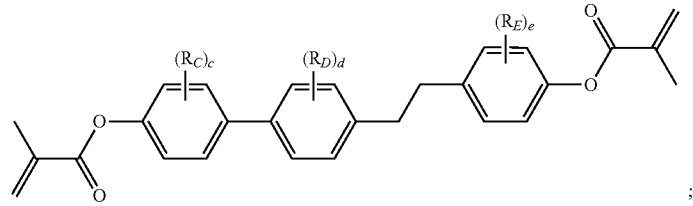

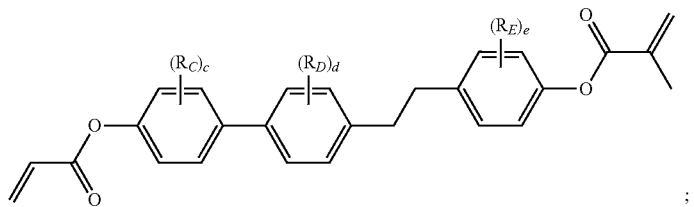
I-2-6
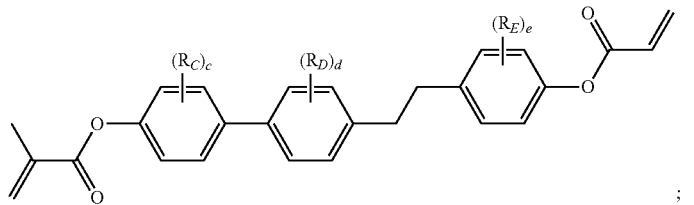
I-2-7
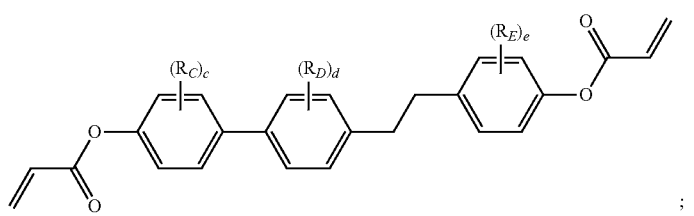
I-2-8
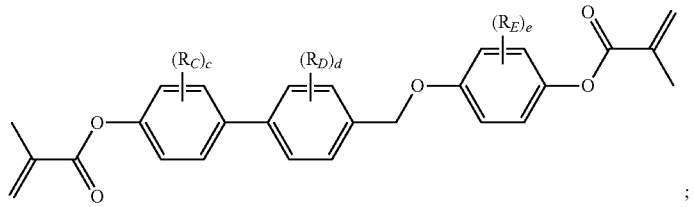
I-2-9
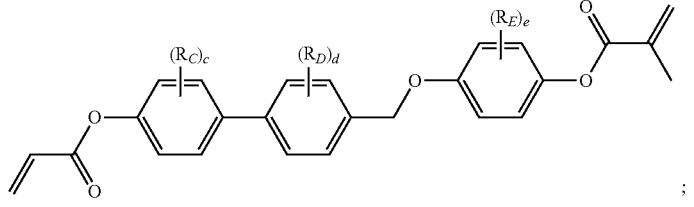
I-2-10
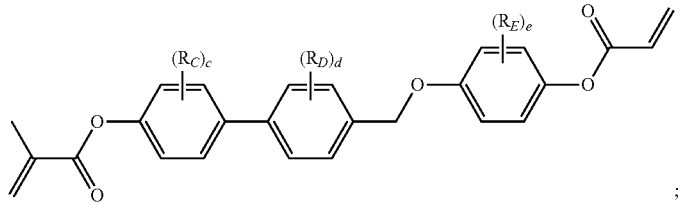
I-2-11
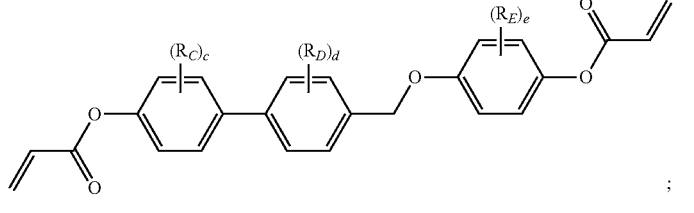
I-2-12

-continued
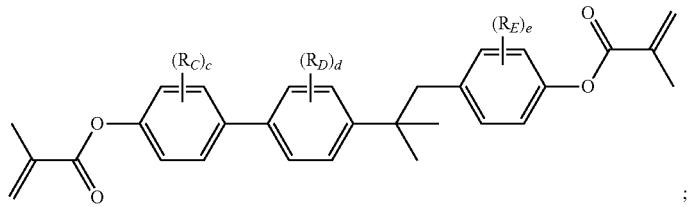
I-2-13
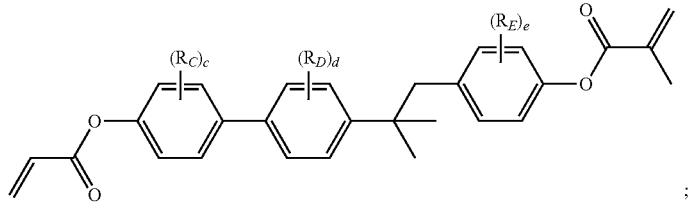
I-2-14
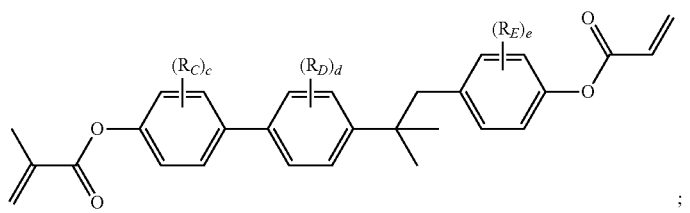
I-2-15
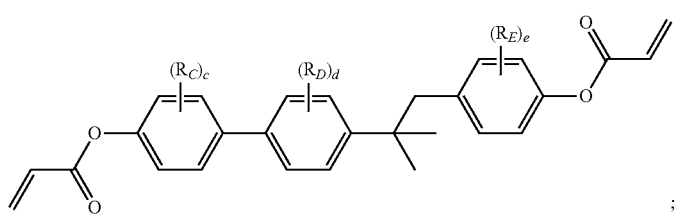
I-2-16
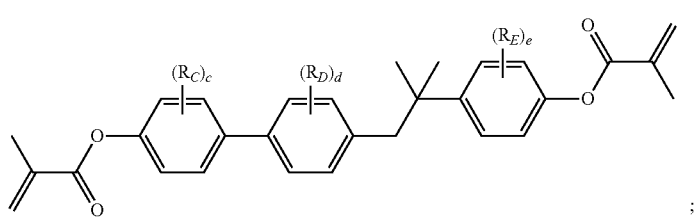
I-2-17
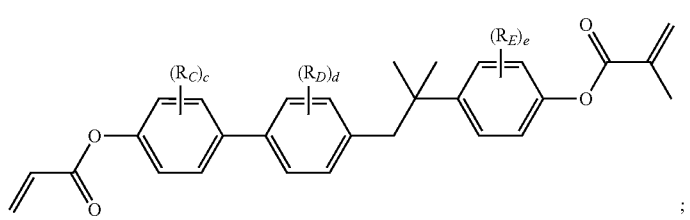
I-2-18
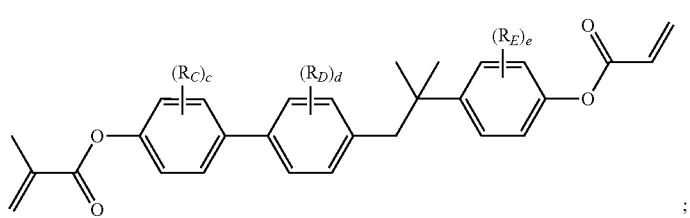
I-2-19

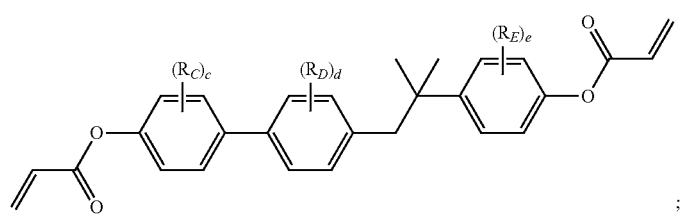
I-2-20
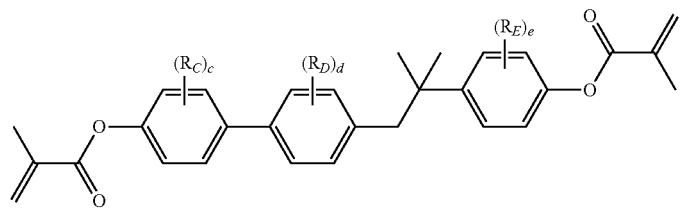
I-2-21
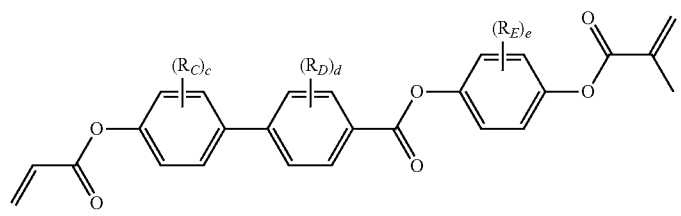
I-2-22
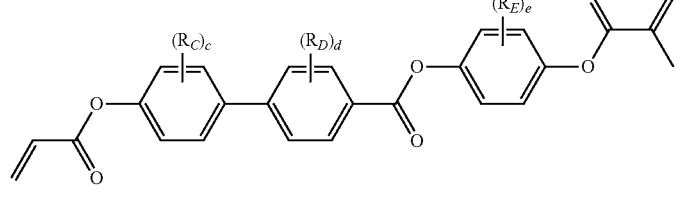
I-2-23
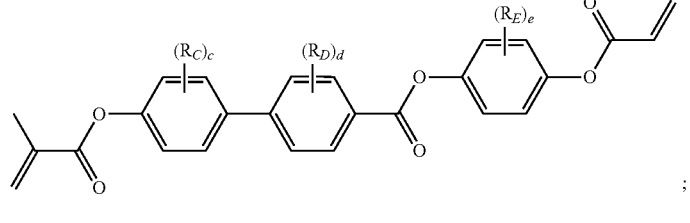
I-2-24
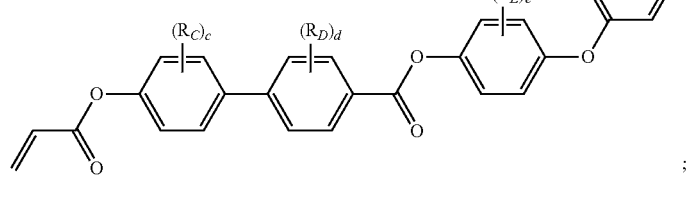
I-2-25
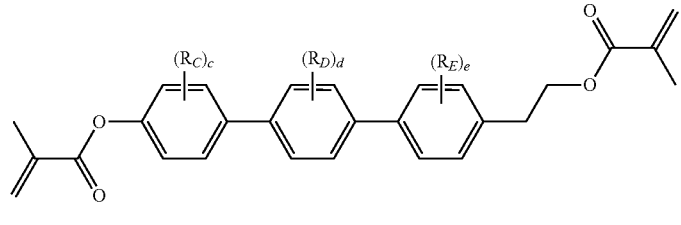
I-2-26
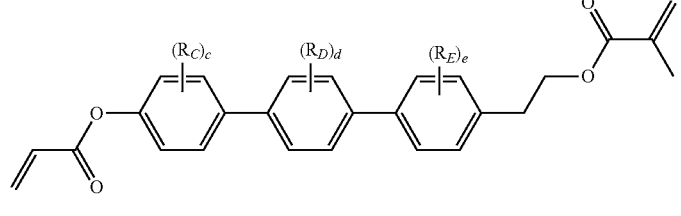

-continued
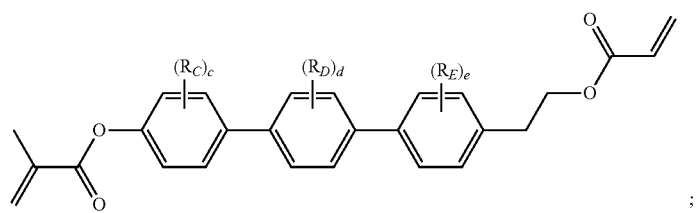
I-2-27
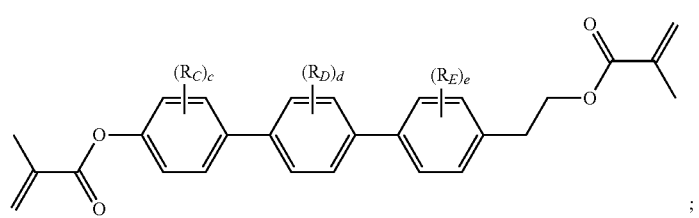
I-2-28
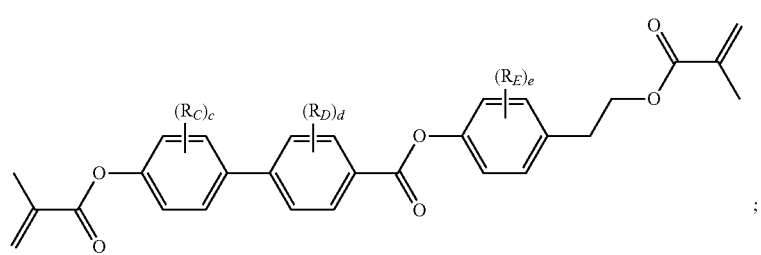
I-2-29
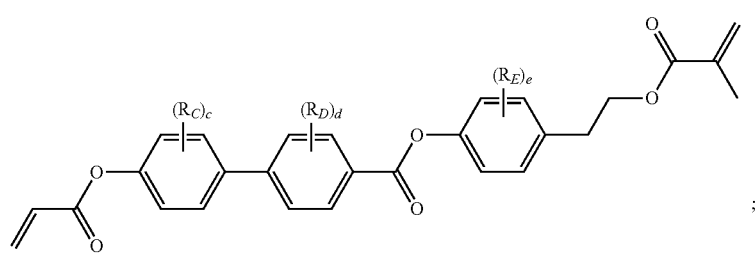
I-2-30
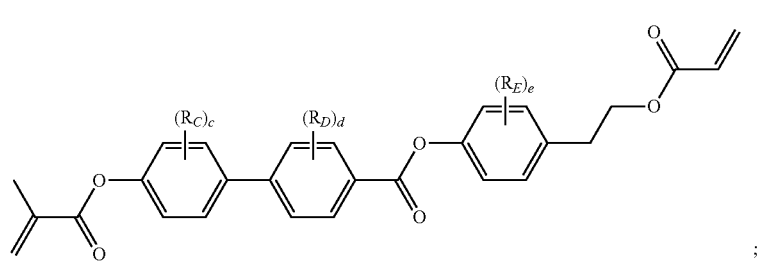
I-2-31
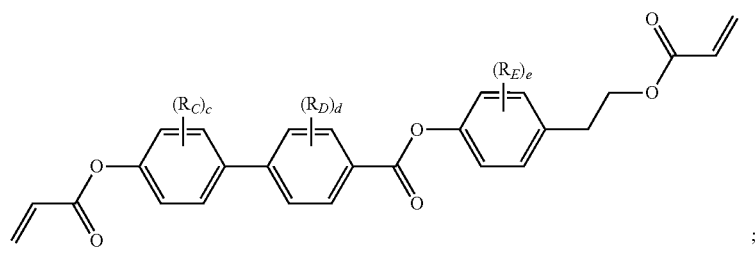
I-2-32

-continued
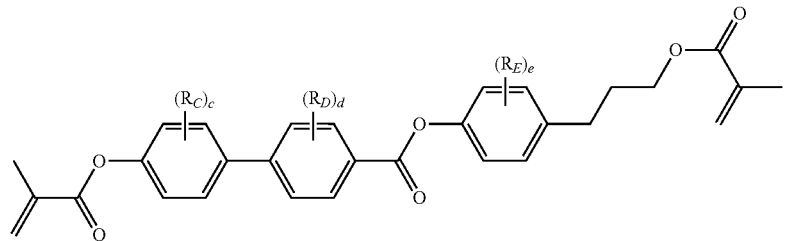
I-2-33
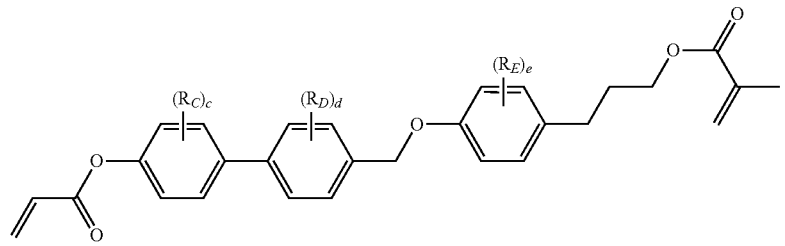
I-2-34
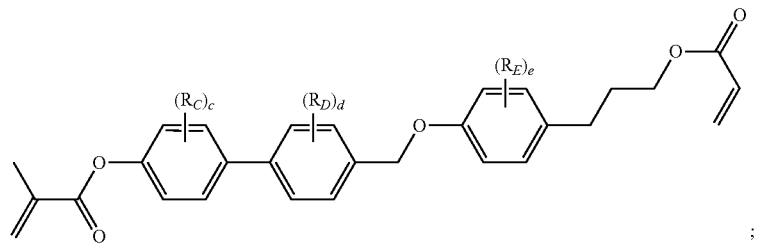
I-2-35
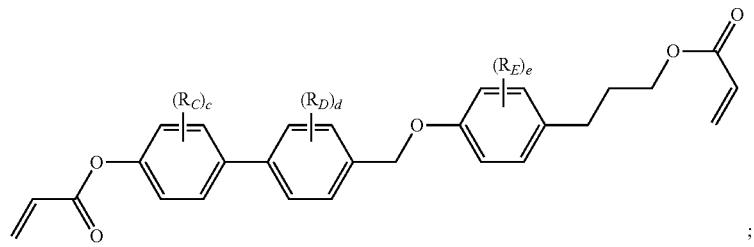
I-2-36
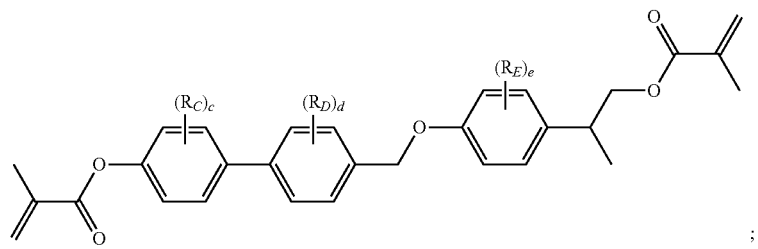
I-2-37
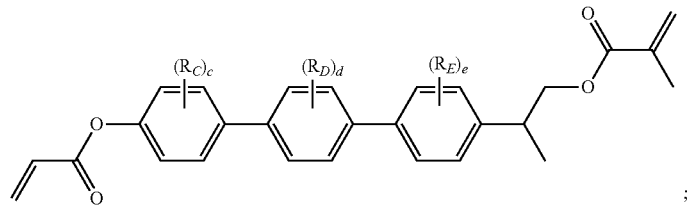
I-2-38

-continued
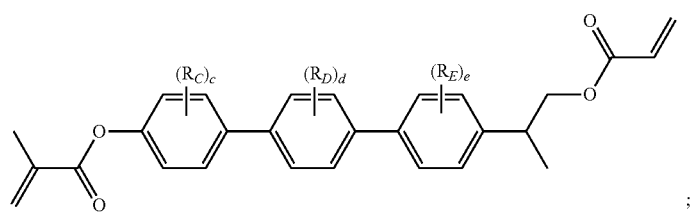
I-2-39
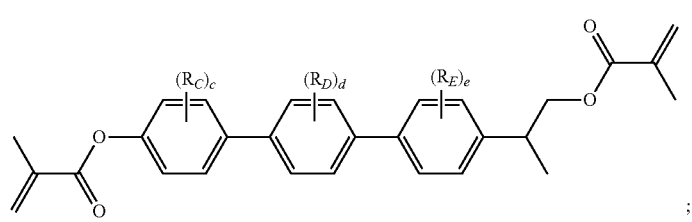
I-2-40
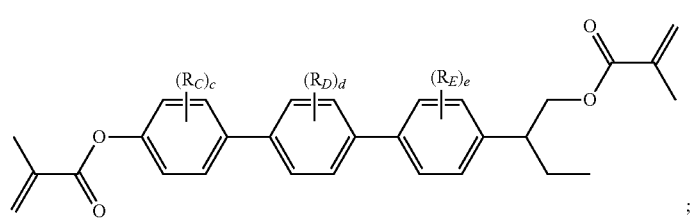
I-2-41
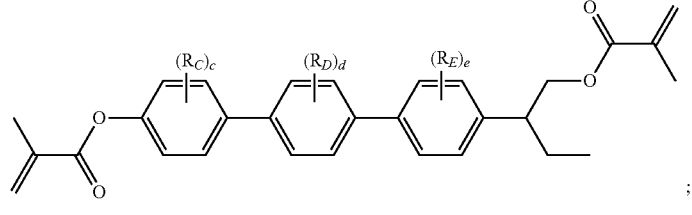
I-2-42
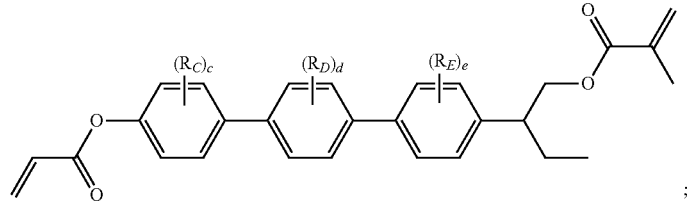
I-2-43
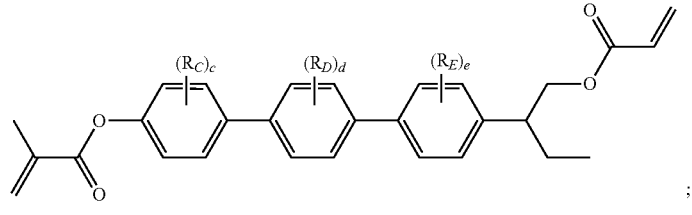
I-2-44
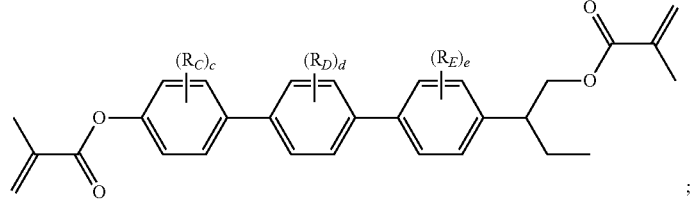
I-2-45
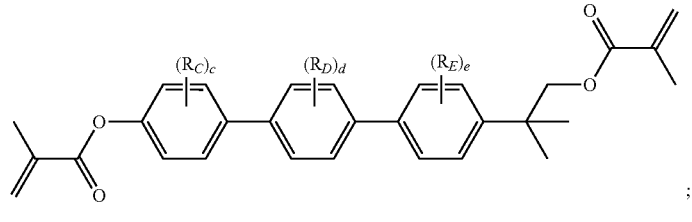

-continued
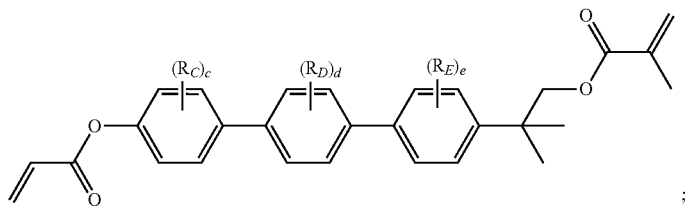
I-2-46
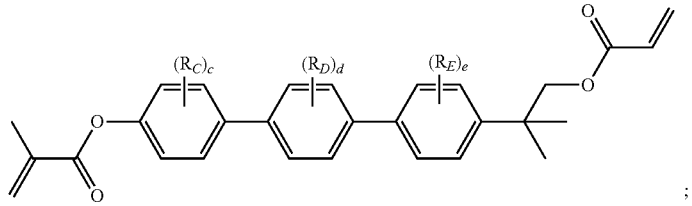
I-2-47
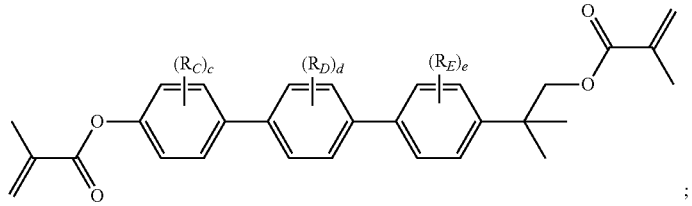
I-2-48
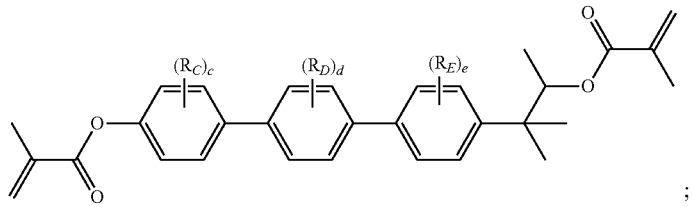
I-2-49
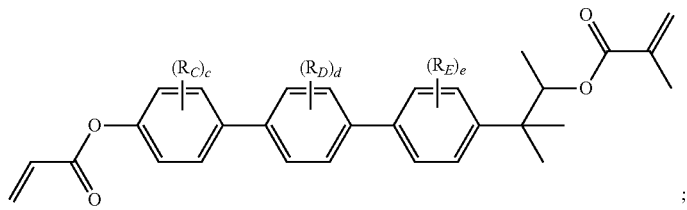
I-2-50
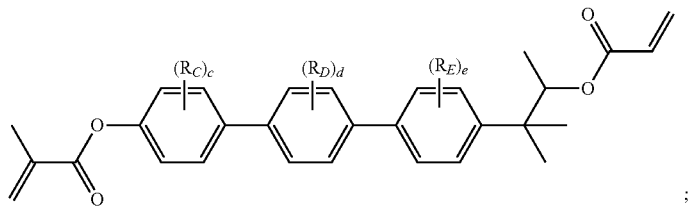
I-2-51
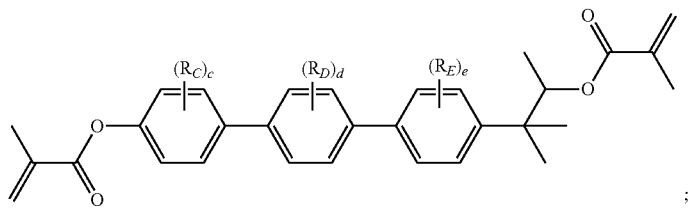
I-2-52

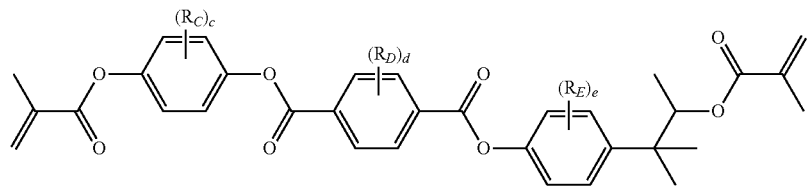
I-2-53
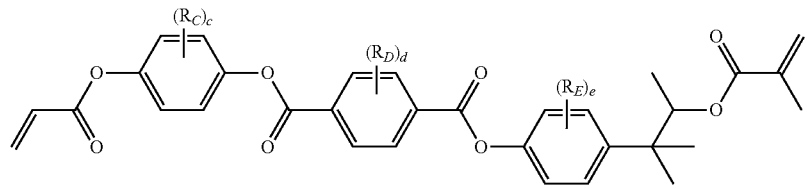
I-2-54
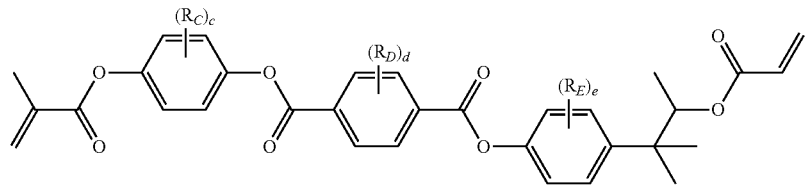
I-2-55
; and
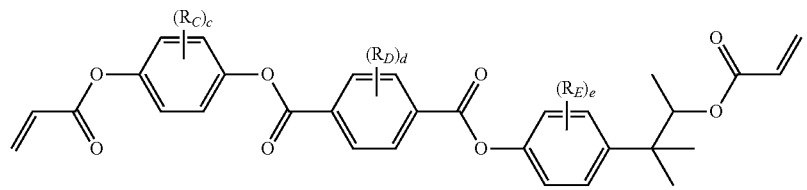
I-2-56
,
In which, $R_C$, $R_D$, $R_E$, c, d and e each can be same or different and has one of the meanings indicated above or below.
In some embodiments of the present invention, the compound of general formula I-3 is selected from a group consisting of the following compounds:
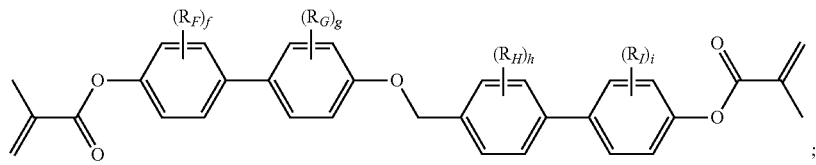
I-3-1
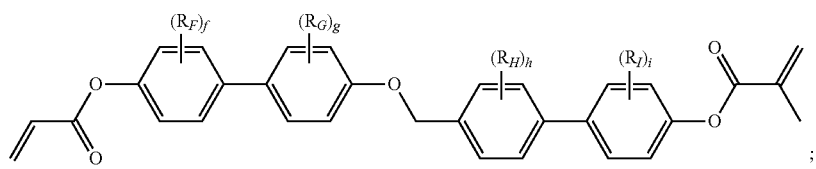
I-3-2
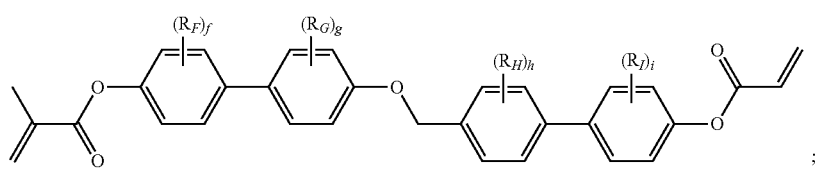
I-3-3

I-3-4
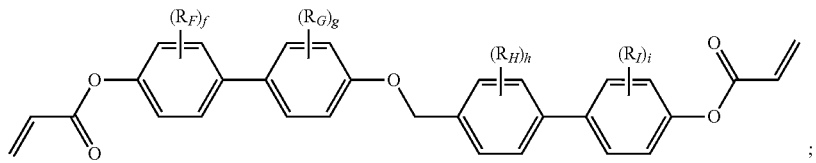
I-3-5
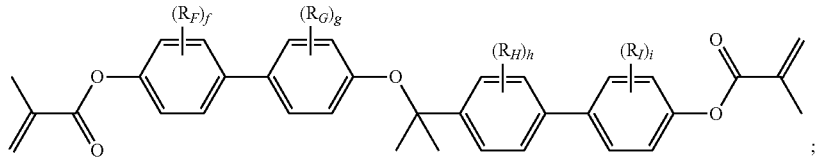
I-3-6
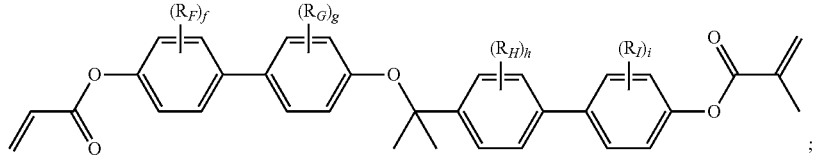
I-3-7
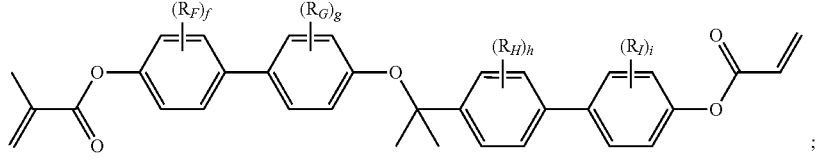
I-3-8
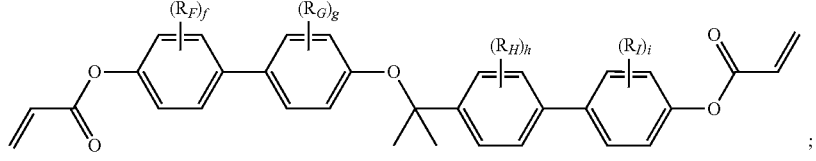
I-3-9
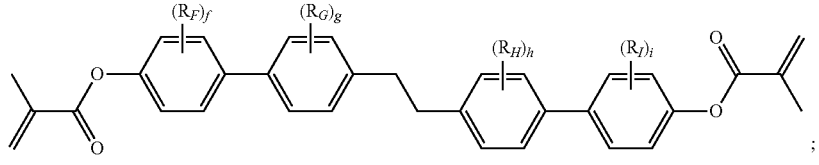
I-3-10
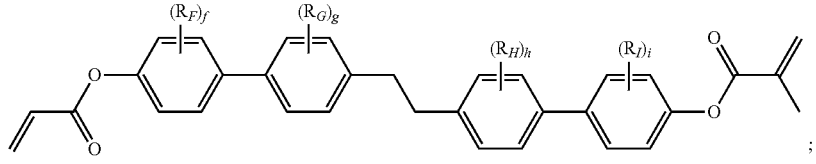
I-3-11
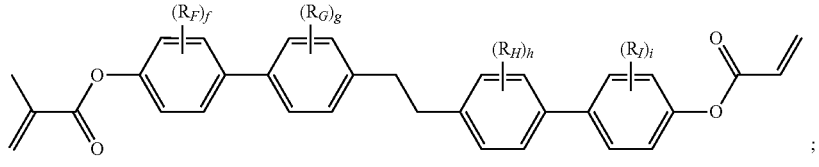
I-3-12
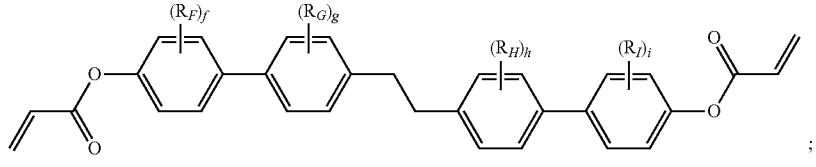

-continued
I-3-13
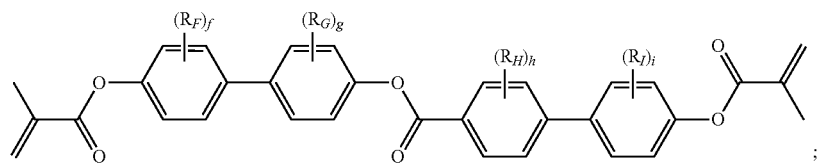
I-3-14
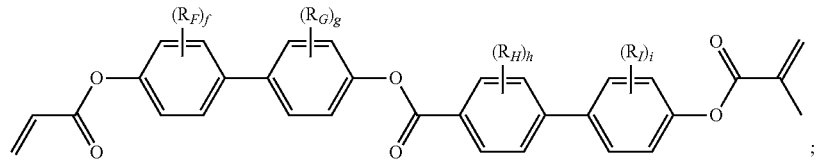
I-3-15
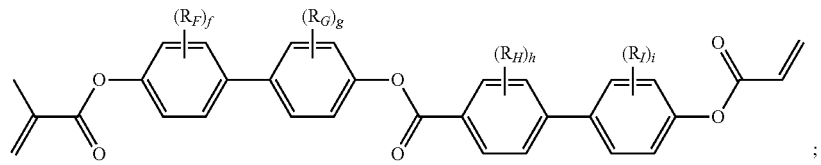
I-3-16
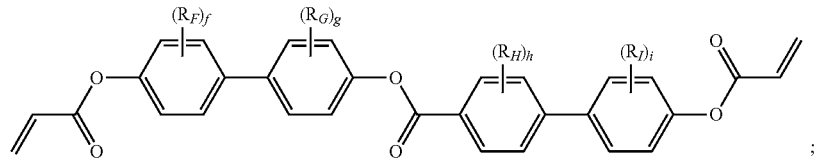
I-3-17
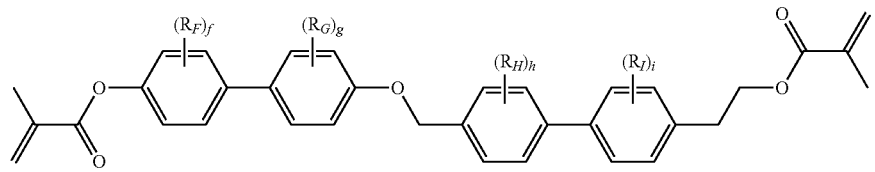
I-3-18
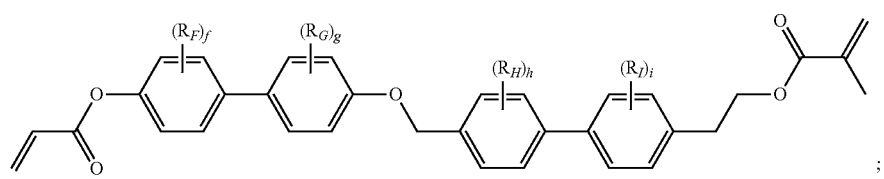
I-3-19
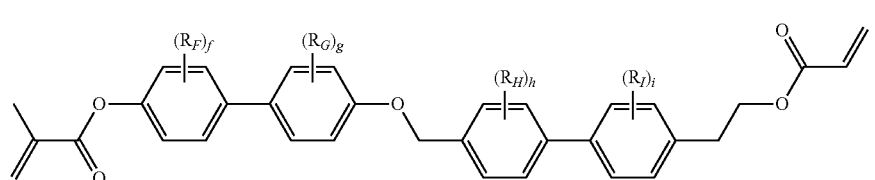
; and
I-3-20
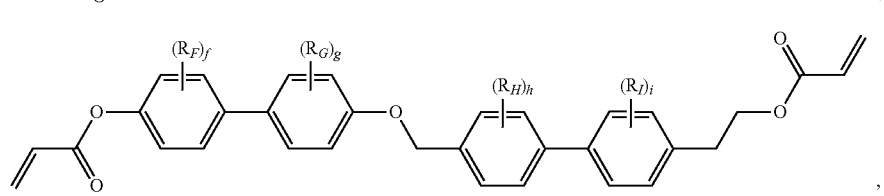
,
In which, $R_F$, $R_G$, $R_H$, $R_I$, f, g, h and i each can be same or different and has one of the meanings indicated above or below.
In general formula I-1-1 to general formula I-1-24, general formula I-2-1 to general formula-2-56, and general formula I-3-1 to general formula I-3-20 above,
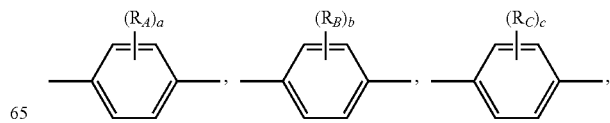

-continued

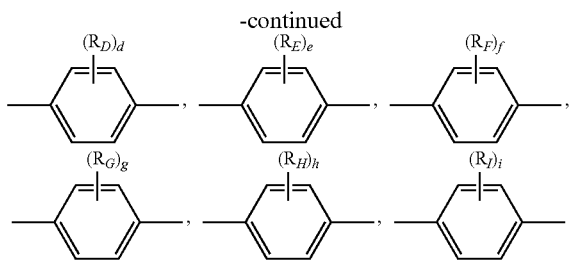

each independently preferably represents a group selected from a group consisting of the following groups:

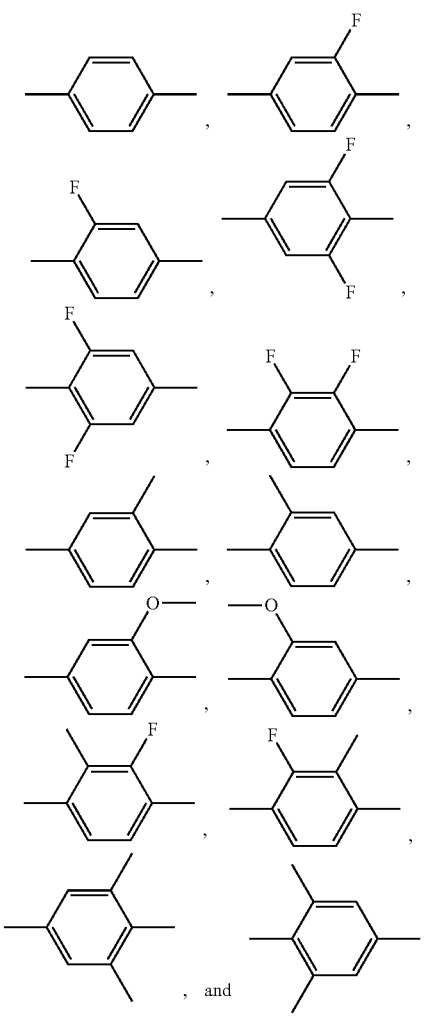

, and

In some embodiments of the present invention, the polymerizable component B provides 0.01-5% of the total weight of the PSA-type liquid crystal composition; preferably, the polymerizable component B provides 0.05-4% of the total weight of the PSA-type liquid crystal composition; further preferably, the polymerizable component B provides 0.1-3% of the total weight of the PSA-type liquid crystal composition.

In some embodiments of the present invention, the host liquid crystal A comprises one or more compounds of general formula M:

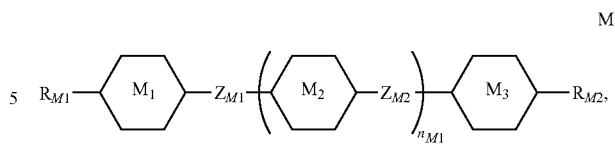

in which, $R_{M1}$ and $R_{M2}$ each independently represents a $C_{1-12}$ linear or branched alkyl,

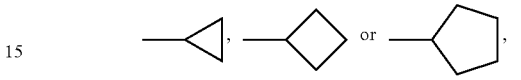

one or more nonadjacent —$CH_2$— in the $C_{1-12}$ linear or branched alkyl can each be independently replaced by —CH=CH—, —C≡C—, —O—, —CO—, —CO—O— or —O—CO—;

ring $M_1$, ring $M_2$ and ring $M_3$ each independently represents

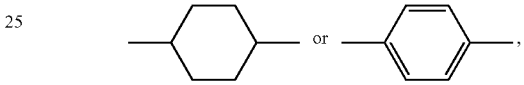

wherein one or more —$CH_2$— in

can be replaced by —O—, and at most one —H on

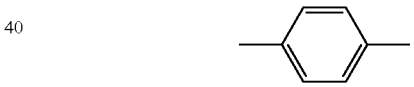

can be substituted by halogen;

$Z_{M1}$ and $Z_{M2}$ each independently represents a single bond, —CO—O—, —O—CO—, —$CH_2$O—, —O$CH_2$—, —CH=CH—, —C≡C—, —$CH_2CH_2$—, —$(CH_2)_4$—, —$CF_2$O—, —OC$F_2$— or —$CF_2CF_2$—; and $n_{M1}$ represents 0, 1, 2 or 3, and when $n_{M1}$=2 or 3, ring $M_2$ can be same or different, and $Z_{M2}$ can be same or different.

In some embodiments of the present invention, in the compound of general formula M, $R_{M1}$ and $R_{M2}$ are preferably each independently a $C_{1-10}$ linear alkyl, a $C_{1-9}$ linear alkoxy, or a $C_{2-10}$ linear alkenyl; further preferably, a $C_{1-8}$ linear alkyl, a $C_{1-7}$ linear alkoxy, or a $C_{2-8}$ linear alkenyl; still further preferably, a $C_{1-5}$ linear alkyl, a $C_{1-4}$ linear alkoxy, or a $C_{2-5}$ linear alkenyl.

In some embodiments of the present invention, preferably, $R_{M1}$ and/or $R_{M2}$ are each independently a $C_{2-8}$ linear alkenyl, further preferably, a $C_{2-5}$ linear alkenyl.

In some embodiments of the present invention, preferably, one of $R_{M1}$ and $R_{M2}$ is a $C_{2-5}$ linear alkenyl, while the other is a $C_{1-5}$ linear alkyl.

In some embodiments of the present invention, both $R_{M1}$ and $R_{M2}$ are preferably a $C_{1-8}$ linear alkyl, or a $C_{1-7}$ linear alkoxy; further preferably, a $C_{1-5}$ linear alkyl, or a $C_{1-4}$ linear alkoxy.

In some embodiments of the present invention, preferably, one of $R_{M1}$ and $R_{M2}$ is a $C_{1-5}$ linear alkyl, while the other is a $C_{1-5}$ linear alkyl or a $C_{1-4}$ linear alkoxy; further preferably, both $R_{M1}$ and $R_{M2}$ are a $C_{1-5}$ linear alkyl.

The alkenyl group in the present invention is preferably selected from the groups represented by any one of formula (V1) to formula (V9), particularly formula (V1), formula (V2), formula (V8) or formula (V9). The groups represented by formula (V1) to formula (V9) are as follows:

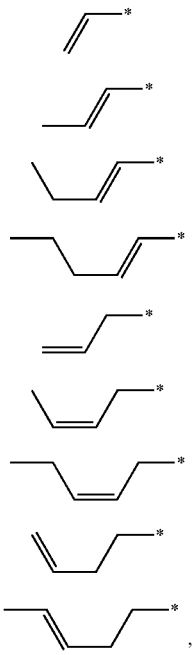

(V1)
(V2)
(V3)
(V4)
(V5)
(V6)
(V7)
(V8)
(V9)

in which, * represents bound carbon atom in the ring structure.

The alkenoxy group in the present invention is preferably selected from the groups represented by any one of formula (OV1) to formula (OV9), particularly formula (OV1), formula (OV2), formula (OV8) or formula (OV9). The groups represented by formula (OV1) to formula (OV9) are as follows:

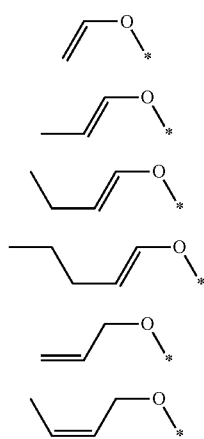

(OV1)
(OV2)
(OV3)
(OV4)
(OV5)
(OV6)

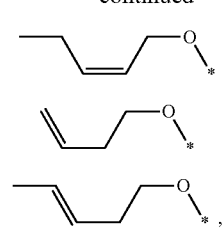

(OV7)
(OV8)
(OV9)

in which, * represents bound carbon atom in the ring structure.

In some embodiments of the present invention, the compound of general Formula M is selected from a group consisting of the following compounds:

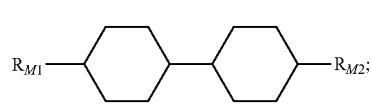

M1

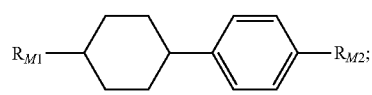

M2

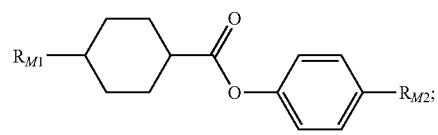

M3

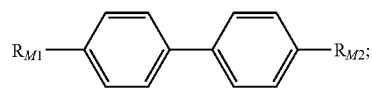

M4

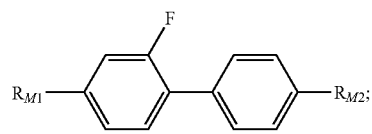

M5

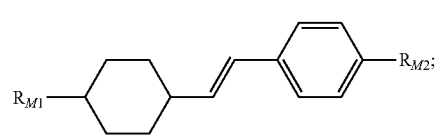

M6

M7

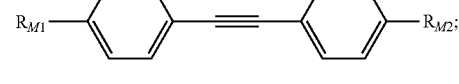

M8

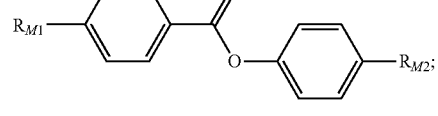

M9

M10

In some embodiments of the present invention, the compound of general formula M is preferably selected from a group consisting of the compounds of general formula M1, general formula M2, general formula M4, general formula M9, general formula M11, general formula M20 and general formula M21.

The preferred lower limit of the content of the compound of general formula M is 1%, 10%, 20%, 30%, 40% or 50%, relative to the total weight of the PSA-type liquid crystal composition of the present invention; and the preferred upper limit of the content of the compound of general formula M is 95%, 85%, 75%, 65%, 60%, 55%, 45%, 35% or 25%, relative to the total weight of the PSA-type liquid crystal composition of the present invention.

Regarding the content of the compound of general formula M, the lower and the upper limits thereof are preferably higher when it is desired to maintain the PSA-type liquid crystal composition of the present invention with lower viscosity and shorter response time; further, the lower and the upper limits thereof are preferably higher when it is desired to maintain the PSA-type liquid crystal composition of the present invention with higher clearing point and good temperature stability; the lower and the upper limits thereof are preferably lowered in order to maintain lower driving voltage and make the absolute value of the dielectric anisotropy larger.

With emphasis in reliability, both $R_{M1}$ and $R_{M2}$ are preferably each independently alkyl; with emphasis in reducing the volatility of the compound, both $R_{M1}$ and $R_{M2}$ are preferably each independently alkoxy; and with emphasis in reducing the viscosity, at least one of $R_{M1}$ and $R_{M2}$ is preferably alkenyl.

In some embodiments of the present invention, the host liquid crystal A at least comprises one or more compounds selected from a group consisting of the compounds of general formula M1-a, general formula M1-b and general formula M1-c:

In some embodiments of the present invention, the host liquid crystal A further comprises one or more compounds of general formula N:

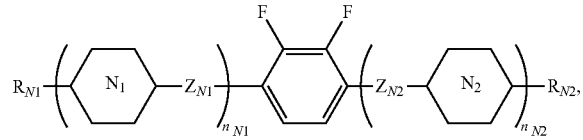

in which $R_{N1}$ and $R_{N2}$ each independently represents a $C_{1-12}$ linear or branched alkyl,

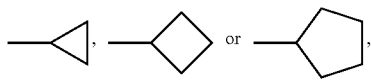

one or more nonadjacent —CH$_2$— in the $C_{1-12}$ linear or branched alkyl can each be independently replaced by —CH=CH—, —C≡C—, —O—, —CO—, —CO—O— or —O—CO—, and one or more —H presented on these groups can each be independently substituted by —F or —Cl;

ring

and ring

each independently represents

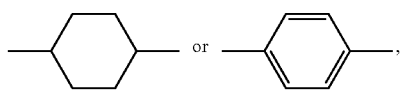

wherein one or more —CH$_2$— in

can be replaced by —O—, one or at most two single bonds in the ring can be replaced by double bond, wherein one or more —H on

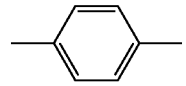

can be substituted by —F or —Cl, and one or more —CH= in the ring can be replaced by —N=;

$Z_{N1}$ and $Z_{N2}$ each independently represents a single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—; and $n_{N1}$ represents 0, 1, 2 or 3, $n_{N2}$ represents 0 or 1, and $0 \leq n_{N1}+n_{N2} \leq 3$, and when $n_{N1}=2$ or 3, ring

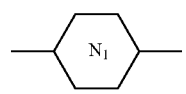

can be same or different, and $Z_{N1}$ can be same or different.

In some embodiments of the present invention, in the compound of general formula N, $R_{N1}$ and $R_{N2}$ are preferably each independently a $C_{1-8}$ alkyl or alkoxy, or a $C_{2-8}$ alkenyl or alkenoxy; further preferably, a $C_{1-5}$ alkyl or alkoxy, or a $C_{2-5}$ alkenyl or alkenoxy;

$R_{N1}$ is further preferably a $C_{1-5}$ alkyl, or a $C_{2-5}$ alkenyl, still further preferably, a $C_{2-5}$ alkyl or a $C_{2-3}$ alkenyl;

$R_{N2}$ is further preferably a $C_{1-4}$ alkoxy; and ring

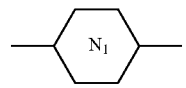

and ring

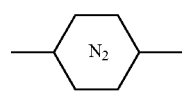

are preferably

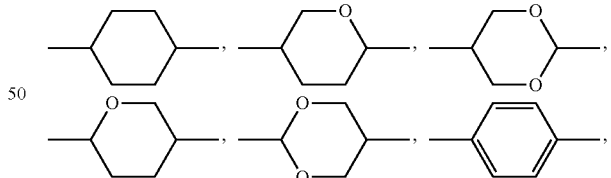

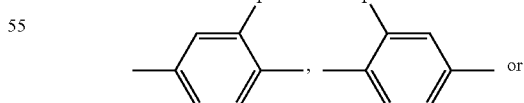

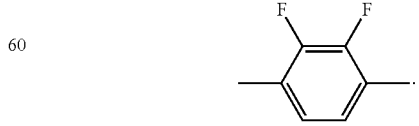

In some embodiments of the present invention, the compound of general formula N is selected from a group consisting of the following compounds:

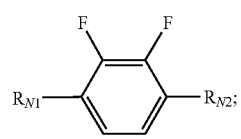 N1
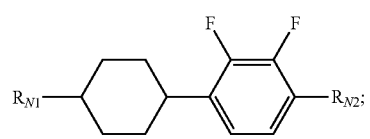 N2
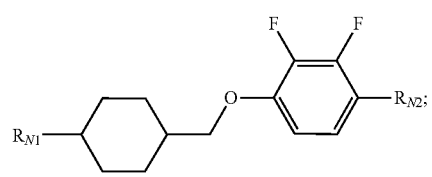 N3
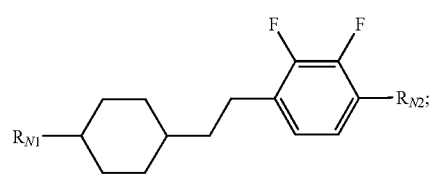 N4
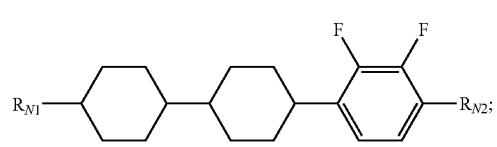 N5
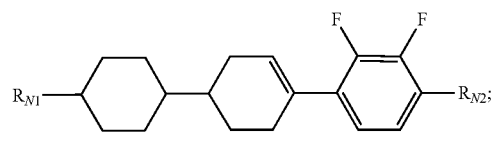 N6
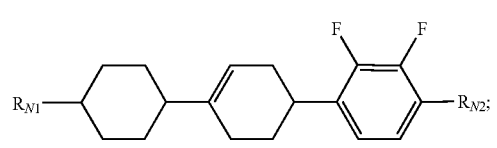 N7
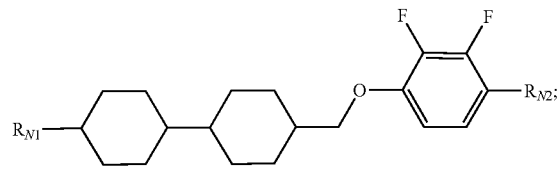 N8
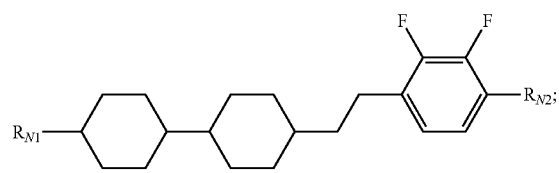 N9
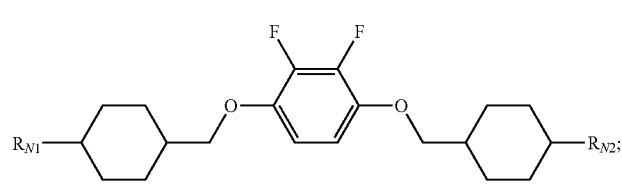 N10

-continued
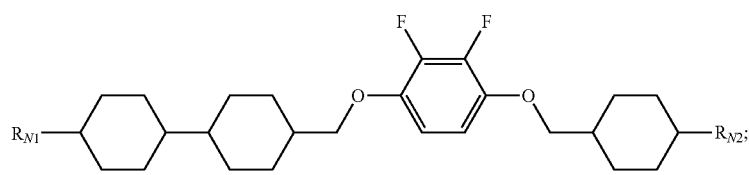
N11
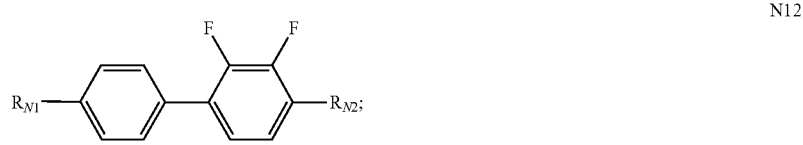
N12
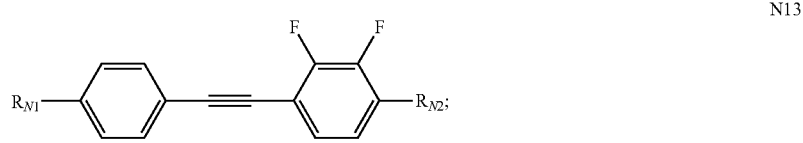
N13
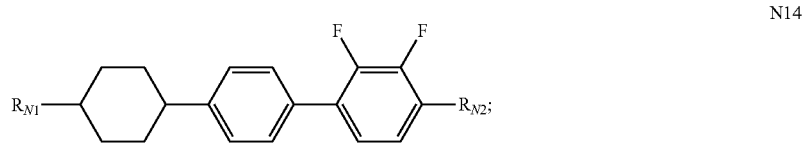
N14
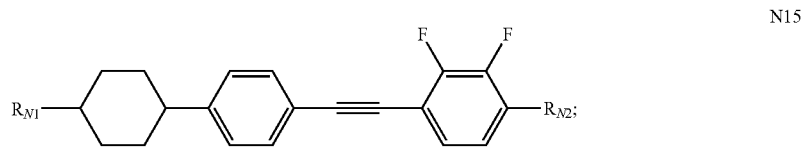
N15
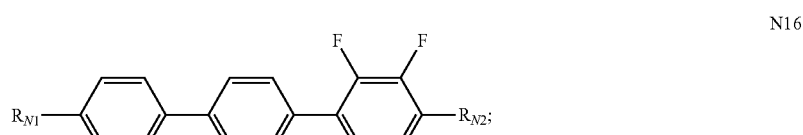
N16
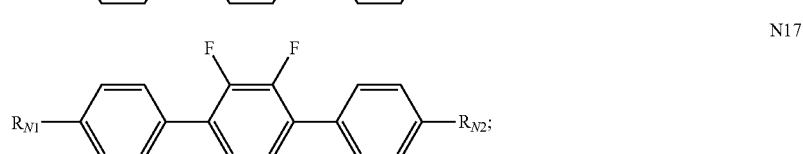
N17
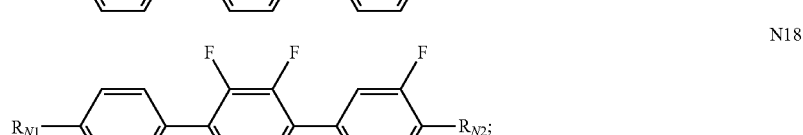
N18
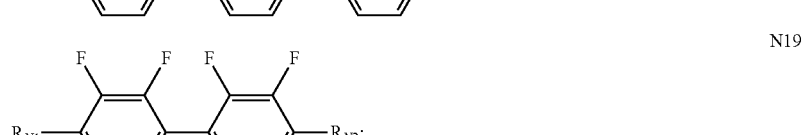
N19
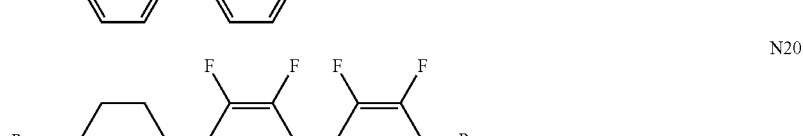
N20
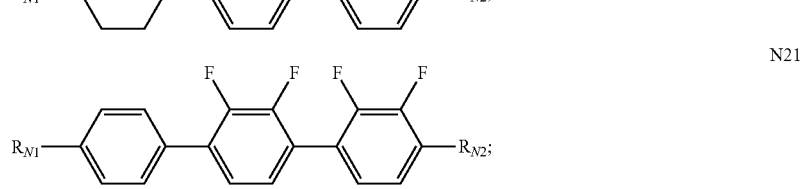
N21

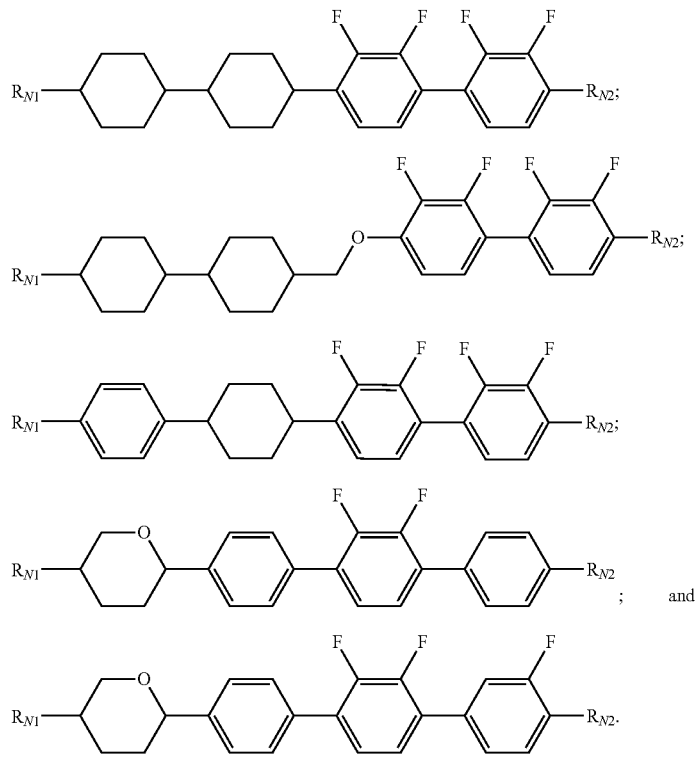

In some embodiments of the present invention, the compound of general Formula N is preferably selected from a group consisting of the compounds of general formula N2, general formula N3, general formula N5, general formula N8, general formula N12 and general formula N14.

In some embodiments of the present invention, the PSA-type liquid crystal composition of the present invention preferably comprises one or more compounds of general Formula N; more preferably one or more compounds selected from a group consisting of the compounds of general formula N2 to general formula N7, and general formula N10 to general Formula N21; and further preferably two to ten compounds selected from a group consisting of the compounds of general formula N2 to general formula N7, and general formula N10 to general Formula N21.

Regarding the preferred content of the compound of general formula N: the preferred lower limit of the content of the compound of general Formula N is 0.1%, 0.5%, 1%, 3%, 5%, 10%, 13%, 15%, 18%, 20%, 23%, 25%, 28%, 30%, 33%, 35%, 38% or 40%, relative to the total weight of the PSA-type liquid crystal composition of the present invention; and the preferred upper limit of the content of the compound of general formula N is 95%, 90%, 88%, 85%, 83%, 80%, 78%, 75%, 73%, 70%, 68%, 65%, 63%, 60%, 55%, 50%, 40%, 38%, 35%, 33%, 30%, 28%, 25%, 23%, 20%, 18%, 15% or 10%, relative to the total weight of the PSA-type liquid crystal composition of the present invention.

Regarding the preferred content of the compound of general formula N: the lower and the upper limits thereof are preferably lower when it is desired to maintain the PSA-type liquid crystal composition of the present invention with lower viscosity and shorter response time; further, the lower and the upper limits thereof are preferably lower when it is desired to maintain the PSA-type liquid crystal composition of the present invention with higher clearing point and good temperature stability; furthermore, the lower and the upper limits thereof are preferably increased in order to maintain lower driving voltage and make the absolute value of the dielectric anisotropy larger.

In some embodiments of the present invention, the PSA-type liquid crystal composition further comprises one or more additives known to the skilled artisan in the art and described in the literatures.

Stabilizers which can be added to the PSA-type liquid crystal composition according to the present invention are mentioned below.

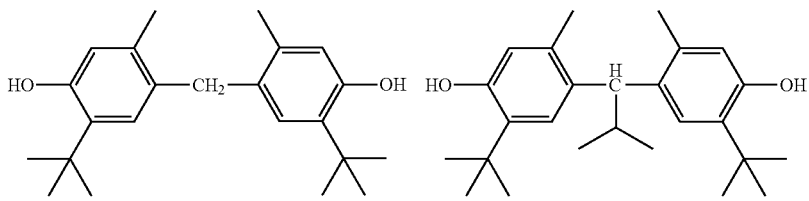

-continued
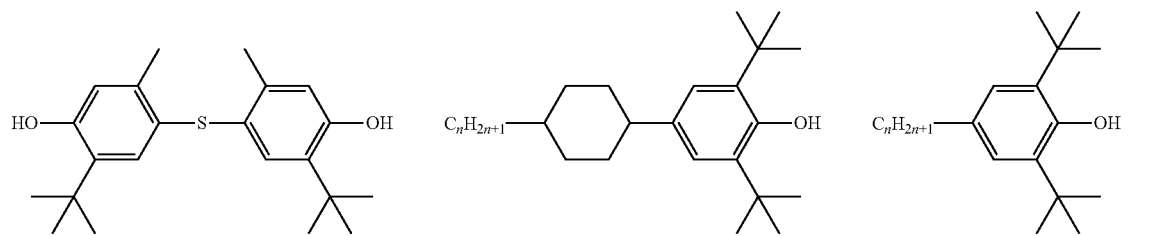
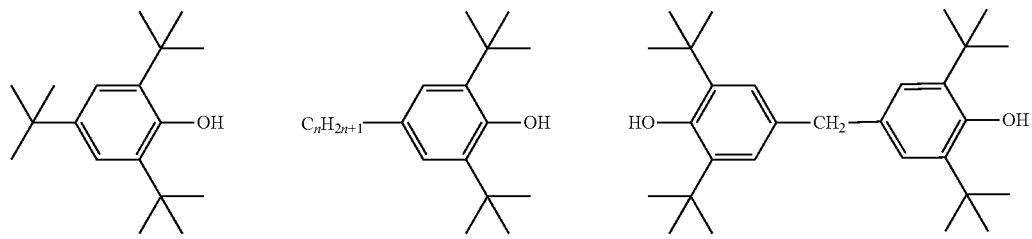
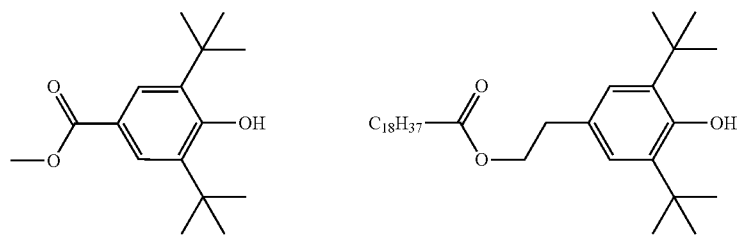
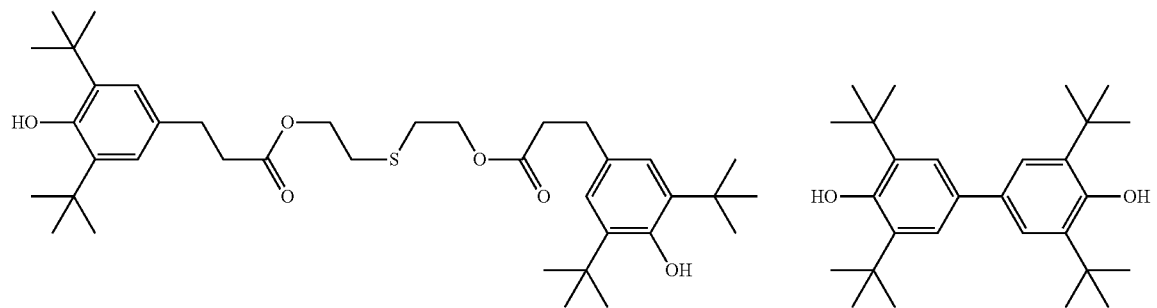
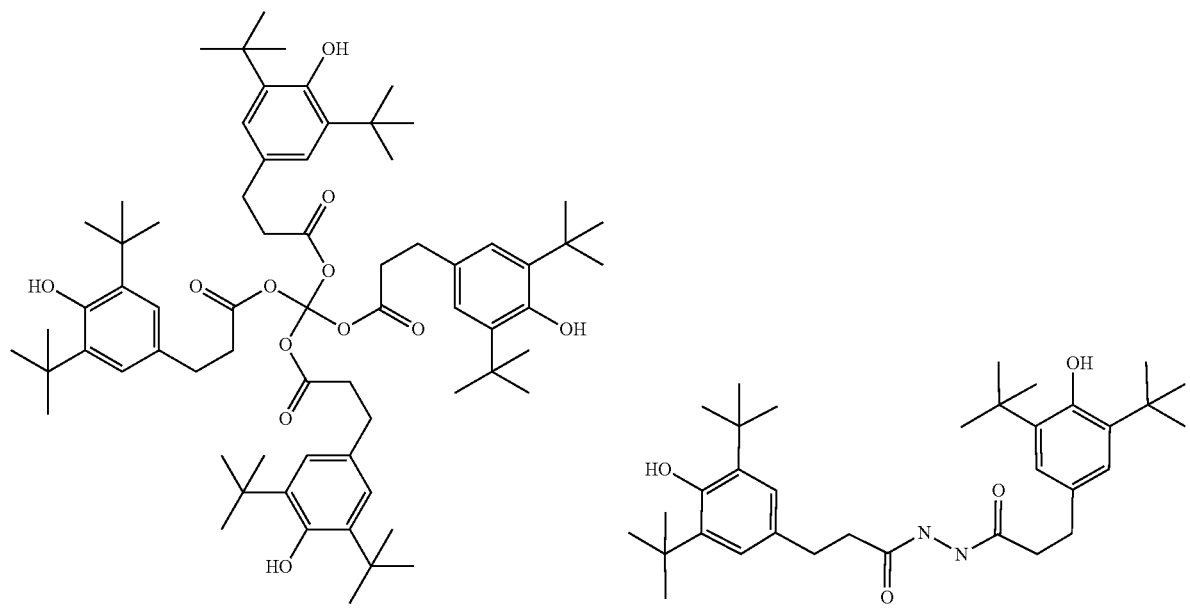

-continued
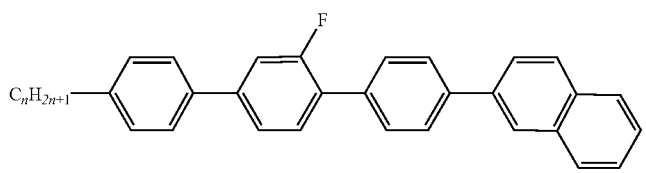
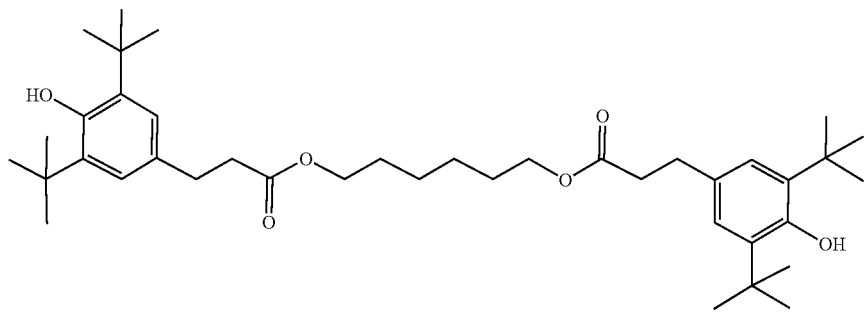
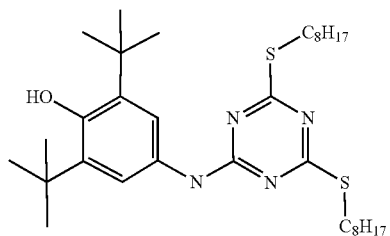
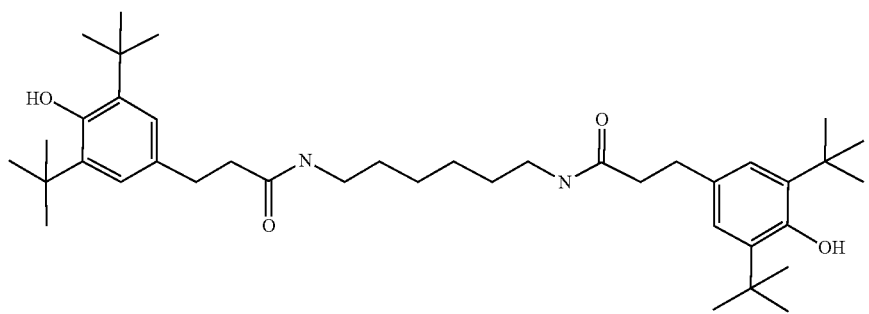
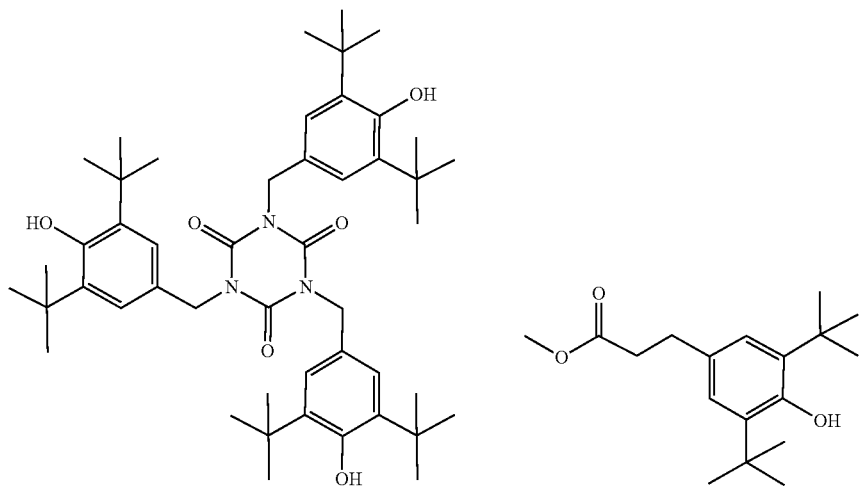

-continued
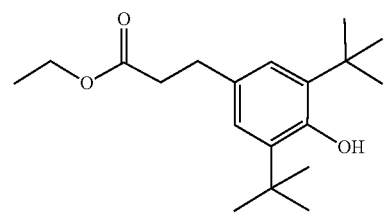
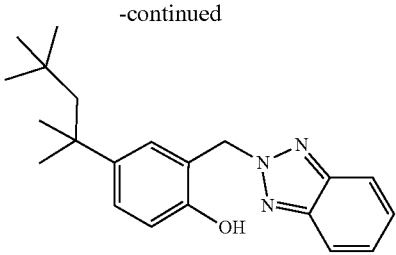
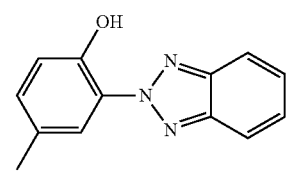
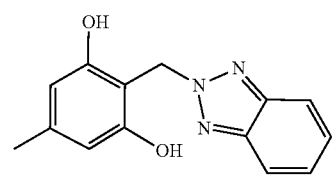
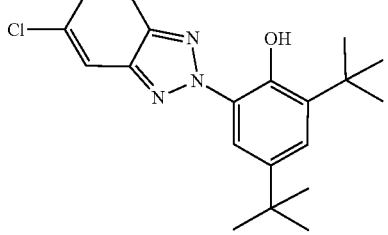
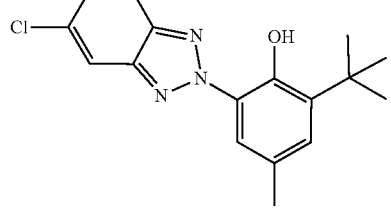
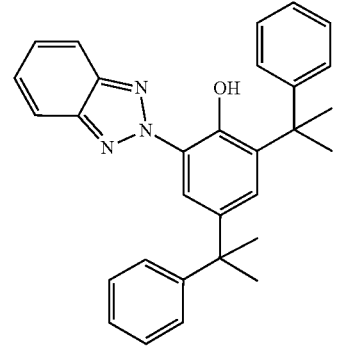
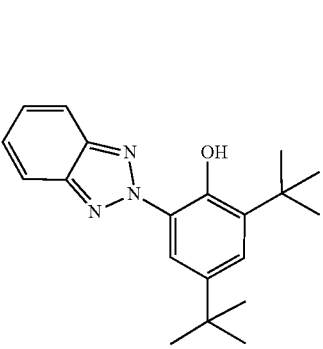
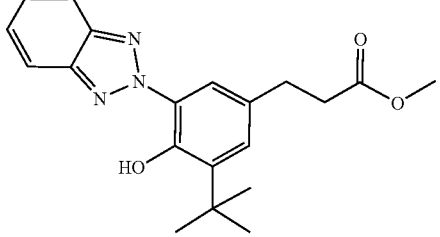
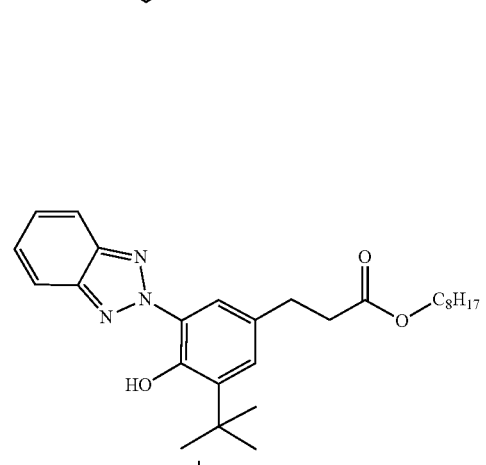
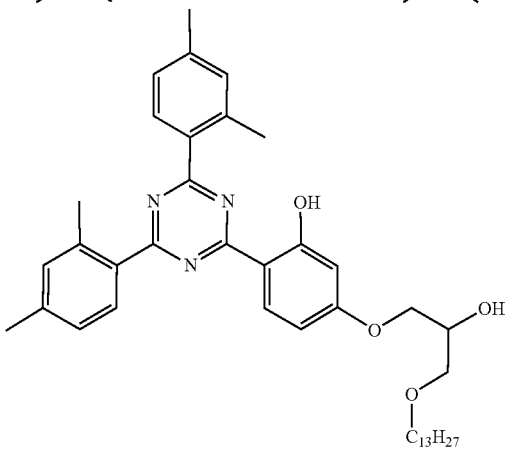
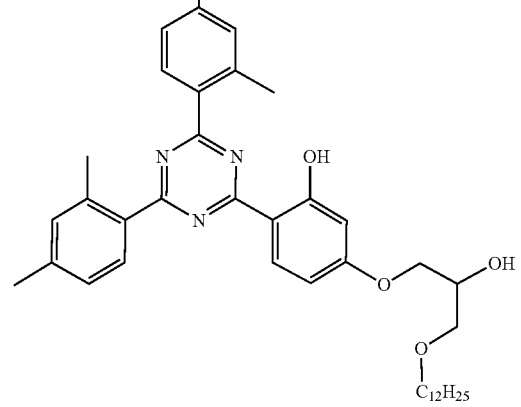
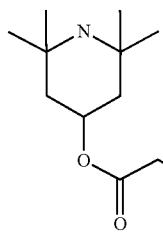
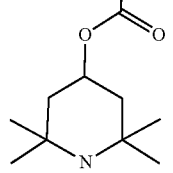

-continued

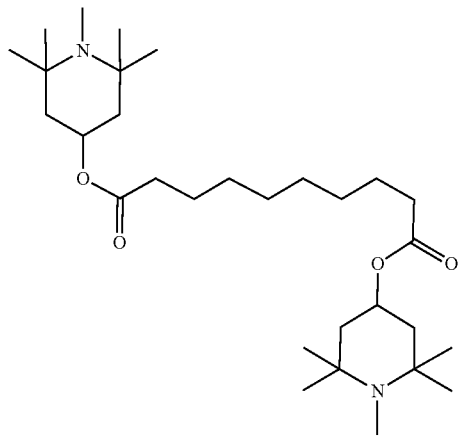

The stabilizer is preferably selected from the stabilizers as shown below.

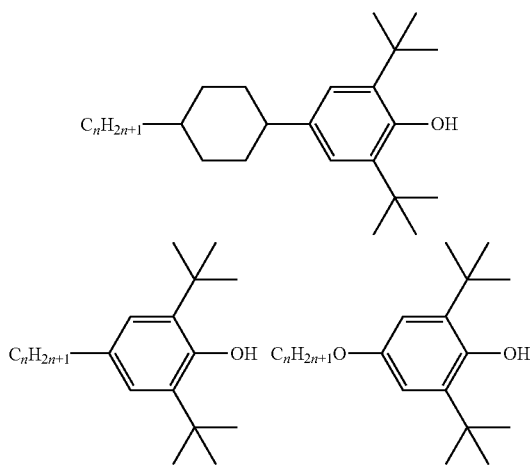

In some embodiments of the present invention, preferably, the stabilizer provides 0-5% of the total weight of the PSA-type liquid crystal composition; more preferably, the stabilizer provides 0-1% of the total weight of the PSA-type liquid crystal composition; particularly preferably, the stabilizer provides 0.01-0.1% of the total weight of the PSA-type liquid crystal composition.

In another aspect, the present invention further provides a liquid crystal display device comprising the PSA-type liquid crystal composition provided by the present invention.

Beneficial Effects

By improving the functional groups of the polymerizable compound (including a linking group between the rings, a substituent group on the ring, and a linking group between the polymerizable group and the ring), the PSA-type liquid crystal composition provided by the present invention effectively improves the intersolubility between the polymerizable component and the host liquid crystal, such that the liquid crystal composition can maintain a nematic phase state without crystallization even in a low-temperature environment, and there is no crystallization and the performance changes caused thereby during transportation and manufacturing. The PSA-type liquid crystal composition of the present invention has extremely low viscosity, which can meet the requirements of a liquid crystal display device with a fast response speed (such as a 3D display). In addition, the polymerizable compound of the present invention has an appropriate polymerization speed which is not too fast or too slow during photopolymerization, such that an uniform and stable alignment control can be achieved, and a liquid crystal display device in which image sticking and display unevenness occur less or not at all can be provided. In conclusion, the PSA-type liquid crystal composition provided by the present invention has better intersolubility, cannot be crystallized at a low-temperature environment, can form a stable pretilt angle, and inhibits the occurrence of a display defect, such as Zara Particle, during the polymerization.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

Unless specifically indicated, in the present invention, all ratios are weight ratios, and all temperatures are degree centigrade.

For the convenience of the expression, the group structures of the liquid crystal compositions in the following Examples are represented by the codes listed in Table 1':

TABLE 1'

Codes of the group structures of the liquid crystal compounds

| Unit structure of group | Code | Name of the group |
|---|---|---|
|  | C | 1,4-cyclohexylidene |
|  | C(5) | cyclopentyl |

TABLE 1'-continued

Codes of the group structures of the liquid crystal compounds

| Unit structure of group | Code | Name of the group |
|---|---|---|
| 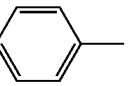 | P | 1,4-phenylene |
| 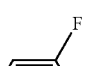 | G | 2-fluoro-1,4-phenylene |
| 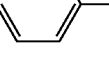 | W | 2,3-difluoro-1,4-phenylene |
| —$CH_2CH_2$— | 2 | ethyl bridge bond |
| —$OCF_3$ | OCF3 | trifluoromethoxy |
| —F | F | fluoro substituent |
| —O— | O | oxygen substituent |
| —$CF_2O$— | Q | difluoromethoxy |
| —COO— | E | ester bridge bond |
| —$C_nH_{2n+1}$ | n (n represents a positive integer of 1-12) | alkyl |
| —CH=CH— or —CH=$CH_2$ | V | ethenyl |

Take the compound with the following structural formula as an example:

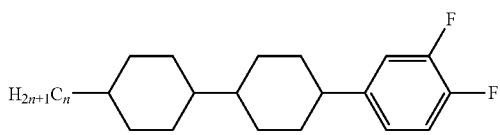

Represented by the codes listed in Table A, this structural formula can be expressed as nCCGF, in which, n in the code represents the number of the carbon atoms of the alkyl group on the left, for example, n is "3", meaning that the alkyl is —$C_3H_7$; C in the code represents cyclohexyl, G represent 2-fluoro-1,4-phenylene, F represents fluorine.

The abbreviated codes of the test items in the following Examples are represented as follows:

| | |
|---|---|
| Cp (° C.) | clearing point (nematic-isotropy phases transition temperature) |
| $\Delta n$ | optical anisotropy (589 nm, 25° C.) |
| $\Delta \varepsilon$ | dielectric anisotropy (1 KHz, 25° C.) |
| $\gamma 1$ | rotational viscosity (mPa * s, at 25° C.) |
| LTS | low-temperature stability (° C., a temperature at which a storage is performed for 500 h without crystallization) |

In which,

The optical anisotropy is tested and obtained by using an Abbe Refractometer under a sodium lamp (589 nm) light source at 25° C.

$\Delta \varepsilon = \varepsilon_I - \varepsilon_\perp$, in which, $\varepsilon_I$ is a dielectric constant parallel to the molecular axis, $\varepsilon_\perp$ is a dielectric constant perpendicular to the molecular axis, with the test conditions: 25° C., 1 KHz, TN90-type test cell with a cell gap of 7 μm.

$\gamma 1$ is tested by a TOYO6254-type liquid crystal physical property evaluation system; the test temperature is 25° C., and the test voltage is 90 V.

The components used in the following Examples can either be synthesized by method known in the art or be obtained commercially. The synthetic techniques are conventional, and each of the obtained liquid crystal compounds is tested to meet the standards of electronic compound.

Example 1 of Host Liquid Crystal

The nematic host liquid crystal Host 1 is prepared according to Table 1 below.

TABLE 1

Composition and performance parameters of Host 1

| Code of component | Weight percentage | Performance parameters | |
|---|---|---|---|
| 3CC2 | 20 | $\Delta n$ | 0.097 |
| 3CCV1 | 9 | $\Delta \varepsilon$ | −3.3 |
| 4CC3 | 5 | Cp | 75 |
| 5CC3 | 8 | $\gamma 1$ | 86 |
| 3CCP1 | 6 | LTS | <−30° C. |
| 3CWO2 | 13 | | |
| 3PWO2 | 10 | | |
| 2CPWO2 | 8 | | |
| 3CCWO2 | 11 | | |
| 3CPWO2 | 10 | | |
| Total | 100 | | |

Example 2 of Host Liquid Crystal

The nematic host liquid crystal Host 2 is prepared according to Table 2 below.

TABLE 2

Composition and performance parameters of Host 2

| Code of component | Weight percentage | Performance parameters | |
|---|---|---|---|
| 3CC2 | 24 | $\Delta n$ | 0.109 |
| 4CC3 | 3 | $\Delta \varepsilon$ | −3.2 |
| 5PP1 | 12 | Cp | 75 |
| 3PWO2 | 10 | $\gamma 1$ | 95 |
| 5CC3 | 4 | LTS | <−30° C. |
| 3C1OWO2 | 4 | | |
| 3CCP1 | 2 | | |
| 3CPP2 | 15 | | |
| 3CPWO2 | 8 | | |
| 2CC1OWO2 | 7 | | |
| 3CC1OWO2 | 11 | | |
| Total | 100 | | |

Example 3 of Host Liquid Crystal

The nematic host liquid crystal Host 3 is prepared according to Table 3 below.

TABLE 3

Composition and performance parameters of Host 3

| Code of component | Weight percentage | Performance parameters | |
|---|---|---|---|
| 3CC2 | 24 | Δn | 0.1 |
| 3CPO2 | 3 | Δε | −3.3 |
| 4CC3 | 6 | Cp | 75 |
| 5PP1 | 16 | γ1 | 105 |
| 5CC3 | 5 | LTS | <−30° C. |
| 3CPP2 | 6 | | |
| 3C1OWO2 | 6 | | |
| 2CPWO2 | 5 | | |
| 3CCWO2 | 5 | | |
| 3CPWO2 | 8 | | |
| 2CC1OWO2 | 6 | | |
| 3CC1OWO2 | 10 | | |
| Total | 100 | | |

Example 4 of Host Liquid Crystal

The nematic host liquid crystal Host 4 is prepared according to Table 4 below.

TABLE 4

Composition and performance parameters of Host 4

| Code of component | Weight percentage | Performance parameters | |
|---|---|---|---|
| 3CPWO2 | 10 | Δn | 0.109 |
| 3C1OWO2 | 11.5 | Δε | −3 |
| 2CC1OWO2 | 8 | Cp | 74.3 |
| 3CC1OWO2 | 9 | γ1 | 96 |
| 2C1OWO2 | 5 | LTS | <−30° C. |
| 3CPP2 | 13 | | |
| 3CPPC3 | 1 | | |
| 3CC2 | 22 | | |
| 2CPP2 | 7 | | |
| 5PP1 | 13.5 | | |
| Total | 100 | | |

Example 5 of Host Liquid Crystal

The nematic host liquid crystal Host 5 is prepared according to Table 5 below.

TABLE 5

Composition and performance parameters of Host 5

| Code of component | Weight percentage | Performance parameters | |
|---|---|---|---|
| 3C1OWO2 | 6.5 | Δn | 0.1 |
| 2CC1OWO2 | 3.5 | Δε | −3.5 |
| 3CC1OWO2 | 8 | Cp | 95 |
| 3CCWO2 | 6 | γ1 | 126 |
| 5CCWO2 | 3 | LTS | <−40° C. |
| 2CCWO2 | 3.5 | | |
| 5C1OWO2 | 8 | | |
| 2C1OWO2 | 3.5 | | |
| 5C1OWO2 | 4.5 | | |
| 3CPWO2 | 2 | | |
| 3CPO1 | 4 | | |
| 3CPP2 | 13.5 | | |
| 3CPPC3 | 2 | | |
| 3CGPC3 | 1 | | |
| 3CC2 | 15 | | |
| 5CC2 | 3 | | |

TABLE 5-continued

Composition and performance parameters of Host 5

| Code of component | Weight percentage | Performance parameters |
|---|---|---|
| 4CC3 | 5 | |
| 2CPP2 | 5 | |
| 3PPO2 | 3 | |
| Total | 100 | |

Example 6 of Host Liquid Crystal

The nematic host liquid crystal Host 6 is prepared according to Table 6 below.

TABLE 6

Composition and performance parameters of Host 6

| Code of component | Weight percentage | Performance parameters | |
|---|---|---|---|
| 3CC1 | 9 | Δn | 0.109 |
| 3PP1 | 13 | Δε | −3.3 |
| 3CPO1 | 2 | Cp | 74.3 |
| 4CC3 | 9 | γ1 | 83 |
| 5CC3 | 7 | LTS | <−30° C. |
| 3CPP2 | 7 | | |
| 2CPWO2 | 6 | | |
| 3CCWO2 | 13 | | |
| 3CPWO2 | 13 | | |
| 3CWO4 | 4 | | |
| 2CCWO2 | 4 | | |
| 3CWO2 | 13 | | |
| Total | 100 | | |

Example 7 of Host Liquid Crystal

The nematic host liquid crystal Host 7 is prepared according to Table 7 below.

TABLE 7

Composition and performance parameters of Host 7

| Code of component | Weight percentage | Performance parameters | |
|---|---|---|---|
| 2CPWO2 | 4 | Δn | 0.1 |
| 3CPWO2 | 5 | Δε | −2.8 |
| 3C1OWO2 | 7 | Cp | 110 |
| 2CC1OWO2 | 10 | γ1 | 138 |
| 3CC1OWO2 | 10 | LTS | <−40° C. |
| 4CC1OWO2 | 10 | | |
| 3CPO2 | 3 | | |
| 3CPP2 | 6 | | |
| 3CPPC3 | 3 | | |
| 3CGPC3 | 4 | | |
| 3CC2 | 18 | | |
| 4CC3 | 6 | | |
| 3CCP1 | 10 | | |
| 5PP1 | 4 | | |
| Total | 100 | | |

Example 8 of Host Liquid Crystal

The nematic host liquid crystal Host 8 is prepared according to Table 8 below.

TABLE 8

Composition and performance parameters of Host 8

| Code of component | Weight percentage | Performance parameters | |
|---|---|---|---|
| 3CC2 | 20 | $\Delta n$ | 0.090 |
| 3CCV1 | 9 | $\Delta \varepsilon$ | −3.3 |
| 4CC3 | 5 | Cp | 76.3 |
| 5CC3 | 8 | $\gamma 1$ | 92 |
| 3CCP1 | 6 | LTS | <−30° C. |
| 3CWO2 | 13 | | |
| 3PWO2 | 10 | | |
| 3CPWO2 | 8 | | |
| 2CCWO2 | 10 | | |
| 3CCWO2 | 11 | | |
| Total | 100 | | |

Example 9 of Host Liquid Crystal

The nematic host liquid crystal Host 9 is prepared according to Table 9 below.

TABLE 9

Composition and performance parameters of Host 9

| Code of component | Weight percentage | Performance parameters | |
|---|---|---|---|
| 3CC2 | 25 | $\Delta n$ | 0.089 |
| 3CCV1 | 9 | $\Delta \varepsilon$ | −3.3 |
| 5CC3 | 8 | Cp | 73.6 |
| 3CCP1 | 6 | $\gamma 1$ | 82 |
| 3CWO2 | 13 | LTS | <−30° C. |
| 3PWO2 | 10 | | |
| 2CPWO2 | 8 | | |
| 3CCWO2 | 11 | | |
| 3CPWO2 | 10 | | |
| Total | 100 | | |

Example 10 of Host Liquid Crystal

The nematic host liquid crystal Host 10 is prepared according to Table 10 below.

TABLE 10

Composition and performance parameters of Host 10

| Code of component | Weight percentage | Performance parameters | |
|---|---|---|---|
| 3CC2 | 24 | $\Delta n$ | 0.104 |
| 4CC3 | 3 | $\Delta \varepsilon$ | −4 |
| 5CC3 | 4 | Cp | 75.6 |
| 5PP1 | 6 | $\gamma 1$ | 95 |
| 3CCP1 | 2 | LTS | <−30° C. |
| 3CPP2 | 15 | | |
| 3PWO2 | 10 | | |
| 3C1OWO2 | 10 | | |
| 3CPWO2 | 8 | | |
| 2CC1OWO2 | 7 | | |
| 3CC1OWO2 | 11 | | |
| Total | 100 | | |

Example 11 of Host Liquid Crystal

The nematic host liquid crystal Host 11 is prepared according to Table 11 below.

TABLE 11

Composition and performance parameters of Host 11

| Code of component | Weight percentage | Performance parameters | |
|---|---|---|---|
| 3C1OWO2 | 7 | $\Delta n$ | 0.108 |
| 2CC1OWO2 | 3 | $\Delta \varepsilon$ | −3.6 |
| 3CC1OWO2 | 8 | Cp | 105 |
| 3CCWO2 | 6 | $\gamma 1$ | 138 |
| 5CCWO2 | 3 | LTS | <−40° C. |
| 2CCWO2 | 3 | | |
| 5CC1OWO2 | 8 | | |
| 2C1OWO2 | 4 | | |
| 5C1OWO2 | 4 | | |
| 3CPWO2 | 2 | | |
| 3CPO1 | 4 | | |
| 3CPP2 | 14 | | |
| 3CPPC3 | 2 | | |
| 3CGPC3 | 1 | | |
| 3CC2 | 15 | | |
| 5CC2 | 3 | | |
| 2CPP2 | 10 | | |
| 3PPO2 | 3 | | |
| Total | 100 | | |

Example 12 of Host Liquid Crystal

The nematic host liquid crystal Host 12 is prepared according to Table 12 below.

TABLE 12

Composition and performance parameters of Host 12

| Code of component | Weight percentage | Performance parameters | |
|---|---|---|---|
| 3CPWO2 | 12 | $\Delta n$ | 0.11 |
| 3C1OWO2 | 13 | $\Delta \varepsilon$ | −4.2 |
| 2CC1OWO2 | 5.5 | Cp | 74.6 |
| 3CC1OWO2 | 10 | $\gamma 1$ | 121 |
| 2C1OWO2 | 8 | LTS | <−30° C. |
| 4C1OWO2 | 4.5 | | |
| 3CC2 | 21 | | |
| 5PP1 | 10 | | |
| 2CPP2V1 | 5 | | |
| 3CPP2V1 | 11 | | |
| Total | 100 | | |

Example 13 of Host Liquid Crystal

The nematic host liquid crystal Host 13 is prepared according to Table 13 below.

TABLE 13

Composition and performance parameters of Host 13

| Code of component | Weight percentage | Performance parameters | |
|---|---|---|---|
| 3CC2 | 23 | $\Delta n$ | 0.1 |
| 3CCV1 | 10 | $\Delta \varepsilon$ | −3.3 |
| 5PP1 | 6 | Cp | 72.9 |
| 5CC3 | 10 | $\gamma 1$ | 105 |
| 3C1OWO2 | 8 | LTS | <−30° C. |
| C(5)PWO2 | 4 | | |
| 3CCP1 | 5 | | |
| 3CPP2 | 5 | | |
| 2CPWO2 | 6 | | |
| 3CCWO2 | 4 | | |

TABLE 13-continued

Composition and performance parameters of Host 13

| Code of component | Weight percentage | Performance parameters |
|---|---|---|
| 3CCW1 | 5 | |
| 3CPWO2 | 9 | |
| 4CPWO2 | 5 | |
| Total | 100 | |

Example 14 of Host Liquid Crystal

The nematic host liquid crystal Host 14 is prepared according to Table 14 below.

TABLE 14

Composition and performance parameters of Host 14

| Code of component | Weight percentage | Performance parameters | |
|---|---|---|---|
| 3CC1 | 13 | Δn | 0.1 |
| 3CCV1 | 11 | Δε | −3.3 |

TABLE 14-continued

Composition and performance parameters of Host 14

| Code of component | Weight percentage | Performance parameters | |
|---|---|---|---|
| 5CC3 | 4 | Cp | 72.9 |
| 3CCP1 | 11 | γ1 | 98 |
| 3CPP2 | 5 | LTS | <−30° C. |
| 3CWO2 | 14 | | |
| 3CWO4 | 3 | | |
| 5CWO2 | 13 | | |
| 3CCWO1 | 5 | | |
| 2CPWO2 | 6 | | |
| 3CCWO2 | 3 | | |
| 3CPWO2 | 12 | | |
| Total | 100 | | |

Examples of PSA-Type Liquid Crystal Composition

The PSA-type liquid crystal compositions of Examples 1-308 are prepared by adding the compounds in Table 15 to the nematic host liquid crystals Host 1 to Host 14 at the concentrations shown in Tables 17-30 respectively, and then tested for relevant performance parameters by filling the same into a VA-type test cell.

TABLE 15

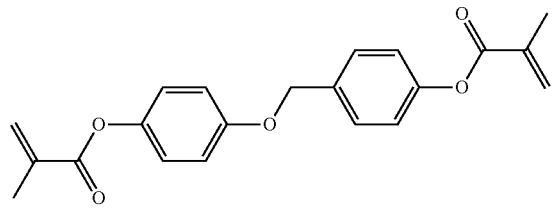 [SMILES: C=C(C)C(=O)Oc1ccc(COc2ccc(OC(=O)C(=C)C)cc2)cc1]

I-1-1a

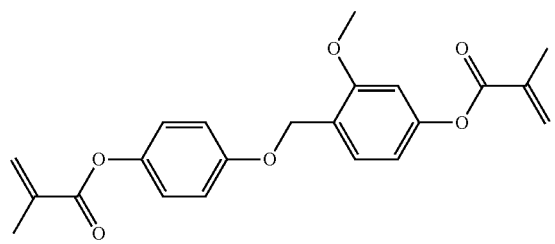 [SMILES: C=C(C)C(=O)Oc1ccc(OCc2ccc(OC(=O)C(=C)C)cc2OC)cc1]

I-1-1b

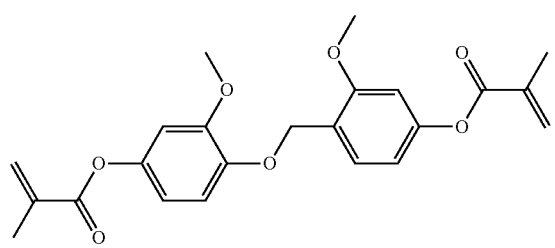 [SMILES: C=C(C)C(=O)Oc1ccc(COc2ccc(OC(=O)C(=C)C)cc2OC)c(OC)c1]

I-1-1c

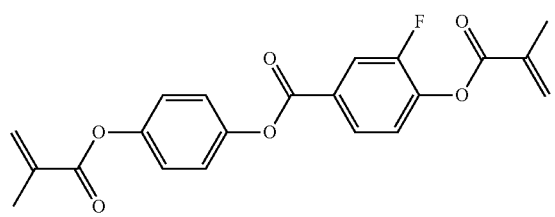

I-1-9a

TABLE 15-continued
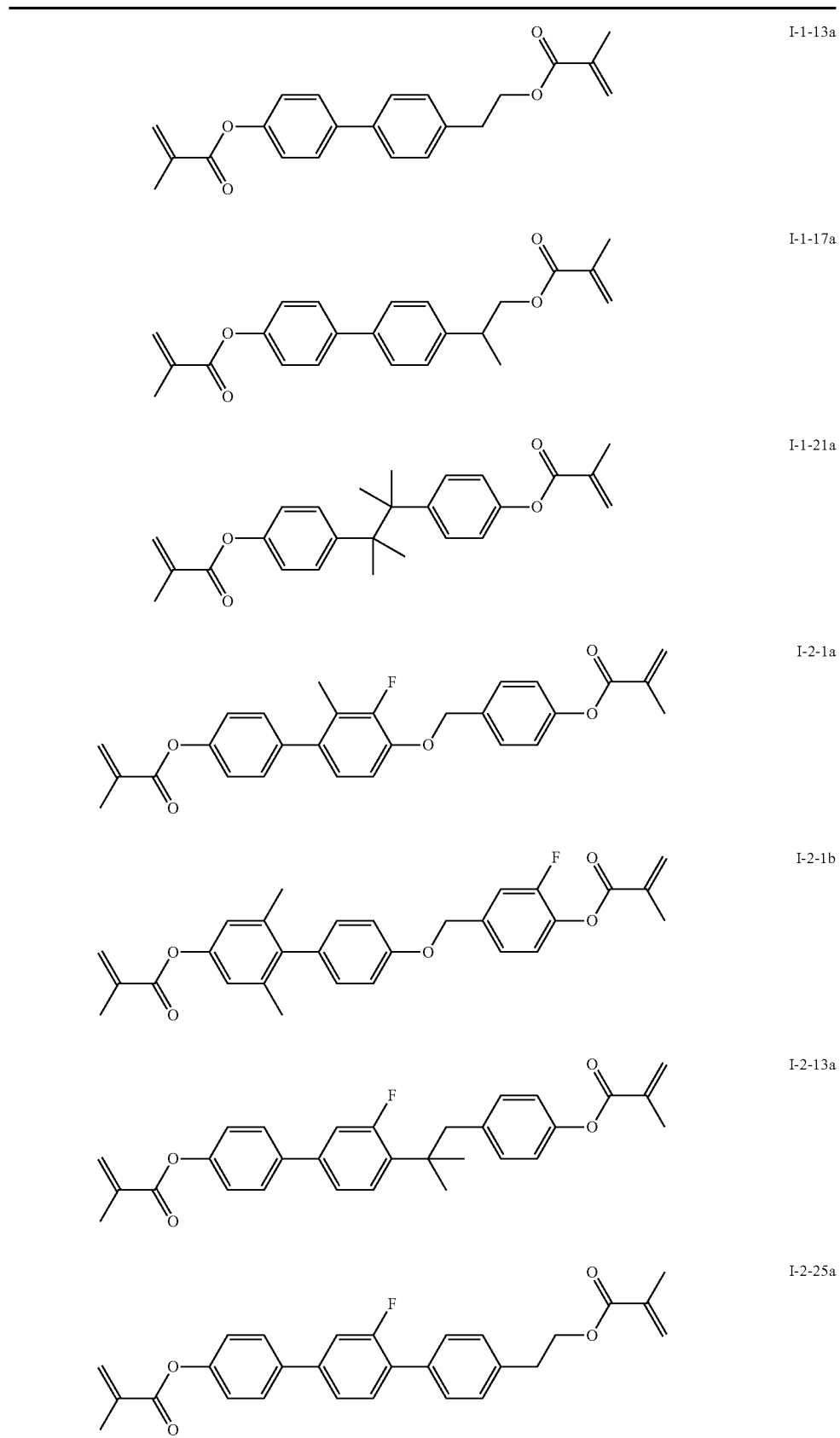
I-1-13a
I-1-17a
I-1-21a
I-2-1a
I-2-1b
I-2-13a
I-2-25a TABLE 15-continued
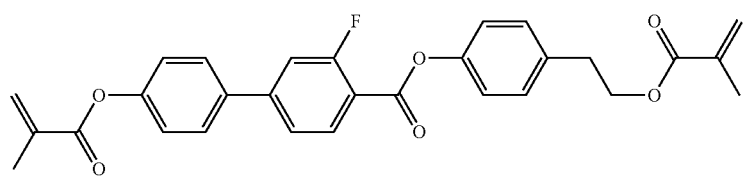 [SMILES: C=C(C)C(=O)OCCc1ccc(OC(=O)c2ccc(-c3ccc(OC(=O)C(=C)C)cc3)cc2F)cc1]
I-2-29a
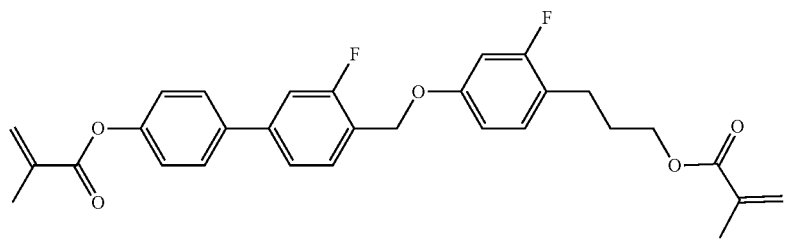 [SMILES: C=C(C)C(=O)OCCCc1ccc(OCc2ccc(-c3ccc(OC(=O)C(=C)C)cc3)cc2F)cc1F]
I-2-33a
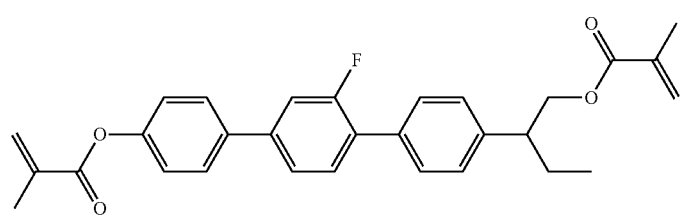 [SMILES: C=C(C)C(=O)OCC(CC)c1ccc(-c2ccc(-c3ccc(OC(=O)C(=C)C)cc3)cc2F)cc1]
I-2-41a
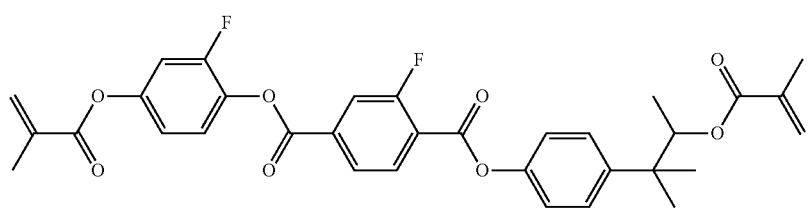 [SMILES: C=C(C)C(=O)Oc1ccc(OC(=O)c2ccc(C(=O)Oc3ccc(C(C)(C)C(C)OC(=O)C(=C)C)cc3)c(F)c2)c(F)c1]
I-2-53a
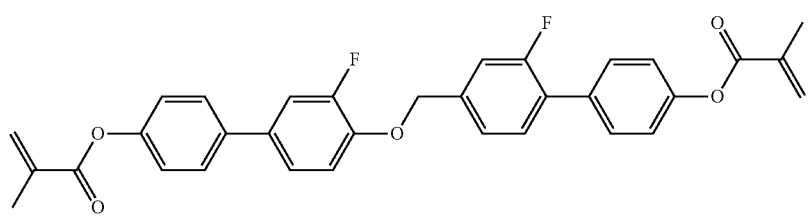
I-3-1a
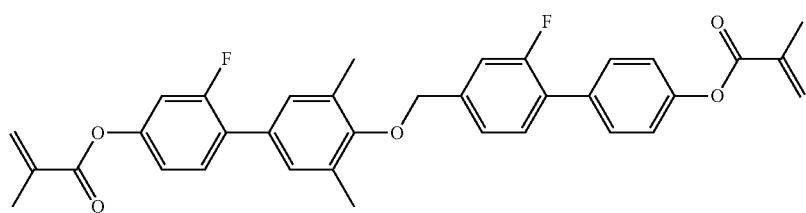 [SMILES: C=C(C)C(=O)Oc1ccc(-c2ccc(COc3c(C)cc(-c4ccc(OC(=O)C(=C)C)cc4F)cc3C)cc2F)cc1]
I-3-1b
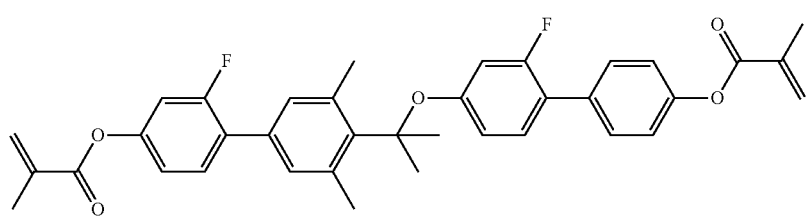 [SMILES: C=C(C)C(=O)Oc1ccc(-c2ccc(OC(C)(C)c3c(C)cc(-c4ccc(OC(=O)C(=C)C)cc4F)cc3C)cc2F)cc1]
I-3-5a TABLE 15-continued

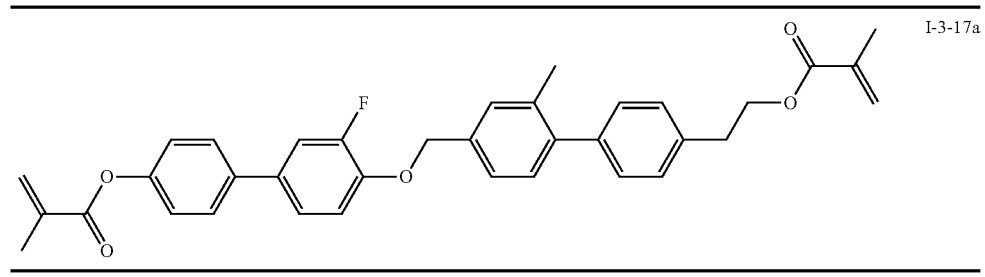

For comparison purposes, the PSA-type liquid crystal compositions of Comparative Examples 1-39 are prepared by adding the polymerizable compounds M1 and M2 known in the prior art to the nematic host liquid crystal Host 1 to Host 14 at the concentrations shown in Table 16 respectively, and then tested for relevant performance parameters by filling the same into a VA-type test cell.

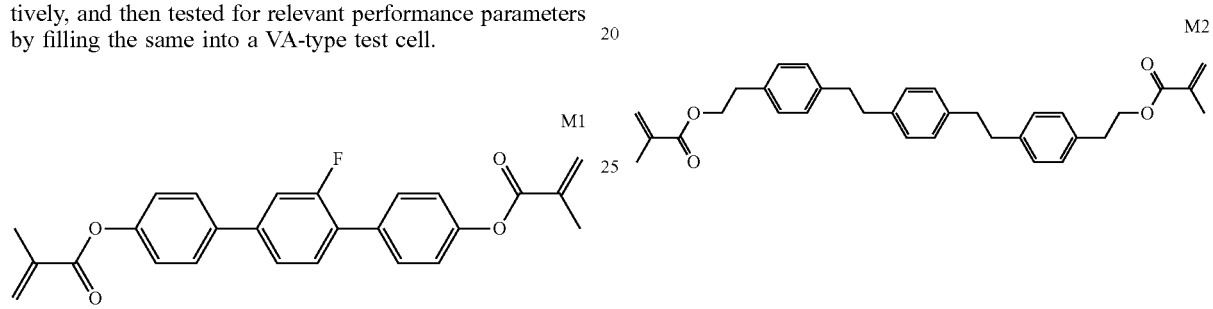

|  | | Comparative Examples 1-39 | | | | | |
|---|---|---|---|---|---|---|---|
|  | Host | Polymerizable compound | Proportion of Host (%) | Proportion of polymerizable compound (%) | Intersolubility | Changes in pretilt angle | Zara Particle |
| Comparative Example 1 | Host 1 | M1 | 99.65 | 0.35 | There is crystallization at room temperature | — | — |
| Comparative Example 2 | Host 2 | M1 | 99.65 | 0.35 | There is crystallization at room temperature | — | — |
| Comparative Example 3 | Host 3 | M1 | 99.65 | 0.35 | There is crystallization at room temperature | — | — |
| Comparative Example 4 | Host 4 | M1 | 99.65 | 0.35 | There is crystallization at room temperature | — | — |
| Comparative Example 5 | Host 5 | M1 | 99.65 | 0.35 | There is crystallization at room temperature | — | — |
| Comparative Example 6 | Host 6 | M1 | 99.65 | 0.35 | There is crystallization at room temperature | — | — |
| Comparative Example 7 | Host 7 | M1 | 99.65 | 0.35 | There is crystallization at room temperature | — | — |
| Comparative Example 8 | Host 8 | M1 | 99.65 | 0.35 | There is crystallization at room temperature | — | — |
| Comparative Example 9 | Host 9 | M1 | 99.65 | 0.35 | There is crystallization at room temperature | — | — |
| Comparative Example 10 | Host 10 | M1 | 99.65 | 0.35 | There is crystallization at room temperature | — | — |
| Comparative Example 11 | Host 11 | M1 | 99.65 | 0.35 | There is crystallization at room temperature | — | — |

-continued

| | Host | Polymerizable compound | Proportion of Host (%) | Proportion of polymerizable compound (%) | Intersolubility | Changes in pretilt angle | Zara Particle |
|---|---|---|---|---|---|---|---|
| Comparative Example 12 | Host 12 | M1 | 99.65 | 0.35 | There is crystallization at room temperature | — | — |
| Comparative Example 13 | Host 13 | M1 | 99.65 | 0.35 | There is crystallization at room temperature | — | — |
| Comparative Example 14 | Host 14 | M1 | 99.75 | 0.25 | There is crystallization when stored at −10° C. for 0.5 h, and no crystallization at room temperature | <0.2 | Yes |
| Comparative Example 15 | Host 1 | M1 | 99.75 | 0.25 | There is crystallization when stored at −10° C. for 0.5 h, and no crystallization at room temperature | <0.2 | Yes |
| Comparative Example 16 | Host 2 | M1 | 99.75 | 0.25 | There is crystallization when stored at −10° C. for 0.5 h, and no crystallization at room temperature | <0.2 | Yes |
| Comparative Example 17 | Host 3 | M1 | 99.75 | 0.25 | There is crystallization when stored at −10° C. for 0.5 h, and no crystallization at room temperature | <0.2 | Yes |
| Comparative Example 18 | Host 4 | M1 | 99.75 | 0.25 | There is crystallization when stored at −10° C. for 0.5 h, and no crystallization at room temperature | <0.2 | Yes |
| Comparative Example 19 | Host 5 | M1 | 99.75 | 0.25 | There is crystallization when stored at −10° C. for 0.5 h, and no crystallization at room temperature | <0.2 | Yes |
| Comparative Example 20 | Host 6 | M1 | 99.75 | 0.25 | There is crystallization when stored at −10° C. for 0.5 h, and no crystallization at room temperature | <0.2 | Yes |
| Comparative Example 21 | Host 7 | M1 | 99.75 | 0.25 | There is crystallization when stored at −10° C. for 0.5 h, and no crystallization at room temperature | <0.2 | Yes |
| Comparative Example 22 | Host 8 | M1 | 99.75 | 0.25 | There is crystallization when stored at −10° C. for 0.5 h, and no crystallization at room temperature | <0.2 | Yes |
| Comparative Example 23 | Host 9 | M1 | 99.75 | 0.25 | There is crystallization when stored at −10° C. for 0.5 h, and no crystallization at room temperature | <0.2 | Yes |
| Comparative Example 24 | Host 10 | M1 | 99.75 | 0.25 | There is crystallization when stored at −10° C. for 0.5 h, and no crystallization at room temperature | <0.2 | Yes |

-continued

| | | | | Proportion of | | | |
|---|---|---|---|---|---|---|---|
| | | | Proportion | polymerizable | | Changes | |
| | | Polymerizable | of Host | compound | | in pretilt | Zara |
| | Host | compound | (%) | (%) | Intersolubility | angle | Particle |

Comparative Examples 1-39

| | Host | Polymerizable compound | Proportion of Host (%) | Proportion of polymerizable compound (%) | Intersolubility | Changes in pretilt angle | Zara Particle |
|---|---|---|---|---|---|---|---|
| Comparative Example 25 | Host 11 | M1 | 99.75 | 0.25 | There is crystallization when stored at −10° C. for 0.5 h, and no crystallization at room temperature | <0.2 | Yes |
| Comparative Example 26 | Host 12 | M1 | 99.75 | 0.25 | There is crystallization when stored at −10° C. for 0.5 h, and no crystallization at room temperature | <0.2 | Yes |
| Comparative Example 27 | Host 1 | M2 | 99.7 | 0.3 | There is no crystallization at a temperature below −30° C. | >0.5 | No |
| Comparative Example 28 | Host 2 | M2 | 99.7 | 0.3 | There is no crystallization at a temperature below −30° C. | >0.4 | No |
| Comparative Example 29 | Host 3 | M2 | 99.7 | 0.3 | There is no crystallization at a temperature below −30° C. | >0.4 | No |
| Comparative Example 30 | Host 4 | M2 | 99.7 | 0.3 | There is no crystallization at a temperature below −30° C. | >0.4 | No |
| Comparative Example 31 | Host 5 | M2 | 99.7 | 0.3 | There is no crystallization at a temperature below −30° C. | >0.4 | No |
| Comparative Example 32 | Host 6 | M2 | 99.7 | 0.3 | There is no crystallization at a temperature below −30° C. | >0.4 | No |
| Comparative Example 33 | Host 7 | M2 | 99.7 | 0.3 | There is no crystallization at a temperature below −30° C. | >0.4 | No |
| Comparative Example 34 | Host 8 | M2 | 99.7 | 0.3 | There is no crystallization at a temperature below −30° C. | >0.4 | No |
| Comparative Example 35 | Host 9 | M2 | 99.7 | 0.3 | There is no crystallization at a temperature below −30° C. | >0.4 | No |
| Comparative Example 36 | Host 10 | M2 | 99.7 | 0.3 | There is no crystallization at a temperature below −30° C. | >0.4 | No |
| Comparative Example 37 | Host 11 | M2 | 99.7 | 0.3 | There is no crystallization at a temperature below −30° C. | >0.4 | No |
| Comparative Example 38 | Host 12 | M2 | 99.7 | 0.3 | There is no crystallization at a temperature below −30° C. | >0.4 | No |
| Comparative Example 39 | Host 13 | M2 | 99.7 | 0.3 | There is no crystallization at a temperature below −30° C. | >0.4 | No |

"—" refers to that the detection is unavailable.

Examples 1-22

TABLE 17

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 1 | Host 1 | 99.65 | I-1-1b | 0.35 | There is no crystallization at a temperature below −30° C. | <0.2 | No |
| Example 2 | Host 1 | 99.7 | I-1-1c | 0.3 | There is no crystallization at a temperature below −30° C. | <0.2 | No |
| Example 3 | Host 1 | 99.75 | I-1-9a | 0.25 | There is no crystallization at a temperature below −30° C. | <0.2 | No |
| Example 4 | Host 1 | 99.7 | I-2-1a | 0.3 | There is no crystallization at a temperature below −30° C. | <0.2 | No |
| Example 5 | Host 1 | 99.65 | I-2-1b | 0.35 | There is no crystallization at a temperature below −30° C. | <0.2 | No |
| Example 6 | Host 1 | 99.7 | I-2-13a | 0.3 | There is no crystallization at a temperature below −30° C. | <0.2 | No |
| Example 7 | Host 1 | 99.75 | I-2-41a | 0.25 | There is no crystallization at a temperature below −30° C. | <0.2 | No |
| Example 8 | Host 1 | 99.77 | I-2-53a | 0.23 | There is no crystallization at a temperature below −30° C. | <0.2 | No |
| Example 9 | Host 1 | 99.77 | I-3-1b | 0.23 | There is no crystallization at a temperature below −30° C. | <0.2 | No |
| Example 10 | Host 1 | 99.75 | I-3-5a | 0.25 | There is no crystallization at a temperature below −30° C. | <0.2 | No |
| Example 11 | Host 1 | 99.7 | I-1-1a<br>I-2-25a | 0.2<br>0.1 | There is no crystallization at a temperature below −30° C. | <0.2 | No |
| Example 12 | Host 1 | 99.7 | I-1-13a<br>I-3-1a | 0.18<br>0.12 | There is no crystallization at a temperature below −30° C. | <0.2 | No |
| Example 13 | Host 1 | 99.7 | I-1-17a<br>I-3-1b | 0.15<br>0.15 | There is no crystallization at a temperature below −30° C. | <0.2 | No |
| Example 14 | Host 1 | 99.7 | I-1-21a<br>I-2-25a<br>I-3-1a | 0.1<br>0.1<br>0.1 | There is no crystallization at a temperature below −30° C. | <0.2 | No |
| Example 15 | Host 1 | 99.72 | I-2-29a<br>I-3-1b | 0.18<br>0.1 | There is no crystallization at a temperature below −30° C. | <0.2 | No |
| Example 16 | Host 1 | 99.7 | I-2-33a<br>I-3-5a | 0.15<br>0.15 | There is no crystallization at a temperature below −30° C. | <0.2 | No |
| Example 17 | Host 1 | 99.7 | I-1-17a<br>I-2-13a | 0.15<br>0.15 | There is no crystallization at a temperature below −30° C. | <0.2 | No |
| Example 18 | Host 1 | 99.74 | I-1-9a<br>I-2-41a | 0.17<br>0.09 | There is no crystallization at a temperature below −30° C. | | |

TABLE 17-continued

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 19 | Host 1 | 99.7 | I-1-1b<br>I-2-53a<br>I-3-5a | 0.15<br>0.05<br>0.1 | There is no crystallization at a temperature below −30° C. | <0.2 | No |
| Example 20 | Host 1 | 99.68 | I-2-29a<br>I-3-1a | 0.25<br>0.07 | There is no crystallization at a temperature below −30° C. | <0.2 | No |
| Example 21 | Host 1 | 99.72 | I-1-9a<br>I-3-17a | 0.25<br>0.03 | There is no crystallization at a temperature below −30° C. | <0.2 | No |
| Example 22 | Host 1 | 99.73 | I-2-1b<br>I-2-41a | 0.25<br>0.02 | There is no crystallization at a temperature below −30° C. | <0.2 | No |

Examples 23-44

TABLE 18

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 23 | Host 2 | 99.65 | I-1-1b | 0.35 | There is no crystallization at a temperature below −30° C. | <0.2 | No |
| Example 24 | Host 2 | 99.7 | I-1-1c | 0.3 | There is no crystallization at a temperature below −30° C. | <0.2 | No |
| Example 25 | Host 2 | 99.75 | I-1-9a | 0.25 | There is no crystallization at a temperature below −30° C. | <0.2 | No |
| Example 26 | Host 2 | 99.7 | I-2-1a | 0.3 | There is no crystallization at a temperature below −30° C. | <0.2 | No |
| Example 27 | Host 2 | 99.65 | I-2-1b | 0.35 | There is no crystallization at a temperature below −30° C. | <0.2 | No |
| Example 27 | Host 2 | 99.7 | I-2-13a | 0.3 | There is no crystallization at a temperature below −30° C. | <0.2 | No |
| Example 29 | Host 2 | 99.75 | I-2-41a | 0.25 | There is no crystallization at a temperature below −30° C. | <0.2 | No |
| Example 30 | Host 2 | 99.77 | I-2-53a | 0.23 | There is no crystallization at a temperature below −30° C. | <0.2 | No |
| Example 31 | Host 2 | 99.77 | I-3-1b | 0.23 | There is no crystallization at a temperature below −30° C. | <0.2 | No |
| Example 32 | Host 2 | 99.75 | I-3-5a | 0.25 | There is no crystallization at a temperature below −30° C. | <0.2 | No |
| Example 33 | Host 2 | 99.7 | I-1-1a<br>I-2-25a | 0.2<br>0.1 | There is no crystallization at a temperature below −30° C. | <0.2 | No |

TABLE 18-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 34 | Host 2 | 99.7 | I-1-13a<br>I-3-1a | 0.18<br>0.12 | There is no crystallization at a temperature below −30° C. | <0.2 | No |
| Example 35 | Host 2 | 99.7 | I-1-17a<br>I-3-1b | 0.15<br>0.15 | There is no crystallization at a temperature below −30° C. | <0.2 | No |
| Example 36 | Host 2 | 99.7 | I-1-21a<br>I-2-25a<br>I-3-1a | 0.1<br>0.1<br>0.1 | There is no crystallization at a temperature below −30° C. | <0.2 | No |
| Example 37 | Host 2 | 99.72 | I-2-29a<br>I-3-1b | 0.18<br>0.1 | There is no crystallization at a temperature below −30° C. | <0.2 | No |
| Example 38 | Host 2 | 99.7 | I-2-33a<br>I-3-5a | 0.15<br>0.15 | There is no crystallization at a temperature below −30° C. | <0.2 | No |
| Example 39 | Host 2 | 99.7 | I-1-17a<br>I-2-13a | 0.15<br>0.15 | There is no crystallization at a temperature below −30° C. | <0.2 | No |
| Example 40 | Host 2 | 99.74 | I-1-9a<br>I-2-41a | 0.17<br>0.09 | There is no crystallization at a temperature below −30° C. | <0.2 | No |
| Example 41 | Host 2 | 99.7 | I-1-1b<br>I-2-53a<br>I-3-5a | 0.15<br>0.05<br>0.1 | There is no crystallization at a temperature below −30° C. | <0.2 | No |
| Example 42 | Host 2 | 99.68 | I-2-29a<br>I-3-1a | 0.25<br>0.07 | There is no crystallization at a temperature below −30° C. | <0.2 | No |
| Example 43 | Host 2 | 99.72 | I-1-9a<br>I-3-17a | 0.25<br>0.03 | There is no crystallization at a temperature below −30° C. | <0.2 | No |
| Example 44 | Host 2 | 99.73 | I-2-1b<br>I-2-41a | 0.25<br>0.02 | There is no crystallization at a temperature below −30° C. | <0.2 | No |

Examples 45-66

TABLE 19

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 45 | Host 3 | 99.65 | I-1-1b | 0.35 | There is no crystallization at a temperature below −30° C. | <0.2 | No |
| Example 46 | Host 3 | 99.7 | I-1-1c | 0.3 | There is no crystallization at a temperature below −30° C. | <0.2 | No |
| Example 47 | Host 3 | 99.75 | I-1-9a | 0.25 | There is no crystallization at a temperature below −30° C. | <0.2 | No |
| Example 48 | Host 3 | 99.7 | I-2-1a | 0.3 | There is no crystallization at a temperature below −30° C. | <0.2 | No |

TABLE 19-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 49 | Host 3 | 99.65 | I-2-1b | 0.35 | There is no crystallization at a temperature below −30° C. | <0.2 | No |
| Example 50 | Host 3 | 99.7 | I-2-13a | 0.3 | There is no crystallization at a temperature below −30° C. | <0.2 | No |
| Example 51 | Host 3 | 99.75 | I-2-41a | 0.25 | There is no crystallization at a temperature below −30° C. | <0.2 | No |
| Example 52 | Host 3 | 99.77 | I-2-53a | 0.23 | There is no crystallization at a temperature below −30° C. | <0.2 | No |
| Example 53 | Host 3 | 99.77 | I-3-1b | 0.23 | There is no crystallization at a temperature below −30° C. | <0.2 | No |
| Example 54 | Host 3 | 99.75 | I-3-5a | 0.25 | There is no crystallization at a temperature below −30° C. | <0.2 | No |
| Example 55 | Host 3 | 99.7 | I-1-1a<br>I-2-25a | 0.2<br>0.1 | There is no crystallization at a temperature below −30° C. | <0.2 | No |
| Example 56 | Host 3 | 99.7 | I-1-13a<br>I-3-1a | 0.18<br>0.12 | There is no crystallization at a temperature below −30° C. | <0.2 | No |
| Example 57 | Host 3 | 99.7 | I-1-17a<br>I-3-1b | 0.15<br>0.15 | There is no crystallization at a temperature below −30° C. | <0.2 | No |
| Example 58 | Host 3 | 99.7 | I-1-21a<br>I-2-25a<br>I-3-1a | 0.1<br>0.1<br>0.1 | There is no crystallization at a temperature below −30° C. | <0.2 | No |
| Example 59 | Host 3 | 99.72 | I-2-29a<br>I-3-1b | 0.18<br>0.1 | There is no crystallization at a temperature below −30° C. | <0.2 | No |
| Example 60 | Host 3 | 99.7 | I-2-33a<br>I-3-5a | 0.15<br>0.15 | There is no crystallization at a temperature below −30° C. | <0.2 | No |
| Example 61 | Host 3 | 99.7 | I-1-17a<br>I-2-13a | 0.15<br>0.15 | There is no crystallization at a temperature below −30° C. | <0.2 | No |
| Example 62 | Host 3 | 99.74 | I-1-9a<br>I-2-41a | 0.17<br>0.09 | There is no crystallization at a temperature below −30° C. | <0.2 | No |
| Example 63 | Host 3 | 99.7 | I-1-1b<br>I-2-53a<br>I-3-5a | 0.15<br>0.05<br>0.1 | There is no crystallization at a temperature below −30° C. | <0.2 | No |
| Example 64 | Host 3 | 99.68 | I-2-29a<br>I-3-1a | 0.25<br>0.07 | There is no crystallization at a temperature below −30° C. | <0.2 | No |
| Example 65 | Host 3 | 99.72 | I-1-9a<br>I-3-17a | 0.25<br>0.03 | There is no crystallization at a temperature below −30° C. | <0.2 | No |
| Example 66 | Host 3 | 99.73 | I-2-1b<br>I-2-41a | 0.25<br>0.02 | There is no crystallization at a temperature below −30° C. | <0.2 | No |

Examples 67-88

TABLE 20

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 67 | Host 4 | 99.65 | I-1-1b | 0.35 | There is no crystallization at a temperature below −30° C. | <0.2 | No |
| Example 68 | Host 4 | 99.7 | I-1-1c | 0.3 | There is no crystallization at a temperature below −30° C. | <0.2 | No |
| Example 69 | Host 4 | 99.75 | I-1-9a | 0.25 | There is no crystallization at a temperature below −30° C. | <0.2 | No |
| Example 70 | Host 4 | 99.7 | I-2-1a | 0.3 | There is no crystallization at a temperature below −30° C. | <0.2 | No |
| Example 71 | Host 4 | 99.65 | I-2-1b | 0.35 | There is no crystallization at a temperature below −30° C. | <0.2 | No |
| Example 72 | Host 4 | 99.7 | I-2-13a | 0.3 | There is no crystallization at a temperature below −30° C. | <0.2 | No |
| Example 73 | Host 4 | 99.75 | I-2-41a | 0.25 | There is no crystallization at a temperature below −30° C. | <0.2 | No |
| Example 74 | Host 4 | 99.77 | I-2-53a | 0.23 | There is no crystallization at a temperature below −30° C. | <0.2 | No |
| Example 75 | Host 4 | 99.77 | I-3-1b | 0.23 | There is no crystallization at a temperature below −30° C. | <0.2 | No |
| Example 76 | Host 4 | 99.75 | I-3-5a | 0.25 | There is no crystallization at a temperature below −30° C. | <0.2 | No |
| Example 77 | Host 4 | 99.7 | I-1-1a<br>I-2-25a | 0.2<br>0.1 | There is no crystallization at a temperature below −30° C. | <0.2 | No |
| Example 78 | Host 4 | 99.7 | I-1-13a<br>I-3-1a | 0.18<br>0.12 | There is no crystallization at a temperature below −30° C. | <0.2 | No |
| Example 79 | Host 4 | 99.7 | I-1-17a<br>I-3-1b | 0.15<br>0.15 | There is no crystallization at a temperature below −30° C. | <0.2 | No |
| Example 80 | Host 4 | 99.7 | I-1-21a<br>I-2-25a<br>I-3-1a | 0.1<br>0.1<br>0.1 | There is no crystallization at a temperature below −30° C. | <0.2 | No |
| Example 81 | Host 4 | 99.72 | I-2-29a<br>I-3-1b | 0.18<br>0.1 | There is no crystallization at a temperature below −30° C. | <0.2 | No |
| Example 82 | Host 4 | 99.7 | I-2-33a<br>I-3-5a | 0.15<br>0.15 | There is no crystallization at a temperature below −30° C. | <0.2 | No |
| Example 83 | Host 4 | 99.7 | I-1-17a<br>I-2-13a | 0.15<br>0.15 | There is no crystallization at a temperature below −30° C. | <0.2 | No |
| Example 84 | Host 4 | 99.74 | I-1-9a<br>I-2-41a | 0.17<br>0.09 | There is no crystallization at a temperature below −30° C. | <0.2 | No |

TABLE 20-continued

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 85 | Host 4 | 99.7 | I-1-1b<br>I-2-53a<br>I-3-5a | 0.15<br>0.05<br>0.1 | There is no crystallization at a temperature below −30° C. | <0.2 | No |
| Example 86 | Host 4 | 99.68 | I-2-29a<br>I-3-1a | 0.25<br>0.07 | There is no crystallization at a temperature below −30° C. | <0.2 | No |
| Example 87 | Host 4 | 99.72 | I-1-9a<br>I-3-17a | 0.25<br>0.03 | There is no crystallization at a temperature below −30° C. | <0.2 | No |
| Example 88 | Host 4 | 99.73 | I-2-1b<br>I-2-41a | 0.25<br>0.02 | There is no crystallization at a temperature below −30° C. | <0.2 | No |

Examples 89-110

TABLE 21

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 89 | Host 5 | 99.65 | I-1-1b | 0.35 | There is no crystallization at a temperature below −30° C. | <0.2 | No |
| Example 90 | Host 5 | 99.7 | I-1-1c | 0.3 | There is no crystallization at a temperature below −30° C. | <0.2 | No |
| Example 91 | Host 5 | 99.75 | I-1-9a | 0.25 | There is no crystallization at a temperature below −30° C. | <0.2 | No |
| Example 92 | Host 5 | 99.7 | I-2-1a | 0.3 | There is no crystallization at a temperature below −30° C. | <0.2 | No |
| Example 93 | Host 5 | 99.65 | I-2-1b | 0.35 | There is no crystallization at a temperature below −30° C. | <0.2 | No |
| Example 94 | Host 5 | 99.7 | I-2-13a | 0.3 | There is no crystallization at a temperature below −30° C. | <0.2 | No |
| Example 95 | Host 5 | 99.75 | I-2-41a | 0.25 | There is no crystallization at a temperature below −30° C. | <0.2 | No |
| Example 96 | Host 5 | 99.77 | I-2-53a | 0.23 | There is no crystallization at a temperature below −30° C. | <0.2 | No |
| Example 97 | Host 5 | 99.77 | I-3-1b | 0.23 | There is no crystallization at a temperature below −30° C. | <0.2 | No |
| Example 98 | Host 5 | 99.75 | I-3-5a | 0.25 | There is no crystallization at a temperature below −30° C. | <0.2 | No |
| Example 99 | Host 5 | 99.7 | I-1-1a<br>I-2-25a | 0.2<br>0.1 | There is no crystallization at a temperature below −30° C. | <0.2 | No |

TABLE 21-continued

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 100 | Host 5 | 99.7 | I-1-13a<br>I-3-1a | 0.18<br>0.12 | There is no crystallization at a temperature below −30° C. | <0.2 | No |
| Example 101 | Host 5 | 99.7 | I-1-17a<br>I-3-1b | 0.15<br>0.15 | There is no crystallization at a temperature below −30° C. | <0.2 | No |
| Example 102 | Host 5 | 99.7 | I-1-21a<br>I-2-25a<br>I-3-1a | 0.1<br>0.1<br>0.1 | There is no crystallization at a temperature below −30° C. | <0.2 | No |
| Example 103 | Host 5 | 99.72 | I-2-29a<br>I-3-1b | 0.18<br>0.1 | There is no crystallization at a temperature below −30° C. | <0.2 | No |
| Example 104 | Host 5 | 99.7 | I-2-33a<br>I-3-5a | 0.15<br>0.15 | There is no crystallization at a temperature below −30° C. | <0.2 | No |
| Example 105 | Host 5 | 99.7 | I-1-17a<br>I-2-13a | 0.15<br>0.15 | There is no crystallization at a temperature below −30° C. | <0.2 | No |
| Example 106 | Host 5 | 99.74 | I-1-9a<br>I-2-41a | 0.17<br>0.09 | There is no crystallization at a temperature below −30° C. | <0.2 | No |
| Example 107 | Host 5 | 99.7 | I-1-1b<br>I-2-53a<br>I-3-5a | 0.15<br>0.05<br>0.1 | There is no crystallization at a temperature below −30° C. | <0.2 | No |
| Example 108 | Host 5 | 99.68 | I-2-29a<br>I-3-1a | 0.25<br>0.07 | There is no crystallization at a temperature below −30° C. | <0.2 | No |
| Example 109 | Host 5 | 99.72 | I-1-9a<br>I-3-17a | 0.25<br>0.03 | There is no crystallization at a temperature below −30° C. | <0.2 | No |
| Example 110 | Host 5 | 99.73 | I-2-1b<br>I-2-41a | 0.25<br>0.02 | There is no crystallization at a temperature below −30° C. | <0.2 | No |

Examples 111-132

TABLE 22

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 111 | Host 6 | 99.65 | I-1-1b | 0.35 | There is no crystallization at a temperature below −30° C. | <0.2 | No |
| Example 112 | Host 6 | 99.7 | I-1-1c | 0.3 | There is no crystallization at a temperature below −30° C. | <0.2 | No |
| Example 113 | Host 6 | 99.75 | I-1-9a | 0.25 | There is no crystallization at a temperature below −30° C. | <0.2 | No |
| Example 114 | Host 6 | 99.7 | I-2-1a | 0.3 | There is no crystallization at a temperature below −30° C. | <0.2 | No |

TABLE 22-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 115 | Host 6 | 99.65 | I-2-1b | 0.35 | There is no crystallization at a temperature below −30° C. | <0.2 | No |
| Example 116 | Host 6 | 99.7 | I-2-13a | 0.3 | There is no crystallization at a temperature below −30° C. | <0.2 | No |
| Example 117 | Host 6 | 99.75 | I-2-41a | 0.25 | There is no crystallization at a temperature below −30° C. | <0.2 | No |
| Example 118 | Host 6 | 99.77 | I-2-53a | 0.23 | There is no crystallization at a temperature below −30° C. | <0.2 | No |
| Example 119 | Host 6 | 99.77 | I-3-1b | 0.23 | There is no crystallization at a temperature below −30° C. | <0.2 | No |
| Example 120 | Host 6 | 99.75 | I-3-5a | 0.25 | There is no crystallization at a temperature below −30° C. | <0.2 | No |
| Example 121 | Host 6 | 99.7 | I-1-1a<br>I-2-25a | 0.2<br>0.1 | There is no crystallization at a temperature below −30° C. | <0.2 | No |
| Example 122 | Host 6 | 99.7 | I-1-13a<br>I-3-1a | 0.18<br>0.12 | There is no crystallization at a temperature below −30° C. | <0.2 | No |
| Example 123 | Host 6 | 99.7 | I-1-17a<br>I-3-1b | 0.15<br>0.15 | There is no crystallization at a temperature below −30° C. | <0.2 | No |
| Example 124 | Host 6 | 99.7 | I-1-21a<br>I-2-25a<br>I-3-1a | 0.1<br>0.1<br>0.1 | There is no crystallization at a temperature below −30° C. | <0.2 | No |
| Example 125 | Host 6 | 99.72 | I-2-29a<br>I-3-1b | 0.18<br>0.1 | There is no crystallization at a temperature below −30° C. | <0.2 | No |
| Example 126 | Host 6 | 99.7 | I-2-33a<br>I-3-5a | 0.15<br>0.15 | There is no crystallization at a temperature below −30° C. | <0.2 | No |
| Example 127 | Host 6 | 99.7 | I-1-17a<br>I-2-13a | 0.15<br>0.15 | There is no crystallization at a temperature below −30° C. | <0.2 | No |
| Example 128 | Host 6 | 99.74 | I-1-9a<br>I-2-41a | 0.17<br>0.09 | There is no crystallization at a temperature below −30° C. | <0.2 | No |
| Example 129 | Host 6 | 99.7 | I-1-1b<br>I-2-53a<br>I-3-5a | 0.15<br>0.05<br>0.1 | There is no crystallization at a temperature below −30° C. | <0.2 | No |
| Example 130 | Host 6 | 99.68 | I-2-29a<br>I-3-1a | 0.25<br>0.07 | There is no crystallization at a temperature below −30° C. | <0.2 | No |
| Example 131 | Host 6 | 99.72 | I-1-9a<br>I-3-17a | 0.25<br>0.03 | There is no crystallization at a temperature below −30° C. | <0.2 | No |
| Example 132 | Host 6 | 99.73 | I-2-1b<br>I-2-41a | 0.25<br>0.02 | There is no crystallization at a temperature below −30° C. | <0.2 | No |

Examples 133-154

TABLE 23

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 133 | Host 7 | 99.65 | I-1-1b | 0.35 | There is no crystallization at a temperature below −30° C. | <0.2 | No |
| Example 134 | Host 7 | 99.7 | I-1-1c | 0.3 | There is no crystallization at a temperature below −30° C. | <0.2 | No |
| Example 135 | Host 7 | 99.75 | I-1-9a | 0.25 | There is no crystallization at a temperature below −30° C. | <0.2 | No |
| Example 136 | Host 7 | 99.7 | I-2-1a | 0.3 | There is no crystallization at a temperature below −30° C. | <0.2 | No |
| Example 137 | Host 7 | 99.65 | I-2-1b | 0.35 | There is no crystallization at a temperature below −30° C. | <0.2 | No |
| Example 138 | Host 7 | 99.7 | I-2-13a | 0.3 | There is no crystallization at a temperature below −30° C. | <0.2 | No |
| Example 139 | Host 7 | 99.75 | I-2-41a | 0.25 | There is no crystallization at a temperature below −30° C. | <0.2 | No |
| Example 140 | Host 7 | 99.77 | I-2-53a | 0.23 | There is no crystallization at a temperature below −30° C. | <0.2 | No |
| Example 141 | Host 7 | 99.77 | I-3-1b | 0.23 | There is no crystallization at a temperature below −30° C. | <0.2 | No |
| Example 142 | Host 7 | 99.75 | I-3-5a | 0.25 | There is no crystallization at a temperature below −30° C. | <0.2 | No |
| Example 143 | Host 7 | 99.7 | I-1-1a<br>I-2-25a | 0.2<br>0.1 | There is no crystallization at a temperature below −30° C. | <0.2 | No |
| Example 144 | Host 7 | 99.7 | I-1-13a<br>I-3-1a | 0.18<br>0.12 | There is no crystallization at a temperature below −30° C. | <0.2 | No |
| Example 145 | Host 7 | 99.7 | I-1-17a<br>I-3-1b | 0.15<br>0.15 | There is no crystallization at a temperature below −30° C. | <0.2 | No |
| Example 146 | Host 7 | 99.7 | I-1-21a<br>I-2-25a<br>I-3-1a | 0.1<br>0.1<br>0.1 | There is no crystallization at a temperature below −30° C. | <0.2 | No |
| Example 147 | Host 7 | 99.72 | I-2-29a<br>I-3-1b | 0.18<br>0.1 | There is no crystallization at a temperature below −30° C. | <0.2 | No |
| Example 148 | Host 7 | 99.7 | I-2-33a<br>I-3-5a | 0.15<br>0.15 | There is no crystallization at a temperature below −30° C. | <0.2 | No |
| Example 149 | Host 7 | 99.7 | I-1-17a<br>I-2-13a | 0.15<br>0.15 | There is no crystallization at a temperature below −30° C. | <0.2 | No |
| Example 150 | Host 7 | 99.74 | I-1-9a<br>I-2-41a | 0.17<br>0.09 | There is no crystallization at a temperature below −30° C. | | |

TABLE 23-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 151 | Host 7 | 99.7 | I-1-1b<br>I-2-53a<br>I-3-5a | 0.15<br>0.05<br>0.1 | There is no crystallization at a temperature below −30° C. | <0.2 | No |
| Example 152 | Host 7 | 99.68 | I-2-29a<br>I-3-1a | 0.25<br>0.07 | There is no crystallization at a temperature below −30° C. | <0.2 | No |
| Example 153 | Host 7 | 99.72 | I-1-9a<br>I-3-17a | 0.25<br>0.03 | There is no crystallization at a temperature below −30° C. | <0.2 | No |
| Example 154 | Host 7 | 99.73 | I-2-1b<br>I-2-41a | 0.25<br>0.02 | There is no crystallization at a temperature below −30° C. | <0.2 | No |

Examples 155-176

TABLE 24

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 155 | Host 8 | 99.65 | I-1-1b | 0.35 | There is no crystallization at a temperature below −30° C. | <0.2 | No |
| Example 156 | Host 8 | 99.7 | I-1-1c | 0.3 | There is no crystallization at a temperature below −30° C. | <0.2 | No |
| Example 157 | Host 8 | 99.75 | I-1-9a | 0.25 | There is no crystallization at a temperature below −30° C. | <0.2 | No |
| Example 158 | Host 8 | 99.7 | I-2-1a | 0.3 | There is no crystallization at a temperature below −30° C. | <0.2 | No |
| Example 159 | Host 8 | 99.65 | I-2-1b | 0.35 | There is no crystallization at a temperature below −30° C. | <0.2 | No |
| Example 160 | Host 8 | 99.7 | I-2-13a | 0.3 | There is no crystallization at a temperature below −30° C. | <0.2 | No |
| Example 161 | Host 8 | 99.75 | I-2-41a | 0.25 | There is no crystallization at a temperature below −30° C. | <0.2 | No |
| Example 162 | Host 8 | 99.77 | 1-2-53a | 0.23 | There is no crystallization at a temperature below −30° C. | <0.2 | No |
| Example 163 | Host 8 | 99.77 | I-3-1b | 0.23 | There is no crystallization at a temperature below −30° C. | <0.2 | No |
| Example 164 | Host 8 | 99.75 | I-3-5a | 0.25 | There is no crystallization at a temperature below −30° C. | <0.2 | No |
| Example 165 | Host 8 | 99.7 | I-1-1a<br>I-2-25a | 0.2<br>0.1 | There is no crystallization at a temperature below −30° C. | <0.2 | No |

TABLE 24-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 166 | Host 8 | 99.7 | I-1-13a<br>I-3-1a | 0.18<br>0.12 | There is no crystallization at a temperature below −30° C. | <0.2 | No |
| Example 167 | Host 8 | 99.7 | I-1-17a<br>I-3-1b | 0.15<br>0.15 | There is no crystallization at a temperature below −30° C. | <0.2 | No |
| Example 168 | Host 8 | 99.7 | I-1-21a<br>I-2-25a<br>I-3-1a | 0.1<br>0.1<br>0.1 | There is no crystallization at a temperature below −30° C. | <0.2 | No |
| Example 169 | Host 8 | 99.72 | I-2-29a<br>I-3-1b | 0.18<br>0.1 | There is no crystallization at a temperature below −30° C. | <0.2 | No |
| Example 170 | Host 8 | 99.7 | I-2-33a<br>I-3-5a | 0.15<br>0.15 | There is no crystallization at a temperature below −30° C. | <0.2 | No |
| Example 171 | Host 8 | 99.7 | I-1-17a<br>I-2-13a | 0.15<br>0.15 | There is no crystallization at a temperature below −30° C. | <0.2 | No |
| Example 172 | Host 8 | 99.74 | I-1-9a<br>I-2-41a | 0.17<br>0.09 | There is no crystallization at a temperature below −30° C. | <0.2 | No |
| Example 173 | Host 8 | 99.7 | I-1-1b<br>I-2-53a<br>I-3-5a | 0.15<br>0.05<br>0.1 | There is no crystallization at a temperature below −30° C. | <0.2 | No |
| Example 174 | Host 8 | 99.68 | I-2-29a<br>I-3-1a | 0.25<br>0.07 | There is no crystallization at a temperature below −30° C. | <0.2 | No |
| Example 175 | Host 8 | 99.72 | I-1-9a<br>I-3-17a | 0.25<br>0.03 | There is no crystallization at a temperature below −30° C. | <0.2 | No |
| Example 176 | Host 8 | 99.73 | I-2-1b<br>I-2-41a | 0.25<br>0.02 | There is no crystallization at a temperature below −30° C. | <0.2 | No |

Examples 177-198

TABLE 25

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 177 | Host 9 | 99.65 | I-1-1b | 0.35 | There is no crystallization at a temperature below −30° C. | <0.2 | No |
| Example 178 | Host 9 | 99.7 | I-1-1c | 0.3 | There is no crystallization at a temperature below −30° C. | <0.2 | No |
| Example 179 | Host 9 | 99.75 | I-1-9a | 0.25 | There is no crystallization at a temperature below −30° C. | <0.2 | No |
| Example 180 | Host 9 | 99.7 | I-2-1a | 0.3 | There is no crystallization at a temperature below −30° C. | <0.2 | No |

TABLE 25-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 181 | Host 9 | 99.65 | I-2-1b | 0.35 | There is no crystallization at a temperature below −30° C. | <0.2 | No |
| Example 182 | Host 9 | 99.7 | I-2-13a | 0.3 | There is no crystallization at a temperature below −30° C. | <0.2 | No |
| Example 183 | Host 9 | 99.75 | I-2-41a | 0.25 | There is no crystallization at a temperature below −30° C. | <0.2 | No |
| Example 184 | Host 9 | 99.77 | I-2-53a | 0.23 | There is no crystallization at a temperature below −30° C. | <0.2 | No |
| Example 185 | Host 9 | 99.77 | I-3-1b | 0.23 | There is no crystallization at a temperature below −30° C. | <0.2 | No |
| Example 186 | Host 9 | 99.75 | I-3-5a | 0.25 | There is no crystallization at a temperature below −30° C. | <0.2 | No |
| Example 187 | Host 9 | 99.7 | I-1-1a<br>I-2-25a | 0.2<br>0.1 | There is no crystallization at a temperature below −30° C. | <0.2 | No |
| Example 188 | Host 9 | 99.7 | I-1-13a<br>I-3-1a | 0.18<br>0.12 | There is no crystallization at a temperature below −30° C. | <0.2 | No |
| Example 189 | Host 9 | 99.7 | I-1-17a<br>I-3-1b | 0.15<br>0.15 | There is no crystallization at a temperature below −30° C. | <0.2 | No |
| Example 190 | Host 9 | 99.7 | I-1-21a<br>I-2-25a<br>I-3-1a | 0.1<br>0.1<br>0.1 | There is no crystallization at a temperature below −30° C. | <0.2 | No |
| Example 191 | Host 9 | 99.72 | I-2-29a<br>I-3-1b | 0.18<br>0.1 | There is no crystallization at a temperature below −30° C. | <0.2 | No |
| Example 192 | Host 9 | 99.7 | I-2-33a<br>I-3-5a | 0.15<br>0.15 | There is no crystallization at a temperature below −30° C. | <0.2 | No |
| Example 193 | Host 9 | 99.7 | I-1-17a<br>I-2-13a | 0.15<br>0.15 | There is no crystallization at a temperature below −30° C. | <0.2 | No |
| Example 194 | Host 9 | 99.74 | I-1-9a<br>I-2-41a | 0.17<br>0.09 | There is no crystallization at a temperature below −30° C. | <0.2 | No |
| Example 195 | Host 9 | 99.7 | I-1-1b<br>I-2-53a<br>I-3-5a | 0.15<br>0.05<br>0.1 | There is no crystallization at a temperature below −30° C. | <0.2 | No |
| Example 196 | Host 9 | 99.68 | I-2-29a<br>I-3-1a | 0.25<br>0.07 | There is no crystallization at a temperature below −30° C. | <0.2 | No |
| Example 197 | Host 9 | 99.72 | I-1-9a<br>I-3-17a | 0.25<br>0.03 | There is no crystallization at a temperature below −30° C. | <0.2 | No |
| Example 198 | Host 9 | 99.73 | I-2-1b<br>I-2-41a | 0.25<br>0.02 | There is no crystallization at a temperature below −30° C. | <0.2 | No |

Examples 199-220

TABLE 26

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 199 | Host 10 | 99.65 | I-1-1b | 0.35 | There is no crystallization at a temperature below −30° C. | <0.2 | No |
| Example 200 | Host 10 | 99.7 | I-1-1c | 0.3 | There is no crystallization at a temperature below −30° C. | <0.2 | No |
| Example 201 | Host 10 | 99.75 | I-1-9a | 0.25 | There is no crystallization at a temperature below −30° C. | <0.2 | No |
| Example 202 | Host 10 | 99.7 | I-2-1a | 0.3 | There is no crystallization at a temperature below −30° C. | <0.2 | No |
| Example 203 | Host 10 | 99.65 | I-2-1b | 0.35 | There is no crystallization at a temperature below −30° C. | <0.2 | No |
| Example 204 | Host 10 | 99.7 | I-2-13a | 0.3 | There is no crystallization at a temperature below −30° C. | <0.2 | No |
| Example 205 | Host 10 | 99.75 | I-2-41a | 0.25 | There is no crystallization at a temperature below −30° C. | <0.2 | No |
| Example 206 | Host 10 | 99.77 | I-2-53a | 0.23 | There is no crystallization at a temperature below −30° C. | <0.2 | No |
| Example 207 | Host 10 | 99.77 | I-3-1b | 0.23 | There is no crystallization at a temperature below −30° C. | <0.2 | No |
| Example 208 | Host 10 | 99.75 | I-3-5a | 0.25 | There is no crystallization at a temperature below −30° C. | <0.2 | No |
| Example 209 | Host 10 | 99.7 | I-1-1a<br>I-2-25a | 0.2<br>0.1 | There is no crystallization at a temperature below −30° C. | <0.2 | No |
| Example 210 | Host 10 | 99.7 | I-1-13a<br>I-3-1a | 0.18<br>0.12 | There is no crystallization at a temperature below −30° C. | <0.2 | No |
| Example 211 | Host 10 | 99.7 | I-1-17a<br>I-3-1b | 0.15<br>0.15 | There is no crystallization at a temperature below −30° C. | <0.2 | No |
| Example 212 | Host 10 | 99.7 | I-1-21a<br>I-2-25a<br>I-3-1a | 0.1<br>0.1<br>0.1 | There is no crystallization at a temperature below −30° C. | <0.2 | No |
| Example 213 | Host 10 | 99.72 | I-2-29a<br>I-3-1b | 0.18<br>0.1 | There is no crystallization at a temperature below −30° C. | <0.2 | No |
| Example 214 | Host 10 | 99.7 | I-2-33a<br>I-3-5a | 0.15<br>0.15 | There is no crystallization at a temperature below −30° C. | <0.2 | No |
| Example 215 | Host 10 | 99.7 | I-1-17a<br>I-2-13a | 0.15<br>0.15 | There is no crystallization at a temperature below −30° C. | <0.2 | No |

TABLE 26-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 216 | Host 10 | 99.74 | I-1-9a<br>I-2-41a | 0.17<br>0.09 | There is no crystallization at a temperature below −30° C. | <0.2 | No |
| Example 217 | Host 10 | 99.7 | I-1-1b<br>I-2-53a<br>I-3-5a | 0.15<br>0.05<br>0.1 | There is no crystallization at a temperature below −30° C. | <0.2 | No |
| Example 218 | Host 10 | 99.68 | I-2-29a<br>I-3-1a | 0.25<br>0.07 | There is no crystallization at a temperature below −30° C. | <0.2 | No |
| Example 219 | Host 10 | 99.72 | I-1-9a<br>I-3-17a | 0.25<br>0.03 | There is no crystallization at a temperature below −30° C. | <0.2 | No |
| Example 220 | Host 10 | 99.73 | I-2-1b<br>I-2-41a | 0.25<br>0.02 | There is no crystallization at a temperature below −30° C. | <0.2 | No |

Examples 221-242

TABLE 27

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 221 | Host 11 | 99.65 | I-1-1b | 0.35 | There is no crystallization at a temperature below −30° C. | <0.2 | No |
| Example 222 | Host 11 | 99.7 | I-1-1c | 0.3 | There is no crystallization at a temperature below −30° C. | <0.2 | No |
| Example 223 | Host 11 | 99.75 | I-1-9a | 0.25 | There is no crystallization at a temperature below −30° C. | <0.2 | No |
| Example 224 | Host 11 | 99.7 | I-2-1a | 0.3 | There is no crystallization at a temperature below −30° C. | <0.2 | No |
| Example 225 | Host 11 | 99.65 | I-2-1b | 0.35 | There is no crystallization at a temperature below −30° C. | <0.2 | No |
| Example 226 | Host 11 | 99.7 | I-2-13a | 0.3 | There is no crystallization at a temperature below −30° C. | <0.2 | No |
| Example 227 | Host 11 | 99.75 | I-2-41a | 0.25 | There is no crystallization at a temperature below −30° C. | <0.2 | No |
| Example 228 | Host 11 | 99.77 | I-2-53a | 0.23 | There is no crystallization at a temperature below −30° C. | <0.2 | No |
| Example 229 | Host 11 | 99.77 | I-3-1b | 0.23 | There is no crystallization at a temperature below −30° C. | <0.2 | No |

TABLE 27-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 230 | Host 11 | 99.75 | I-3-5a | 0.25 | There is no crystallization at a temperature below −30° C. | <0.2 | No |
| Example 231 | Host 11 | 99.7 | I-1-1a<br>I-2-25a | 0.2<br>0.1 | There is no crystallization at a temperature below −30° C. | <0.2 | No |
| Example 232 | Host 11 | 99.7 | I-1-13a<br>I-3-1a | 0.18<br>0.12 | There is no crystallization at a temperature below −30° C. | <0.2 | No |
| Example 233 | Host 11 | 99.7 | I-1-17a<br>I-3-1b | 0.15<br>0.15 | There is no crystallization at a temperature below −30° C. | <0.2 | No |
| Example 234 | Host 11 | 99.7 | I-1-21a<br>I-2-25a<br>I-3-1a | 0.1<br>0.1<br>0.1 | There is no crystallization at a temperature below −30° C. | <0.2 | No |
| Example 235 | Host 11 | 99.72 | I-2-29a<br>I-3-1b | 0.18<br>0.1 | There is no crystallization at a temperature below −30° C. | <0.2 | No |
| Example 236 | Host 11 | 99.7 | I-2-33a<br>I-3-5a | 0.15<br>0.15 | There is no crystallization at a temperature below −30° C. | <0.2 | No |
| Example 237 | Host 11 | 99.7 | I-1-17a<br>I-2-13a | 0.15<br>0.15 | There is no crystallization at a temperature below −30° C. | <0.2 | No |
| Example 238 | Host 11 | 99.74 | I-1-9a<br>I-2-41a | 0.17<br>0.09 | There is no crystallization at a temperature below −30° C. | <0.2 | No |
| Example 239 | Host 11 | 99.7 | I-1-1b<br>I-2-53a<br>I-3-5a | 0.15<br>0.05<br>0.1 | There is no crystallization at a temperature below −30° C. | <0.2 | No |
| Example 240 | Host 11 | 99.68 | I-2-29a<br>I-3-1a | 0.25<br>0.07 | There is no crystallization at a temperature below −30° C. | <0.2 | No |
| Example 241 | Host 11 | 99.72 | I-1-9a<br>I-3-17a | 0.25<br>0.03 | There is no crystallization at a temperature below −30° C. | <0.2 | No |
| Example 242 | Host 11 | 99.73 | I-2-1b<br>I-2-41a | 0.25<br>0.02 | There is no crystallization at a temperature below −30° C. | <0.2 | No |

Examples 243-264

TABLE 28

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 243 | Host 12 | 99.65 | I-1-1b | 0.35 | There is no crystallization at a temperature below −30° C. | <0.2 | No |
| Example 244 | Host 12 | 99.7 | I-1-1c | 0.3 | There is no crystallization at a temperature below −30° C. | <0.2 | No |

TABLE 28-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 245 | Host 12 | 99.75 | I-1-9a | 0.25 | There is no crystallization at a temperature below −30° C. | <0.2 | No |
| Example 246 | Host 12 | 99.7 | I-2-1a | 0.3 | There is no crystallization at a temperature below −30° C. | <0.2 | No |
| Example 247 | Host 12 | 99.65 | I-2-1b | 0.35 | There is no crystallization at a temperature below −30° C. | <0.2 | No |
| Example 248 | Host 12 | 99.7 | I-2-13a | 0.3 | There is no crystallization at a temperature below −30° C. | <0.2 | No |
| Example 249 | Host 12 | 99.75 | I-2-41a | 0.25 | There is no crystallization at a temperature below −30° C. | <0.2 | No |
| Example 250 | Host 12 | 99.77 | I-2-53a | 0.23 | There is no crystallization at a temperature below −30° C. | <0.2 | No |
| Example 251 | Host 12 | 99.77 | I-3-1b | 0.23 | There is no crystallization at a temperature below −30° C. | <0.2 | No |
| Example 252 | Host 12 | 99.75 | I-3-5a | 0.25 | There is no crystallization at a temperature below −30° C. | <0.2 | No |
| Example 253 | Host 12 | 99.7 | I-1-1a<br>I-2-25a | 0.2<br>0.1 | There is no crystallization at a temperature below −30° C. | <0.2 | No |
| Example 254 | Host 12 | 99.7 | I-1-13a<br>I-3-1a | 0.18<br>0.12 | There is no crystallization at a temperature below −30° C. | <0.2 | No |
| Example 255 | Host 12 | 99.7 | I-1-17a<br>I-3-1b | 0.15<br>0.15 | There is no crystallization at a temperature below −30° C. | <0.2 | No |
| Example 256 | Host 12 | 99.7 | I-1-21a<br>I-2-25a<br>I-3-1a | 0.1<br>0.1<br>0.1 | There is no crystallization at a temperature below −30° C. | <0.2 | No |
| Example 257 | Host 12 | 99.72 | I-2-29a<br>I-3-1b | 0.18<br>0.1 | There is no crystallization at a temperature below −30° C. | <0.2 | No |
| Example 258 | Host 12 | 99.7 | I-2-33a<br>I-3-5a | 0.15<br>0.15 | There is no crystallization at a temperature below −30° C. | <0.2 | No |
| Example 259 | Host 12 | 99.7 | I-1-17a<br>I-2-13a | 0.15<br>0.15 | There is no crystallization at a temperature below −30° C. | <0.2 | No |
| Example 260 | Host 12 | 99.74 | I-1-9a<br>I-2-41a | 0.17<br>0.09 | There is no crystallization at a temperature below −30° C. | <0.2 | No |
| Example 261 | Host 12 | 99.7 | I-1-1b<br>I-2-53a<br>I-3-5a | 0.15<br>0.05<br>0.1 | There is no crystallization at a temperature below −30° C. | <0.2 | No |
| Example 262 | Host 12 | 99.68 | I-2-29a<br>I-3-1a | 0.25<br>0.07 | There is no crystallization at a temperature below −30° C. | <0.2 | No |
| Example 263 | Host 12 | 99.72 | I-1-9a<br>I-3-17a | 0.25<br>0.03 | There is no crystallization at a temperature below −30° C. | <0.2 | No |

TABLE 28-continued

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 264 | Host 12 | 99.73 | I-2-1b<br>I-2-41a | 0.25<br>0.02 | There is no crystallization at a temperature below −30° C. | <0.2 | No |

Examples 265-286

TABLE 29

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 265 | Host 13 | 99.65 | I-1-1b | 0.35 | There is no crystallization at a temperature below −30° C. | <0.2 | No |
| Example 266 | Host 13 | 99.7 | I-1-1c | 0.3 | There is no crystallization at a temperature below −30° C. | <0.2 | No |
| Example 267 | Host 13 | 99.75 | I-1-9a | 0.25 | There is no crystallization at a temperature below −30° C. | <0.2 | No |
| Example 268 | Host 13 | 99.7 | I-2-1a | 0.3 | There is no crystallization at a temperature below −30° C. | <0.2 | No |
| Example 269 | Host 13 | 99.65 | I-2-1b | 0.35 | There is no crystallization at a temperature below −30° C. | <0.2 | No |
| Example 270 | Host 13 | 99.7 | I-2-13a | 0.3 | There is no crystallization at a temperature below −30° C. | <0.2 | No |
| Example 271 | Host 13 | 99.75 | I-2-41a | 0.25 | There is no crystallization at a temperature below −30° C. | <0.2 | No |
| Example 272 | Host 13 | 99.77 | I-2-53a | 0.23 | There is no crystallization at a temperature below −30° C. | <0.2 | No |
| Example 273 | Host 13 | 99.77 | I-3-1b | 0.23 | There is no crystallization at a temperature below −30° C. | <0.2 | No |
| Example 274 | Host 13 | 99.75 | I-3-5a | 0.25 | There is no crystallization at a temperature below −30° C. | <0.2 | No |
| Example 275 | Host 13 | 99.7 | I-1-1a<br>I-2-25a | 0.2<br>0.1 | There is no crystallization at a temperature below −30° C. | <0.2 | No |
| Example 276 | Host 13 | 99.7 | I-1-13a<br>I-3-1a | 0.18<br>0.12 | There is no crystallization at a temperature below −30° C. | <0.2 | No |
| Example 277 | Host 13 | 99.7 | I-1-17a<br>I-3-1b | 0.15<br>0.15 | There is no crystallization at a temperature below −30° C. | <0.2 | No |
| Example 278 | Host 13 | 99.7 | I-1-21a<br>I-2-25a<br>I-3-1a | 0.1<br>0.1<br>0.1 | There is no crystallization at a temperature below −30° C. | | |

TABLE 29-continued

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 279 | Host 13 | 99.72 | I-2-29a<br>I-3-1b | 0.18<br>0.1 | There is no crystallization at a temperature below −30° C. | <0.2 | No |
| Example 280 | Host 13 | 99.7 | I-2-33a<br>I-3-5a | 0.15<br>0.15 | There is no crystallization at a temperature below −30° C. | <0.2 | No |
| Example 281 | Host 13 | 99.7 | I-1-17a<br>I-2-13a | 0.15<br>0.15 | There is no crystallization at a temperature below −30° C. | <0.2 | No |
| Example 282 | Host 13 | 99.74 | I-1-9a<br>I-2-41a | 0.17<br>0.09 | There is no crystallization at a temperature below −30° C. | <0.2 | No |
| Example 283 | Host 13 | 99.7 | I-1-1b<br>I-2-53a<br>I-3-5a | 0.15<br>0.05<br>0.1 | There is no crystallization at a temperature below −30° C. | <0.2 | No |
| Example 284 | Host 13 | 99.68 | I-2-29a<br>I-3-1a | 0.25<br>0.07 | There is no crystallization at a temperature below −30° C. | <0.2 | No |
| Example 285 | Host 13 | 99.72 | I-1-9a<br>I-3-17a | 0.25<br>0.03 | There is no crystallization at a temperature below −30° C. | <0.3 | No |
| Example 286 | Host 13 | 99.73 | I-2-1b<br>I-2-41a | 0.25<br>0.02 | There is no crystallization at a temperature below −30° C. | <0.3 | No |

Examples 287-308

TABLE 30

|  | Host | Proportion of Host (%) | Polymerizable compound | Proportion of polymerizable compound (%) | Intersolubility | Changes in pretilt angle | Zara Particle |
|---|---|---|---|---|---|---|---|
| Example 287 | Host 14 | 99.65 | I-1-1b | 0.35 | There is no crystallization at a temperature below −30° C. | <0.2 | No |
| Example 288 | Host 14 | 99.7 | I-1-1c | 0.3 | There is no crystallization at a temperature below −30° C. | <0.2 | No |
| Example 289 | Host 14 | 99.75 | I-1-9a | 0.25 | There is no crystallization at a temperature below −30° C. | <0.2 | No |
| Example 290 | Host 14 | 99.7 | I-2-1a | 0.3 | There is no crystallization at a temperature below −30° C. | <0.2 | No |
| Example 291 | Host 14 | 99.65 | I-2-1b | 0.35 | There is no crystallization at a temperature below −30° C. | <0.2 | No |
| Example 292 | Host 14 | 99.7 | I-2-13a | 0.3 | There is no crystallization at a temperature below −30° C. | <0.2 | No |
| Example 293 | Host 14 | 99.75 | I-2-41a | 0.25 | There is no crystallization at a temperature below −30° C. | <0.2 | No |

TABLE 30-continued

| | Host | Proportion of Host (%) | Polymerizable compound | Proportion of polymerizable compound (%) | Intersolubility | Changes in pretilt angle | Zara Particle |
|---|---|---|---|---|---|---|---|
| Example 294 | Host 14 | 99.77 | I-2-53a | 0.23 | There is no crystallization at a temperature below −30° C. | <0.2 | No |
| Example 295 | Host 14 | 99.77 | I-3-1b | 0.23 | There is no crystallization at a temperature below −30° C. | <0.2 | No |
| Example 296 | Host 14 | 99.75 | I-3-5a | 0.25 | There is no crystallization at a temperature below −30° C. | <0.2 | No |
| Example 297 | Host 14 | 99.7 | I-1-1a<br>I-2-25a | 0.2<br>0.1 | There is no crystallization at a temperature below −30° C. | <0.2 | No |
| Example 298 | Host 14 | 99.7 | I-1-13a<br>I-3-1a | 0.18<br>0.12 | There is no crystallization at a temperature below −30° C. | <0.2 | No |
| Example 299 | Host 14 | 99.7 | I-1-17a<br>I-3-1b | 0.15<br>0.15 | There is no crystallization at a temperature below −30° C. | <0.2 | No |
| Example 300 | Host 14 | 99.7 | I-1-21a<br>I-2-25a<br>1-3-1a | 0.1<br>0.1<br>0.1 | There is no crystallization at a temperature below −30° C. | <0.2 | No |
| Example 301 | Host 14 | 99.72 | I-2-29a<br>I-3-1b | 0.18<br>0.1 | There is no crystallization at a temperature below −30° C. | <0.2 | No |
| Example 302 | Host 14 | 99.7 | I-2-33a<br>I-3-5a | 0.15<br>0.15 | There is no crystallization at a temperature below −30° C. | <0.2 | No |
| Example 303 | Host 14 | 99.7 | I-1-17a<br>I-2-13a | 0.15<br>0.15 | There is no crystallization at a temperature below −30° C. | <0.2 | No |
| Example 304 | Host 14 | 99.74 | I-1-9a<br>I-2-41a | 0.17<br>0.09 | There is no crystallization at a temperature below −30° C. | <0.2 | No |
| Example 305 | Host 14 | 99.7 | I-1-1b<br>I-2-53a<br>I-3-5a | 0.15<br>0.05<br>0.1 | There is no crystallization at a temperature below −30° C. | <0.2 | No |
| Example 306 | Host 14 | 99.68 | I-2-29a<br>I-3-1a | 0.25<br>0.07 | There is no crystallization at a temperature below −30° C. | <0.2 | No |
| Example 307 | Host 14 | 99.72 | I-1-9a<br>I-3-17a | 0.25<br>0.03 | There is no crystallization at a temperature below −30° C. | <0.2 | No |
| Example 308 | Host 14 | 99.73 | I-2-1b<br>I-2-41a | 0.25<br>0.02 | There is no crystallization at a temperature below −30° C. | <0.2 | No |

As can be seen from the data of the above Comparative Examples and Examples, the PSA-type liquid crystal composition provided by the present invention has better intersolubility, cannot be crystallized at a low temperature, can form a stable pretilt angle, and avoids the occurrence of a display defect, such as Zara Particle, during the polymerization.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

What is claimed is:
1. A PSA liquid crystal composition comprising:
a host liquid crystal component A and a polymerizable component B,
wherein the host liquid crystal component A comprises one or more liquid crystal compounds, and the polymerizable component B comprises:

at least one compound selected from a group consisting of the compounds of general formula I-2 and general formula I-3:

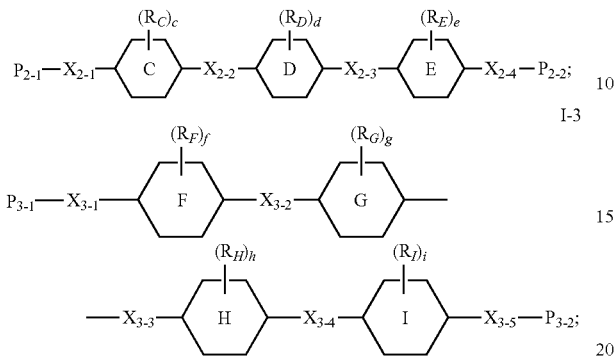

in which,
ring C, ring D, ring E, ring F, ring G, ring H and ring I each independently represents phenylene or naphthylene;
$X_{2-2}$, $X_{2-3}$, $X_{2-4}$, $X_{3-2}$, $X_{3-3}$, and $X_{3-4}$ each independently represents a single bond, or a $C_{1-12}$ linear or branched alkylene, wherein one or more —$CH_2$— in the $C_{1-12}$ linear alkylene or in the $C_{3-12}$ branched alkylene can be replaced by —O—, —S—, —CO—, —CH=CH— or —C≡C— in a manner that heteroatoms are not directly connected to each other, —H in one or more —$CH_2$— in the $C_{1-12}$ linear alkylene or in the $C_{3-12}$ branched alkylene can be substituted by halogen;
$R_C$, $R_D$, $R_E$, $R_F$, $R_G$, $R_H$ and $R_I$ each independently represents halogen, or a $C_{1-5}$ halogenated or unhalogenated linear alkyl or alkoxy, or a $C_{3-5}$ halogenated or unhalogenated branched alkyl or alkoxy;
$P_{2-1}$, $P_{2-2}$, $P_{3-1}$ and $P_{3-2}$ each independently represents a polymerizable group;
f, g, h and i each independently represents 0, 1, 2 or 3; c, d, and e each independently represents 0 or 1, and when f is 2 or 3, $R_F$ can be same or different; when g is 2 or 3, $R_G$ can be same or different; when h is 2 or 3, $R_H$ can be same or different; when i is 2 or 3, $R_I$ can be same or different;
wherein both $X_{2-1}$ and $X_{2-4}$ represent a single bond, at least one of $X_{2-2}$ and $X_{2-3}$ is not a single bond, and c+d+e≥1, and $n_2$≥1, and c+d+e+$n_2$≥3, wherein $n_2$ represents the number of groups that are not single bond in $X_{2-1}$, $X_{2-2}$, $X_{2-3}$ and $X_{2-4}$; and
wherein $X_{3-1}$ and $X_{3-5}$ are single bond, and at least one of $X_{3-2}$, $X_{3-3}$ and $X_{3-4}$ is not a single bond, and f+g+h+i≥2, $n_3$≥1, wherein $n_3$ represents the number of groups that are not single bond in $X_{3-1}$, $X_{3-2}$, $X_{3-3}$, $X_{3-4}$ and $X_{3-5}$.

2. The PSA liquid crystal composition according to claim 1, wherein f+g+h+i+$n_3$≥4.

3. The PSA liquid crystal composition according to claim 1, wherein $X_{2-2}$, $X_{2-3}$, $X_{3-2}$, $X_{3-3}$ and $X_{3-4}$ each independently represents a single bond, —$CH_2O$—, —$OCH_2$—, —$CH_2CH_2$—, —$(CH_2)_3$—, —$(CH_2)_4$—, —$(CH_2)_3O$—, —$O(CH_2)_3$—, —O—, —$CF_2$—, —$CF_2O$—, —$OCF_2$—, —$CH(CH_3)CH_2$—, —$C(CH_3)_2CH_2$—, —$CH_2C(CH_3)_2$—, —$C(CH_3)_2CH(CH_3)$—, —$C(CH_3)_2C(CH_3)_2$—, —$C(CH_3)_2O$—, —$OC(CH_3)_2$—, —$CH(CH_2CH_3)CH_2$—, —S—, —NH—, —NH—CO—O—, —O—CO—NH—, —$SCH_2$—, —$CH_2S$—, —CH=CH—, —C≡C—, —CH=CH—CO—O— or —O—CO—CH=CH.

4. The PSA liquid crystal composition according to claim 1, wherein the polymerizable component B further comprises at least one compound selected from a group consisting of the compounds of general formula I-1:

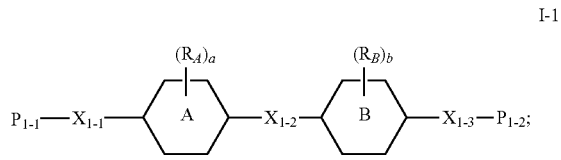

in which,
ring A and ring B each independently represents phenylene or naphthylene;
$R_A$ and $R_B$ each independently represents halogen, or a $C_{1-5}$ halogenated or unhalogenated linear alkyl or alkoxy, or a $C_{3-5}$ halogenated or unhalogenated branched alkyl or alkoxy;
$P_{1-1}$ and $P_{1-2}$ each independently represents a polymerizable group;
a and b each independently represents 0, 1, 2 or 3; and when a is 2 or 3, $R_A$ can be same or different; when b is 2 or 3, $R_B$ can be same or different; and
both $X_{1-1}$ and $X_{1-3}$ represent single bond, and $X_{1-2}$ represents —$CH_2O$—, —$OCH_2$—, —CO—O—, —O—CO—, —$CH_2CH_2$—, —$(CH_2)_3$—, —$(CH_2)_4$—, —$(CH_2)_3O$—, —$O(CH_2)_3$—, —O—, —$CF_2$—, —$CF_2O$—, —$OCF_2$—, —$CH(CH_3)CH_2$—, —$C(CH_3)_2CH_2$—, —$CH_2C(CH_3)_2$—, —$C(CH_3)_2CH(CH_3)$—, —$C(CH_3)_2C(CH_3)_2$—, —$C(CH_3)_2O$—, —$OC(CH_3)_2$—, —$CH(CH_2CH_3)CH_2$—, —S—, —$SCH_2$—, —$CH_2S$—, —CH=CH—, —C≡C—, —CH=CH—CO—O— or —O—CO—CH=CH, wherein if $X_{1-2}$ represents —CO—O— or —O—CO—, then a+b≠0.

5. The PSA liquid crystal composition according to claim 4, wherein the polymerizable component B comprises two or three polymerizable compounds, and wherein the at least one of said two or three polymerizable compounds is selected from the compounds of general formula I-3.

6. The PSA liquid crystal composition according to claim 1, wherein the host liquid crystal component A comprises one or more compounds of general formula M:

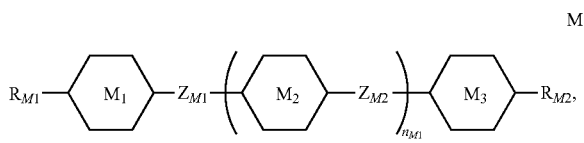

in which,
$R_{M1}$ and $R_{M2}$ each independently represents a $C_{1-12}$ linear alkyl, a $C_{3-12}$ branched alkyl,

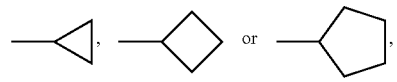

one or more nonadjacent —CH$_2$— in the C$_{1-12}$ linear or branched alkyl can each be independently replaced by —CH=CH—, —C≡C—, —O—, —CO—, —CO—O— or —O—CO—;

ring M$_1$, ring M$_2$ and ring M$_3$ each independently represents

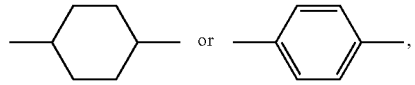

wherein one or more —CH$_2$— in

can be replaced by —O—, and at most one —H on

can be substituted by halogen;

Z$_{M1}$ and Z$_{M2}$ each independently represents a single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—; and n$_{M1}$ represents 0, 1, 2 or 3, and when n$_{M1}$=2 or 3, ring M$_2$ can be same or different, and Z$_{M2}$ can be same or different.

7. The PSA liquid crystal composition according to claim 6, wherein the host liquid crystal component A at least comprises one or more compounds selected from a group consisting of the compounds of general formula M1-a, general formula M1-b and general formula M1-c:

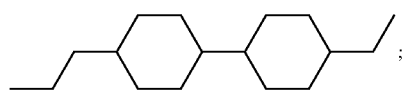  M1-a

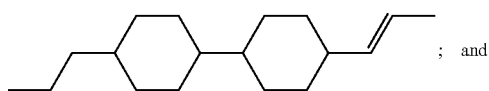  M1-b ; and

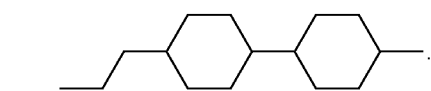  M1-c .

8. The PSA liquid crystal composition according to claim 6, wherein the host liquid crystal component A further comprises one or more compounds of general formula N:

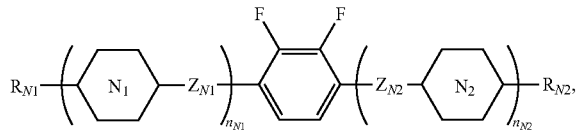  N in which,

R$_{N1}$ and R$_{N2}$ each independently represents a C$_{1-12}$ linear alkyl, a C$_{3-12}$ branched alkyl,

one or more nonadjacent —CH$_2$— in the C$_{1-12}$ linear or branched alkyl can each be independently replaced by —CH=CH—, —C≡C—, —O—, —CO—, —CO—O— or —O—CO—, and one or more —H presented in these groups can each be independently substituted by —F or —Cl;

ring

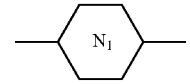

and ring

each independently represents

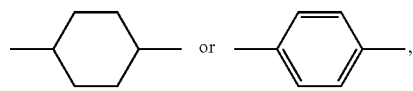

wherein one or more —CH$_2$— in

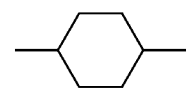

can be replaced by —O—, one or at most two single bonds in the ring can be replaced by double bond, wherein one or more —H on

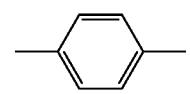

can be substituted by —F or —Cl, and one or more —CH= in the ring can be replaced by —N=;

Z$_{N1}$ and Z$_{N2}$ each independently represents a single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—; and $n_{N1}$ represents 0, 1, 2 or 3, $n_{N2}$ represents 0 or 1, and $0<n_{N1}+n_{N2}<3$, when $n_{N1=2}$ or 3, ring

can be same or different, $Z_{N1}$ can be same or different.

9. The PSA liquid crystal composition according to claim 1, wherein the polymerizable component B provides 0.01-5% of the total weight of the PSA liquid crystal composition.

10. A liquid crystal display device comprising the PSA liquid crystal composition according to claim 1.

11. The PSA liquid crystal composition according to claim 1, wherein if both $X_{2-2}$ and $X_{2-3}$ represent —CO—O— or —O—CO—, then $c+d+e\neq 0$.

12. The PSA liquid crystal composition according to claim 1, wherein if $X_{3-2}$, $X_{3-3}$ and $X_{3-4}$ represent —CO—O— or —O—CO—, then $f+g+h+i\neq 0$.

13. The PSA liquid crystal composition according to claim 4, wherein the polymerizable component B comprises two or three polymerizable compounds, and wherein the at least one of said two or three polymerizable compounds is selected from the compounds of general formula I-2, both $X_{2-1}$ and $X_{2-4}$ represent single bond, at least one of $X_{2-2}$ and $X_{2-3}$ is not a single bond and $c+d+e\geq 1$.

14. A PSA liquid crystal composition comprising:
a host liquid crystal component A and a polymerizable component B,
wherein the host liquid crystal component A comprises one or more liquid crystal compounds, and the polymerizable component B comprises:
at least one compound selected from a group consisting of the compounds of general formula I-1:

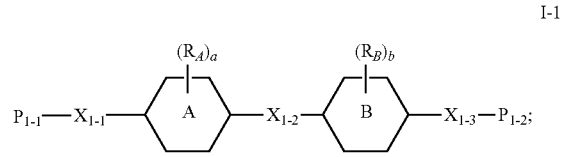

at least one compound selected from a group consisting of the compounds of general formula I-2:

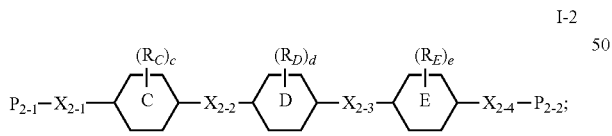

and
at least one compound selected from a group consisting of the compounds of general formula I-3:

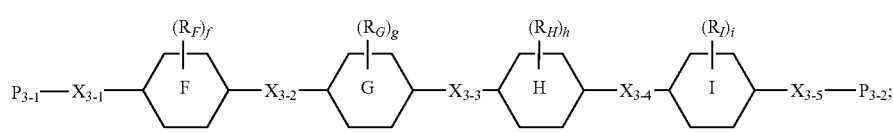

in which,
ring A, ring B, ring C, ring D, ring E, ring F, ring G, ring H and ring I each independently represents phenylene or naphthylene;

$X_{2-2}$, $X_{2-3}$, $X_{2-4}$, $X_{3-2}$, $X_{3-3}$, and $X_{3-4}$ each independently represents a single bond, a $C_{1-12}$ linear alkylene, a $C_{3-12}$ branched alkylene, wherein one or more —CH$_2$— in the $C_{1-12}$ linear alkylene or in the $C_{3-12}$ branched alkylene can be replaced by —O—, —S—, —CO—, —CH=CH— or —C≡C— in a manner that heteroatoms are not directly connected to each other, —H in one or more —CH$_2$— in the $C_{1-12}$ linear alkylene or in the $C_{3-12}$ branched alkylene can be substituted by halogen;

$R_A$, $R_B$, $R_C$, $R_D$, $R_E$, $R_F$, $R_G$, $R_H$ and $R_I$ each independently represents halogen, a $C_{1-5}$ halogenated or unhalogenated linear alkyl or alkoxy, or a $C_{3-5}$ halogenated or unhalogenated branched alkyl or alkoxy;

$P_{1-1}$, $P_{1-2}$, $P_{2-1}$, $P_{2-2}$, $P_{3-1}$ and $P_{3-2}$ each independently represents a polymerizable group;

a, b, c, d, e, f, g, h and i each independently represents 0, 1, 2 or 3, and when a is 2 or 3, $R_A$ can be same or different; when b is 2 or 3, $R_B$ can be same or different; when c is 2 or 3, $R_C$ can be same or different; when d is 2 or 3, $R_D$ can be same or different; when e is 2 or 3, $R_E$ can be same or different; when f is 2 or 3, $R_F$ can be same or different; when g is 2 or 3, $R_G$ can be same or different; when h is 2 or 3, $R_H$ can be same or different; when i is 2 or 3, $R_I$ can be same or different;

wherein both $X_{1-1}$ and $X_{1-3}$ represent single bond, and $X_{1-2}$ represents —CH$_2$O—, —OCH$_2$—, —CO—O—, —O—CO—, —CH$_2$CH$_2$—, —(CH$_2$)$_3$—, —(CH$_2$)$_4$—, —(CH$_2$)$_3$O—, —O(CH$_2$)$_3$—, —O—, —CF$_2$—, —CF$_2$O—, —OCF$_2$—, —CH(CH$_3$)CH$_2$—, —C(CH$_3$)$_2$CH$_2$—, —CH$_2$C(CH$_3$)$_2$—, —C(CH$_3$)$_2$CH(CH$_3$)—, —C(CH$_3$)$_2$C(CH$_3$)$_2$—, —C(CH$_3$)$_2$O—, —OC(CH$_3$)$_2$—, —CH(CH$_2$CH$_3$)CH$_2$—, —S—, —SCH$_2$—, —CH$_2$S—, —CH=CH—, —C≡C—, —CH=CH—CO—O— or —O—CO—CH=CH;

wherein both $X_{2-1}$ and $X_{2-4}$ represent a single bond, at least one of $X_{2-2}$ and $X_{2-3}$ is not a single bond, and $c+d+e\geq 1$, and $n_2\geq 1$, wherein $n_2$ represents the number of groups that are not single bond in $X_{2-1}$, $X_{2-2}$, $X_{2-3}$ and $X_{2-4}$; and wherein $X_{3-1}$ and $X_{3-5}$ are single bond, and at least one of $X_{3-2}$, $X_{3-3}$ and $X_{3-4}$ is not a single bond, and $f+g+h+i\geq 2$, $n_3>1$, wherein $n_3$ represents the number of groups that are not single bond in $X_{3-1}$, $X_{3-2}$, $X_{3-3}$, $X_{3-4}$ and $X_{3-5}$.

15. The PSA liquid crystal composition according to claim 4, wherein the polymerizable component B comprises two or three polymerizable compounds, and wherein the at least one of said two or three polymerizable compounds is selected from the compounds of general formula I-2.

\* \* \* \* \*